United States Patent [19]
Yamamoto et al.

[11] Patent Number: 5,390,032
[45] Date of Patent: Feb. 14, 1995

[54] IMAGE READER HAVING PHOTOELECTRIC CONVERSION LINE SENSORS

[75] Inventors: Norihiro Yamamoto; Osamu Takase, both of Yokohama, Japan

[73] Assignee: Ricoh Company, Ltd., Tokyo, Japan

[21] Appl. No.: 905,883

[22] Filed: Jun. 26, 1992

[30] Foreign Application Priority Data

| | | | |
|---|---|---|---|
| Jun. 28, 1991 | [JP] | Japan | 3-158142 |
| Sep. 30, 1991 | [JP] | Japan | 3-251618 |
| Sep. 30, 1991 | [JP] | Japan | 3-251620 |
| Oct. 4, 1991 | [JP] | Japan | 3-257568 |

[51] Int. Cl.⁶ .............................. H04N 1/04
[52] U.S. Cl. ................... 358/474; 358/486; 358/494; 358/505
[58] Field of Search .............. 358/500, 501, 505, 513, 358/514, 528, 530, 400, 401, 409, 443, 447, 448, 449, 450, 471, 474, 482, 483, 486, 487, 488, 494

[56] References Cited

U.S. PATENT DOCUMENTS

| | | | |
|---|---|---|---|
| 4,358,794 | 11/1982 | Kurakami et al. | 358/293 |
| 4,465,939 | 8/1984 | Tamura | 358/294 X |
| 4,504,859 | 3/1985 | Grady et al. | 358/111 |
| 4,675,533 | 6/1987 | Shimizu | 358/293 X |
| 4,712,134 | 12/1987 | Murakami | 358/213.13 |
| 4,734,762 | 3/1988 | Aoki et al. | 358/80 |
| 4,774,592 | 9/1988 | Suzuki et al. | 358/285 |
| 4,849,820 | 7/1989 | Suzuki et al. | 358/483 |
| 5,283,668 | 2/1994 | Hiramatsu | 358/474 |

FOREIGN PATENT DOCUMENTS

57-99863 6/1982 Japan.

*Primary Examiner*—Bentsu Ro
*Attorney, Agent, or Firm*—Oblon, Spivak, McClelland, Maier, & Neustadt

[57] ABSTRACT

An image reader includes a fight source projecting a light onto an original, and first and second photoelectric conversion elements arranged so that the first photoelectric conversion element reads first half of the original in a scanning direction and the second photoelectric conversion element reads the second half and that a first read signal of the first half of the original is transferred, starting from a center of the original, from the first photoelectric conversion element and a second read signal of the second half of the original is transferred, starting from the center, from the second photoelectric conversion element. An imaging lens projects a reflected light reflected by the original onto the two photoelectric conversion elements. A driver circuit drives the first and second photoelectric conversion elements so that the first and second read signals are output from the first and second photoelectric conversion elements, respectively. A signal processing unit processes the first and second read signals so that a finalized read signal containing information on pixels arranged in the scanning line is generated each time the original is scanned in the scanning direction.

19 Claims, 78 Drawing Sheets

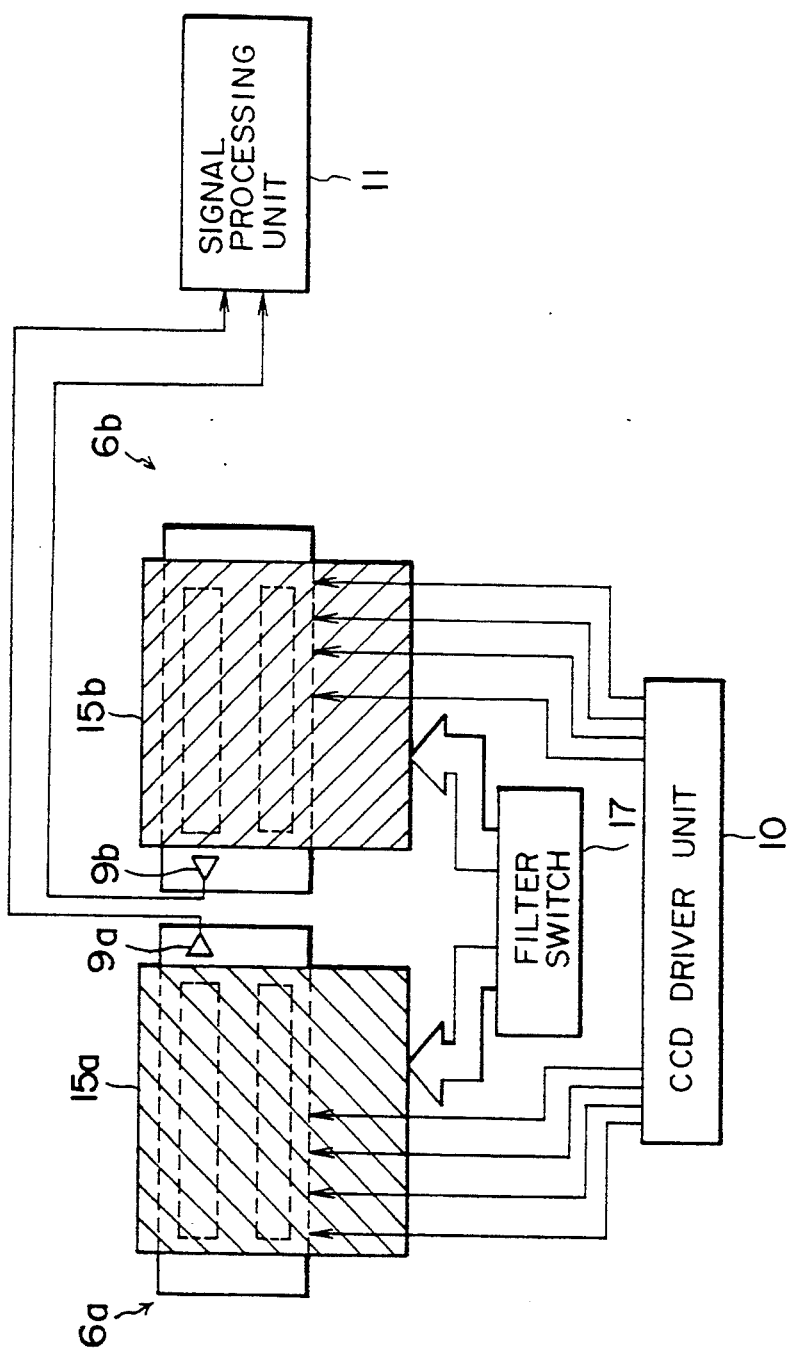
F I G. 12

F I G. 19
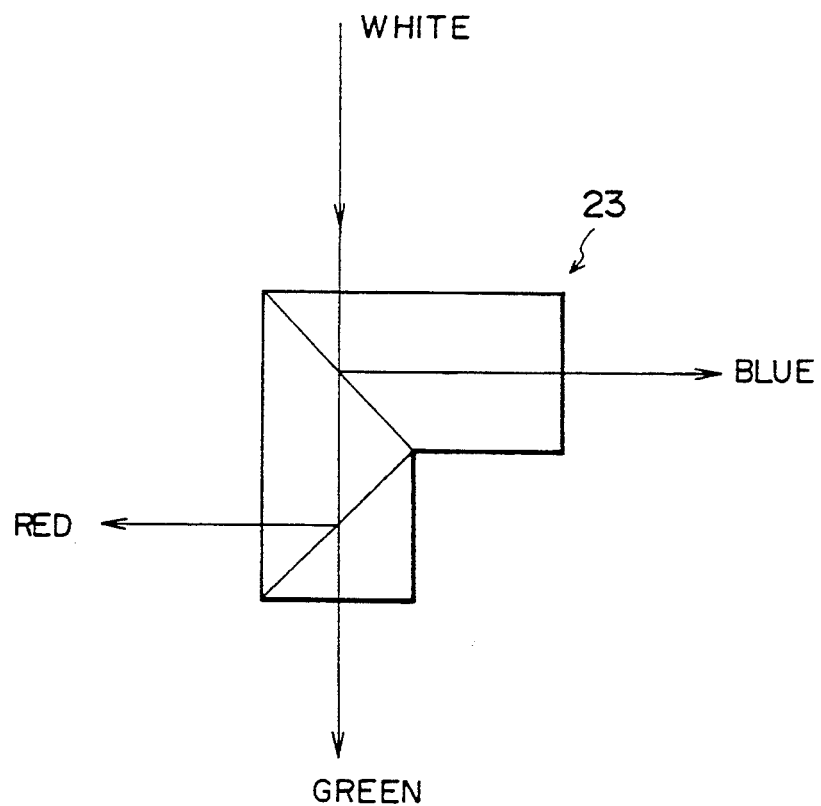

F I G. 20A
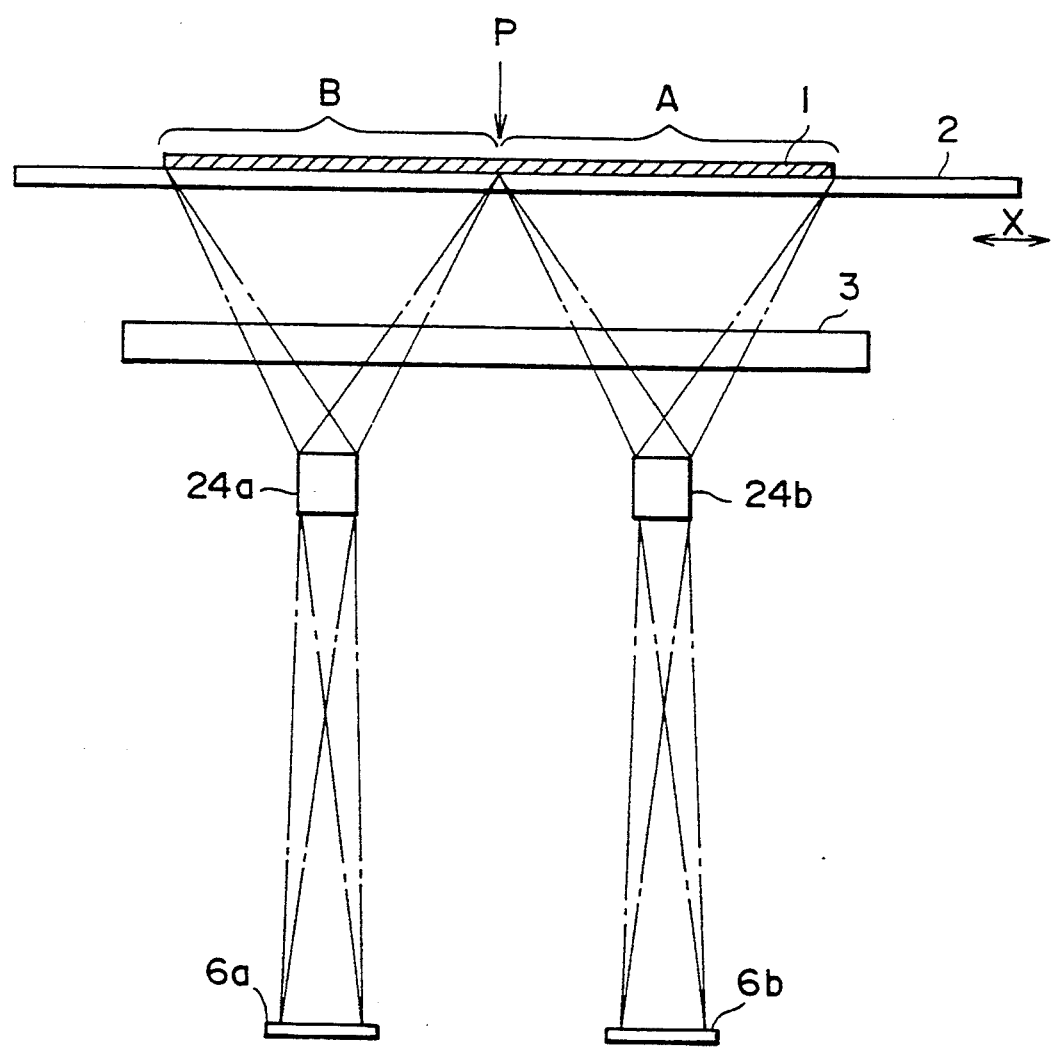

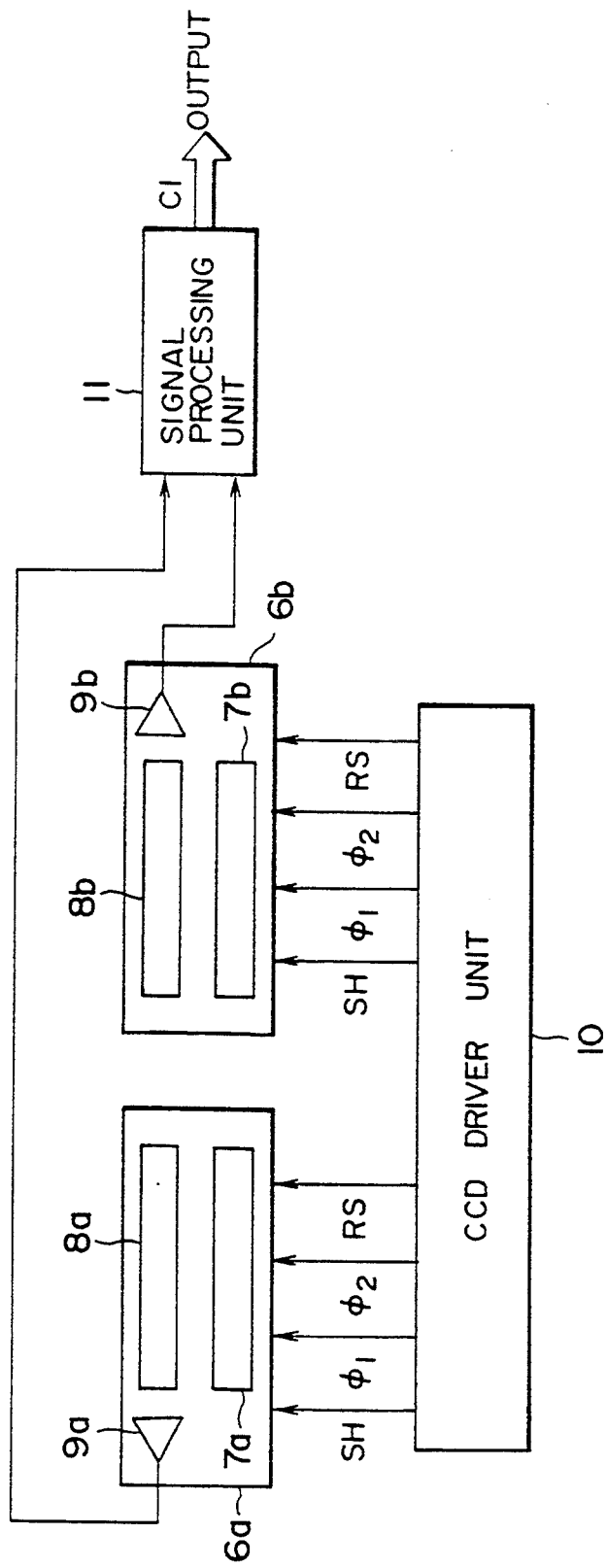

F I G. 21
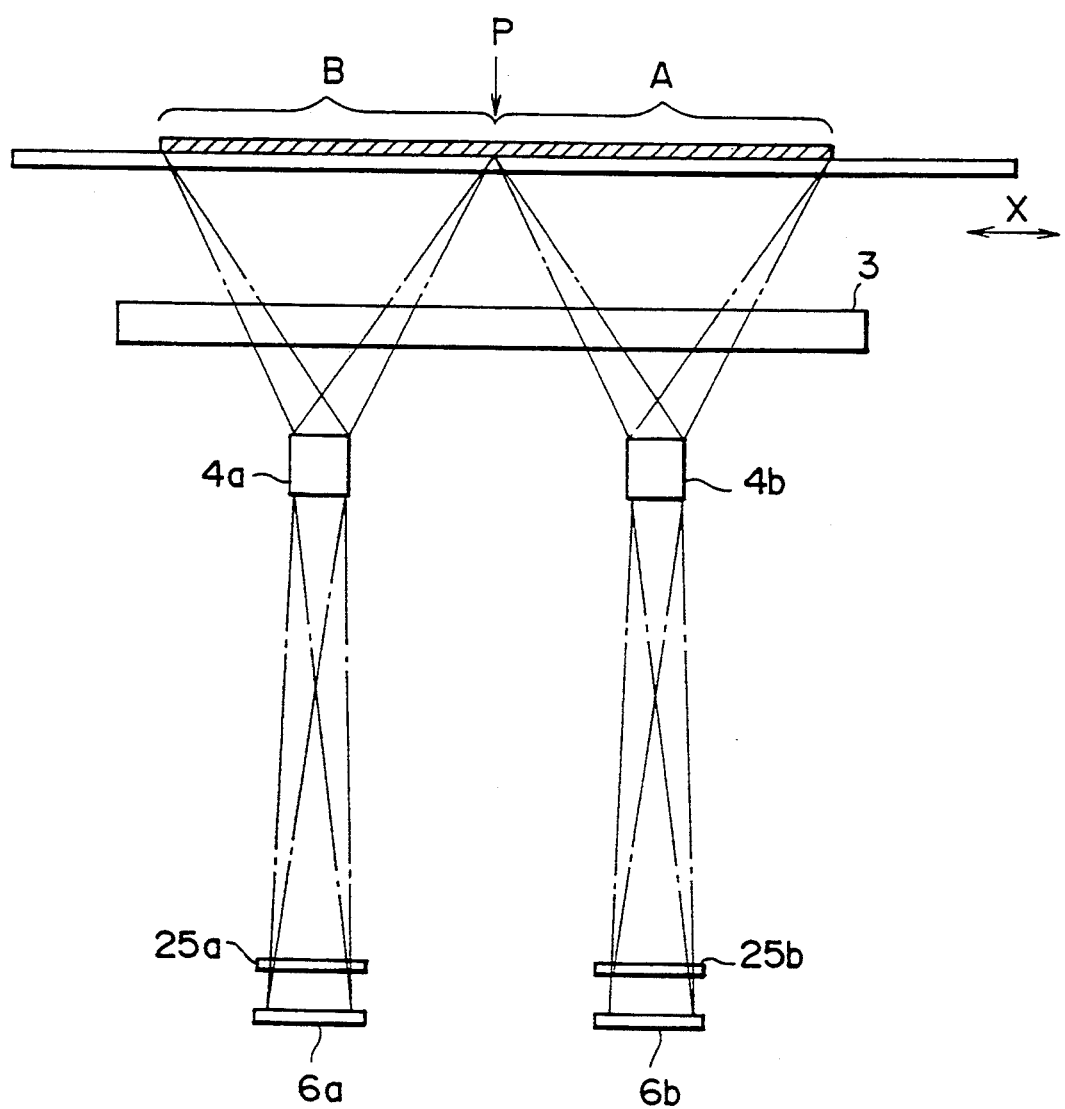

FROM CONTROLLER 30

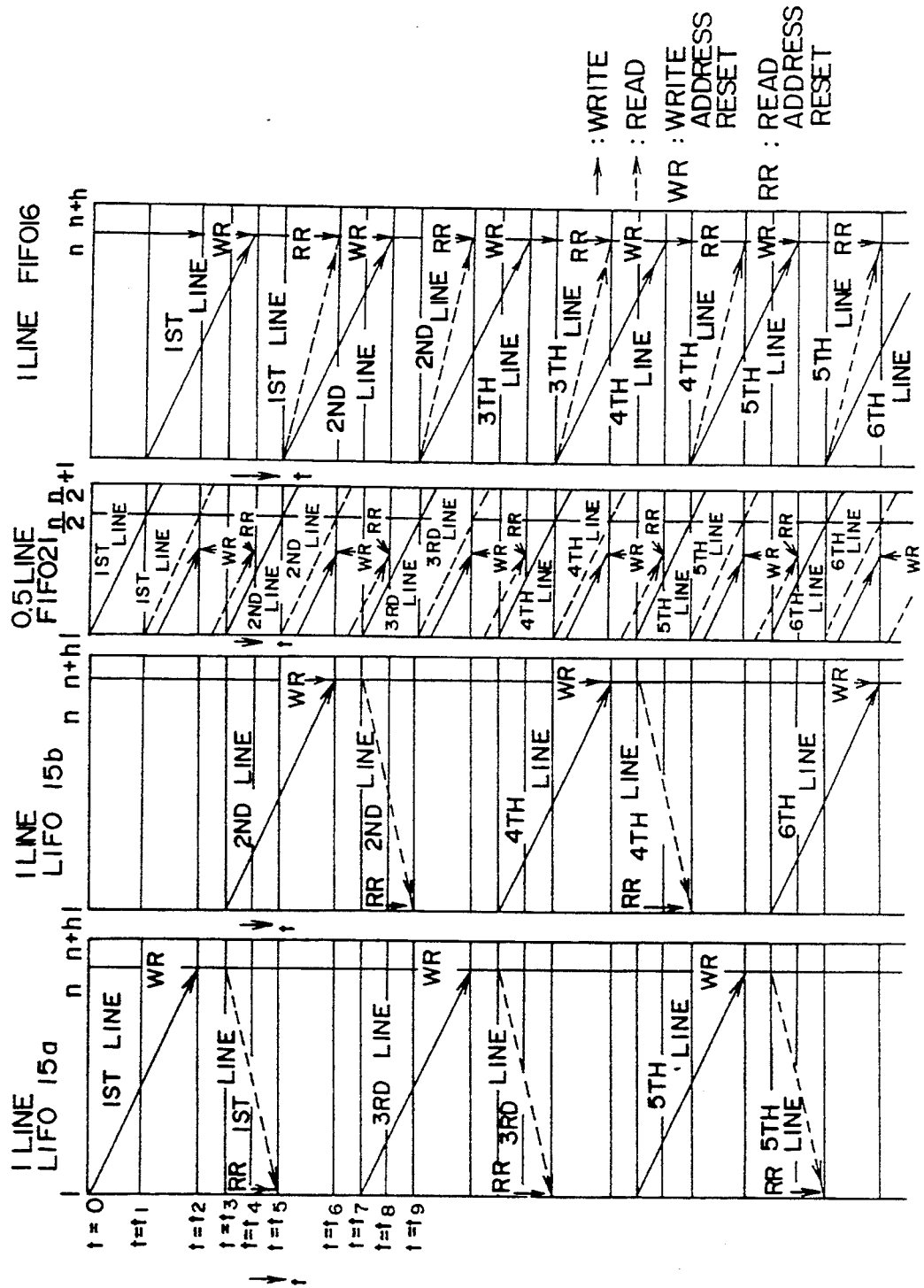
F I G. 45

IMAGE READER HAVING PHOTOELECTRIC CONVERSION LINE SENSORS

BACKGROUND OF THE INVENTION

1. Field of the Invention

The present invention generally relates to image readers, and more particularly to an image reader having photoelectric conversion line sensors.

2. Description of the Prior Art

Recently, there has been a requirement for photoelectric conversion scanners capable of reading images at high speed with precision. CCD (Charge-Coupled Device) line sensors are suitable for such high-speed, high-precision photoelectric conversion scanners.

Japanese Patent Publication No. 1-53538 discloses an image reader using CCD line sensors. An original to be optically read is divided into a plurality of read areas. A plurality of CCD line sensors, which are respectively provided for the read areas, are arranged in a main scanning direction. Use of a plurality of CCD line sensors is intended to enable reading of the images of the original at high speed and with high read density.

However, the image reader disclosed in the publication has the following disadvantages. All pixel information of the CCD line sensors are read and simply joined together so that pixel information along a line in the main scanning direction can be produced. Hence, the read operation cannot be efficiently performed. The pixel information output from the CCD line sensors contains unnecessary information, particularly, when the original has a size smaller, in the main scanning direction, than the length of the line arrangement of the CCD line sensors.

SUMMARY OF THE INVENTION

It is an object of the present invention to provide an image reader using a plurality of CCD line sensors in which pixel information concerning an original to be optically read can be efficiently produced.

This object of the present invention is achieved by an image reader including a light source projecting a light onto an original, and first and second photoelectric conversion elements arranged so that the first photoelectric conversion element reads first half of the original in a scanning direction and the second photoelectric conversion element reads second half thereof and that a first read signal of the first half of the original is transferred, starting from a center of the original, from the first photoelectric conversion element and a second read signal of the second half of the original is transferred, starting from the center, from the second photoelectric conversion element, An imaging lens projects a reflected light reflected by the original onto the first and second photoelectric conversion elements. A driver circuit drives the first and second photoelectric conversion elements. A signal processing unit processes the first and second read signals so that a finalized read signal containing information on pixels arranged in the scanning line is generated each time the original is scanned in the scanning direction.

BRIEF DESCRIPTION OF THE DRAWINGS

Other objects, features and advantages of the present invention will become more apparent from the following detailed description when read in conjunction with the accompanying drawings, in which:

FIG. 12 is a diagram showing how color filters each having the structure shown in FIG. 11 are used;

FIG. 19 is a diagram of a color separation prism used in the seventh variation of the present invention;

FIGS. 20A and 20B are diagrams showing an eighth variation of the first embodiment of the present invention;

FIG. 21 is a diagram showing a first variation of the structure shown in FIG. 20A;

FIGS. 45 and 46 are diagrams showing the operation of the configuration shown in FIG. 44;

DESCRIPTION OF THE PREFERRED EMBODIMENTS

Figure 1:
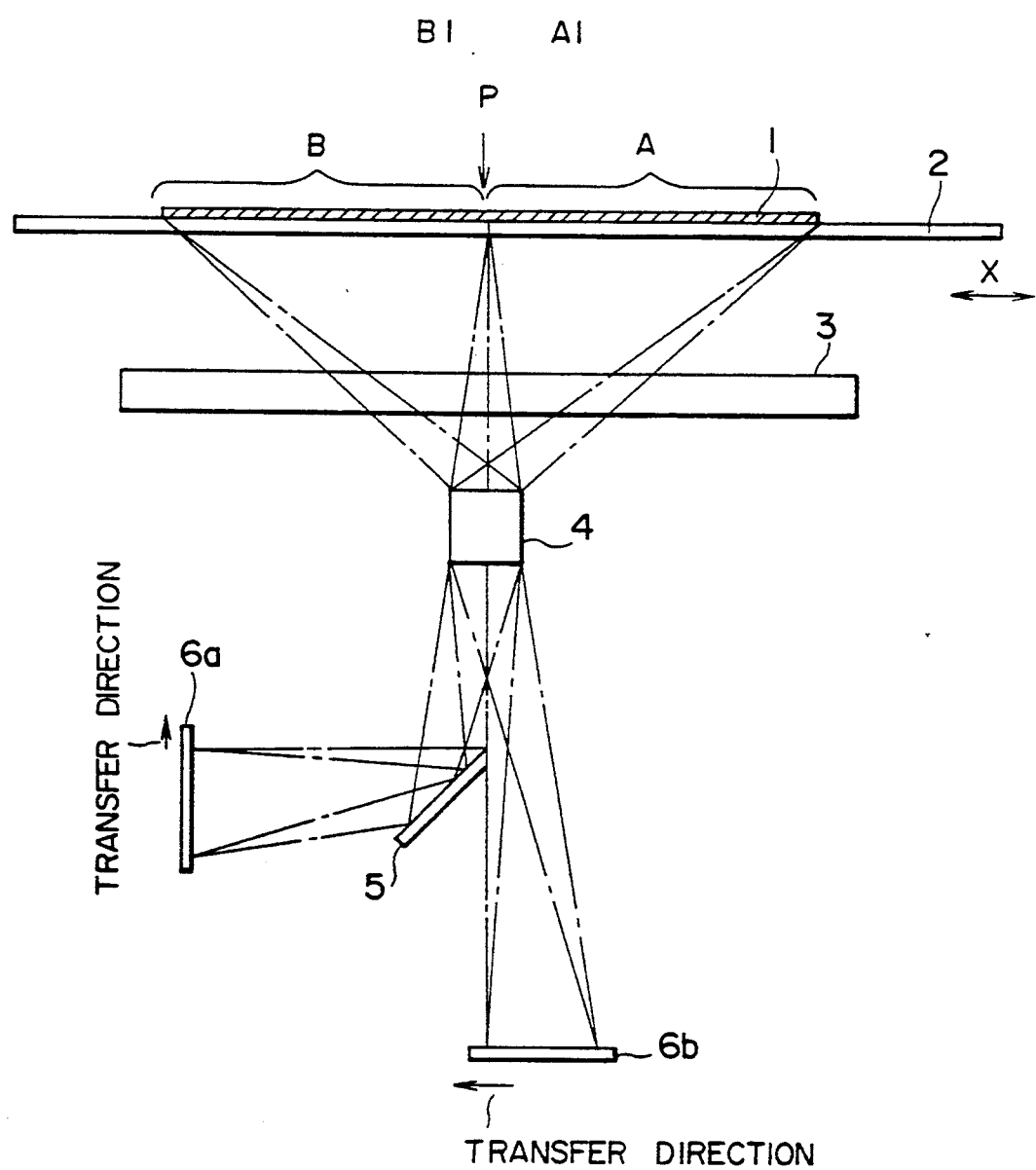
FIG. 1 is a diagram showing an optical system of a first embodiment of the present invention.
Figure 2:
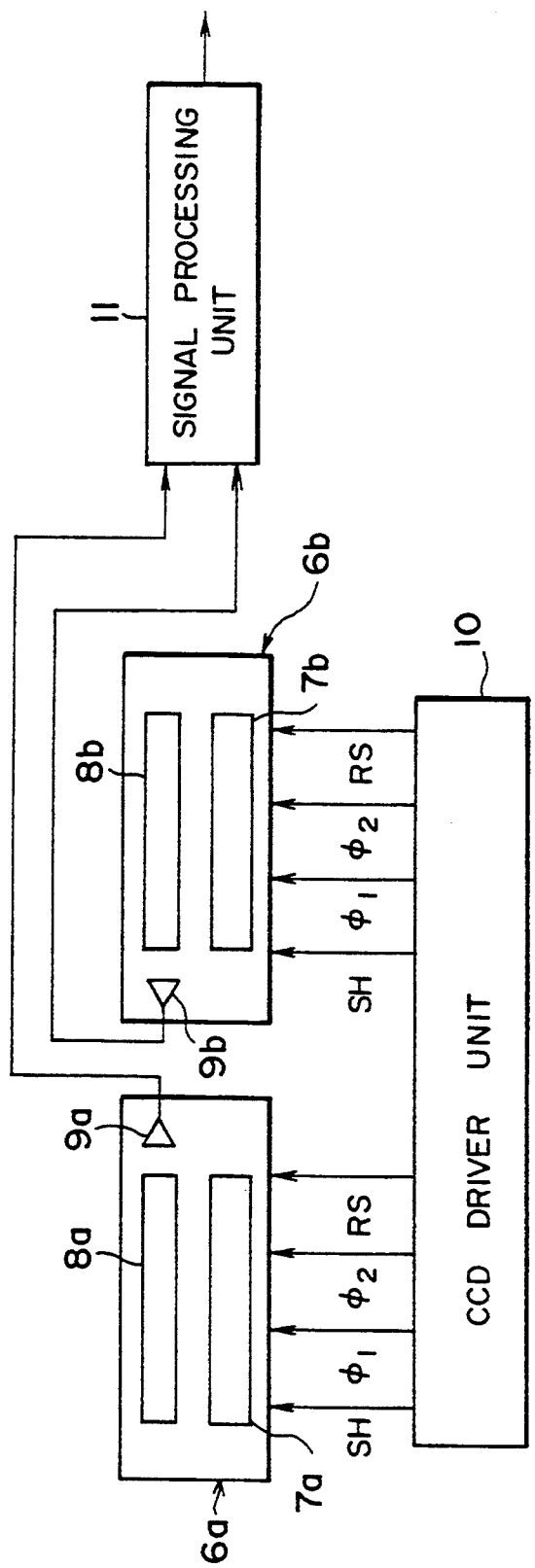
FIG. 2 is a diagram showing CCD line sensors, and their peripheral circuits, used in the first embodiment of the present invention.
Figure 3:
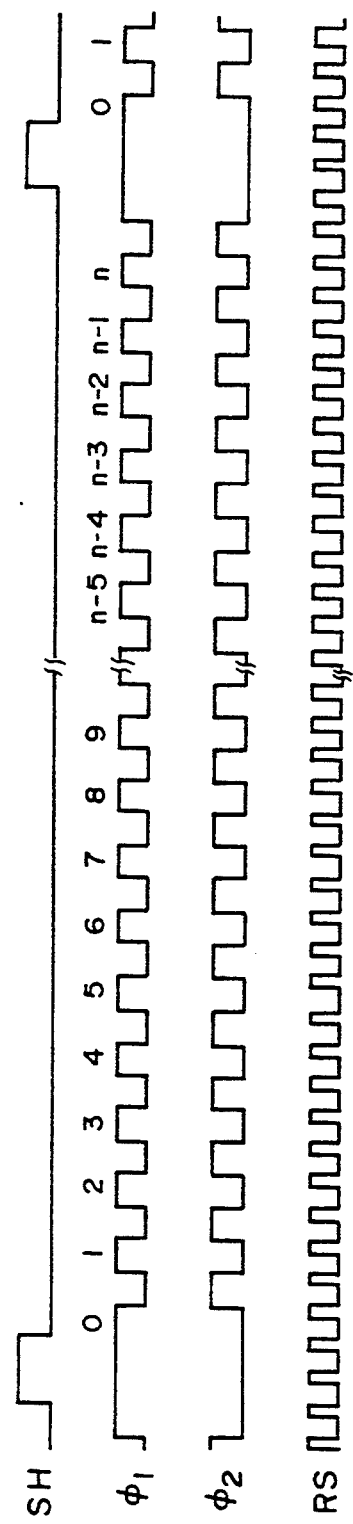
FIG. 3 is a waveform diagram showing the operation of the first embodiment of the present invention.

A description will now be given, with reference to FIGS. 1 through 3, of a first embodiment of the present invention. Referring to FIGS. 1 and 2, an image reader of the first embodiment of the present invention is configured as follows. An original 1 is placed on a contact glass plate 2. A light source 3 for illuminating the original 1 extending in a main scanning direction X is disposed below the glass plate 2. An imaging lens 4 is disposed below the light source 3, and converges light reflected by the original 1. A mirror 5 is arranged in a light path extending downwardly from the imaging lens 4 so that a part of the light path is interrupted. A CCD line sensor 6a is placed in a light path along which light reflected by the mirror 5 travels. A CCD line sensor 6b is placed in a light path along which light going straight from the imaging lens, without being reflected by the mirror 5 travels.

The original is divided into two original areas in the main scanning direction X. The CCD line sensor 6a optically reads the original are A (right side), and the CCD line sensor 6b optically reads the original area B (left side).

FIG. 2 shows the CCD line sensors 6a and 6b and their peripheral circuits. As shown in FIG. 2, the CCD line sensors 6a and 6b comprise photodiode arrays 7a and 7b, CCD shift registers 8a and 8b, and output units 9a and 9b, respectively. A CCD driver unit 10 drives the CCD line sensors 6a and 6b. A signal processing unit 11 processes output signals of the CCD line sensors 6a and 6b in a manner to be described in detail later. The CCD line sensors 6a and 6b, and the mirror 5 are supported by a carriage, which is moved in a sub-scanning direction by means of a movement mechanism (neither the carriage nor the movement mechanism shown for the sake of simplicity).

The photodiode array 7a of the CCD line sensor 6a receives, on its right side, light reflected by a center portion close to a center P (FIG. 1) of the original 1. It will be noted that the right side portion of the photodiode array 7a shown in FIG. 2 is oriented upwardly in FIG. 1. The photodiode array 7b of the CCD line sensor 6b receives, on its left side, light reflected by a center portion closed to the center P. It will be noted that the left side portion of the photodiode array 7b is oriented leftwardly in FIG. 1. Pixel information generated by the photodiode array 7a is transferred to the signal processing unit 11, starting from pixel information concerning the center P of the original 1. Similarly, pixel information generated by the photodiode array 7b is transferred to the signal processing unit 11, starting from pixel information concerning the center P. That is, the optical area A is scanned in a direction indicated by an arrow shown in FIG. 1, and the original area B is scanned in a direction indicated by an arrow shown in FIG. 1. In this manner, center portions of the original 1 are read first by the CCD line sensors 6a and 6b, and peripheral portions thereof are read last thereby.

Figure 4:
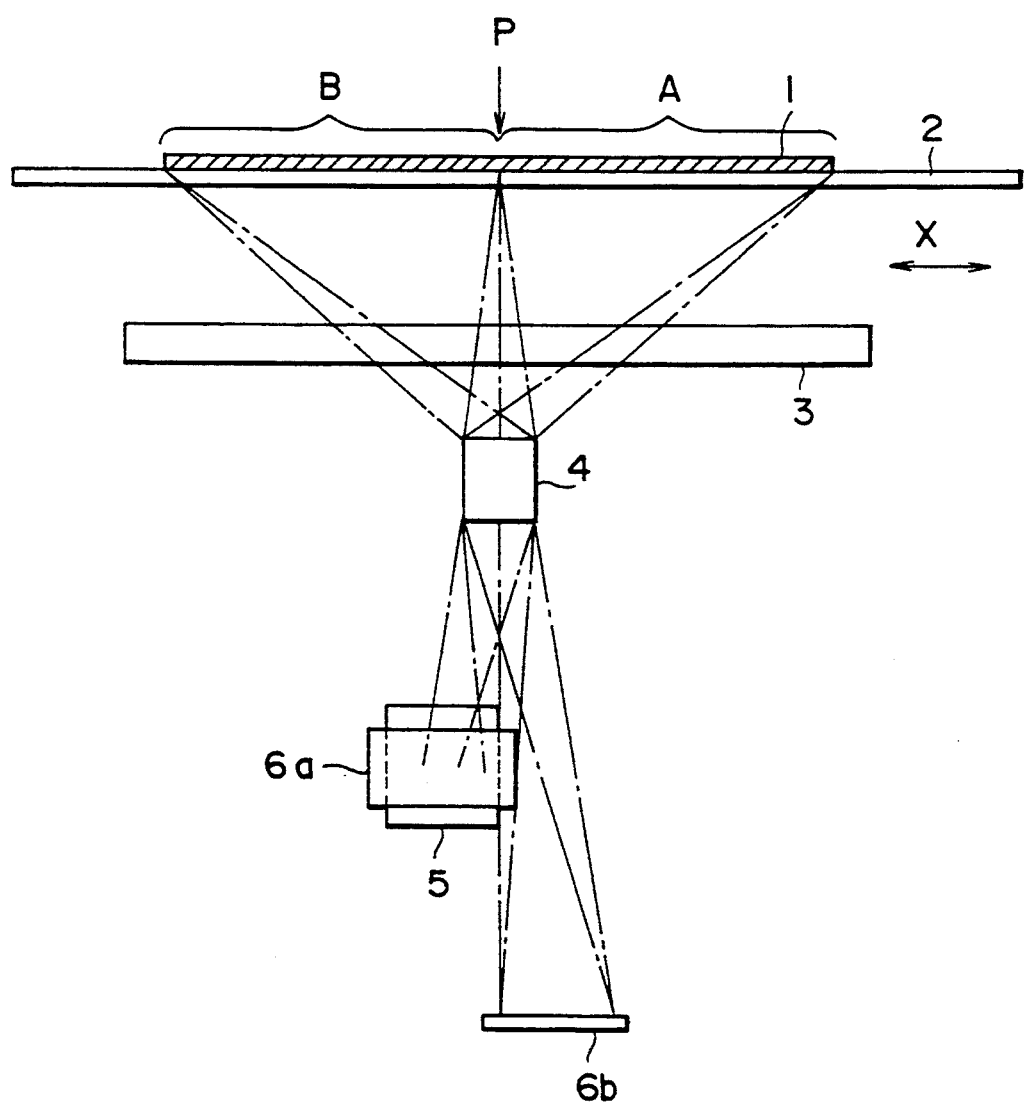
FIG. 4 is a diagram showing a first variation of the first embodiment of the present invention.

More specifically, the document 1 is scanned so that a line of light is formed on the document 1 in the main scanning direction X. The light reflected by the original area A passes through the imaging lens 4, and is then reflected by the mirror 5. Then, the reflected light forms an image on the CCD line sensor 6a. The light reflected by the original area B passes through the imaging lens 4, and forms an image on the CCD line sensor 6b. As shown in FIG. 2, the CCD line sensors 6a and 6b convert the respective light signals into corresponding electric signals. As shown in FIGS. 3 and 4, charges stored in the photodiode arrays 7a and 7b are transferred in parallel to the CCD shift registers 8a and 8b in response to shift pulses SH generated by the CCD driver 10, respectively. The CCD shift registers 8a and 8b transfer the respective charges in response to shift clock signals $\phi_1$ and $\phi_2$ generated by the CCD driver 10. The charges stored in the photodiode arrays 7a and 7b are cleared in response to reset pulses RS generated by the CCD driver 10. In this manner, the CCD line sensors 6a and 6b are simultaneously driven by the CCD driver 10.

In the above-mentioned manner, it becomes possible to read one line in the main scanning direction X at a speed twice that obtained when a single CCD line sensor is used in a manner such that the driving frequency of each of the CCD line sensors 6a and 6b is equal to that of the single CCD line sensor, and the reading density of the first embodiment is equal to that obtained by using the single CCD line sensor. Alternatively, when the driving frequency of each of the CCD line sensors 6a and 6b is equal to that of the single CCD line sensor, and the reading speed necessary for reading one line according to the first embodiment is equal to that obtained by using the single CCD line sensor, the reading density obtained by the first embodiment is twice that obtained by the single CCD line sensor.

The signal processing unit 11 executes a predetermined processing for joining together the output signals of the CCD line sensors 6a and 6b in order to generate pixel information concerning a line in the main scanning direction, a shading correction process and so on. The signal processing unit 11 will be described in more detail later.

FIG. 4 shows a first variation of the structure shown in FIG. 1. The mirror 5 shown in FIG. 4 cuts a part of the light from the imaging lens 4 and reflects the remaining part thereof. The reflected light travels along a path orthogonal to the main scanning direction X.

Figure 5:
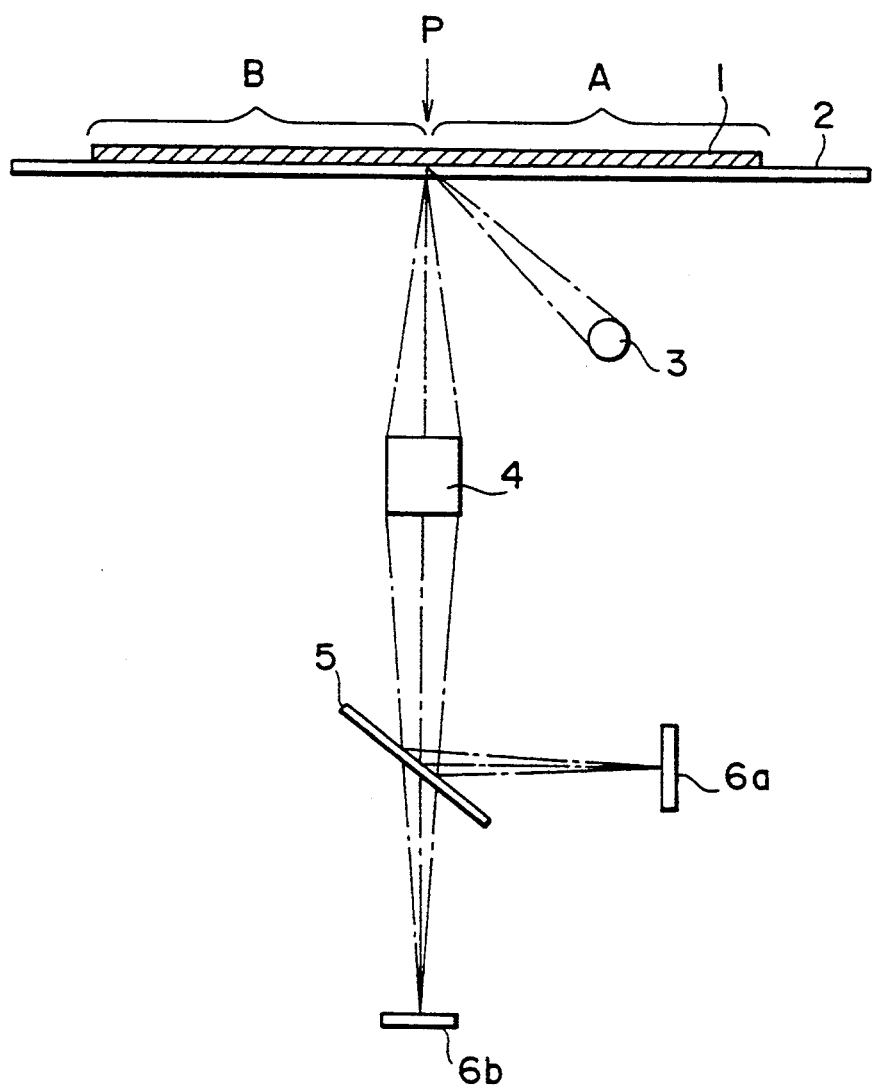
FIG. 5 is a diagram showing a second variation of the first embodiment of the present invention.
Figure 6:
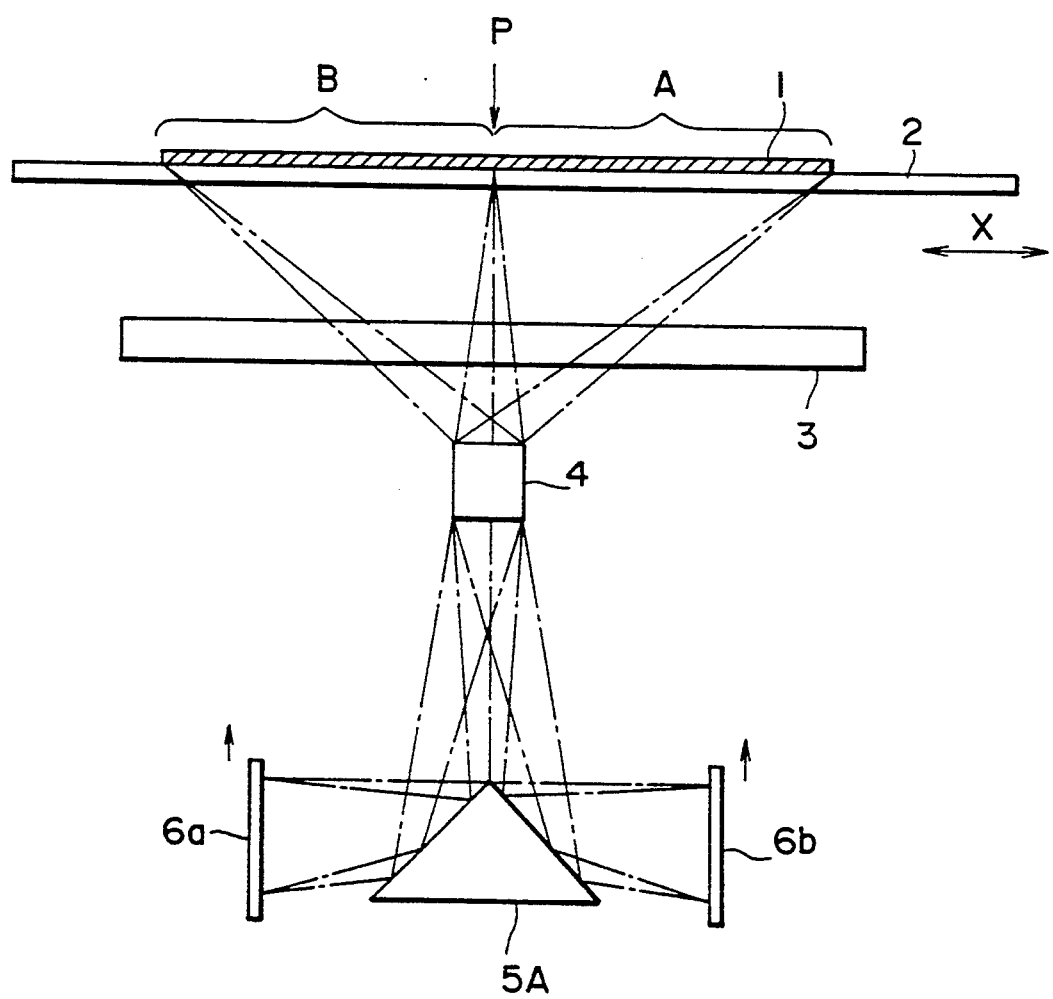
FIG. 6 is a diagram showing a third variation of the first embodiment of the present invention.
Figure 7:
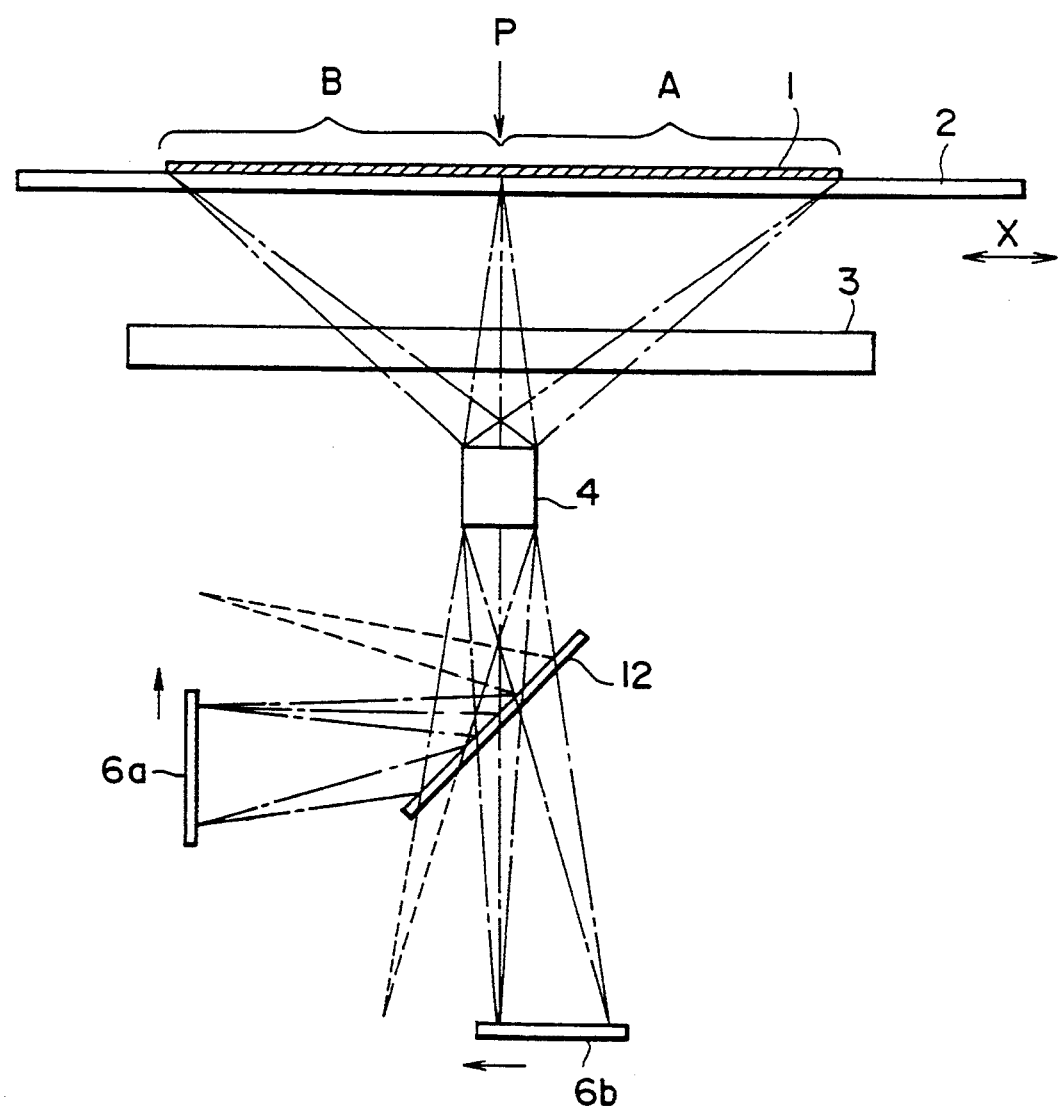
FIG. 7 is a diagram showing a fourth variation of the first embodiment of the present invention.

FIG. 5 shows a second variation of the structure shown in FIG. 1. The mirror 5 shown in FIG. 5 is a semi-transparent mirror, which has the function of allowing light to pass and of reflecting light. FIG. 6 shows a third variation of the structure shown in FIG. 1. In FIG. 6, a roof or pyramid-shaped mirror 5A is substituted for the mirror 5. FIG. 7 shows a fourth variation of the structure shown in FIG. 1. The fourth variation uses a semi-transparent mirror 12 in lieu of the mirror 5.

Figure 8:
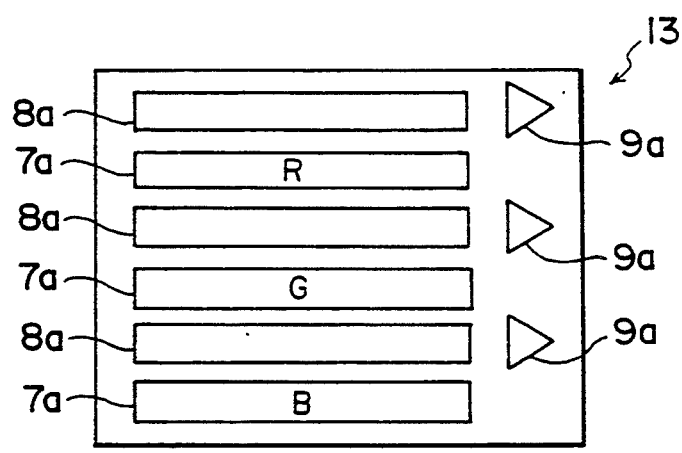
FIG. 8 is a diagram showing a first variation of the CCD line sensors shown in FIG. 2.

FIG. 8 shows a first variation of the CCD line sensor 6a shown in FIG. 2. The first variation shown in FIG. 8 is for use in color reading. A CCD line sensor 13 shown in FIG. 8 comprises three photodiode arrays 7a respectively for R (red), G (green) and B (blue), three CCD shift registers 8a, and three output units 9a. On the three photodiode arrays 7a, there are provided three filters (not shown) respectively for R, G and B. The CCD line sensor 13 shown in FIG. 8 separates light into R, G and B in three respective lines, so that color reading is possible. When the CCD line sensor 13 is used in the same manner as shown in FIG. 1, the same advantages as obtained therein are still obtained. It will be noted that a color read CCD line sensor corresponding to the CCD line sensor 6b is configured similarly.

Figure 9:
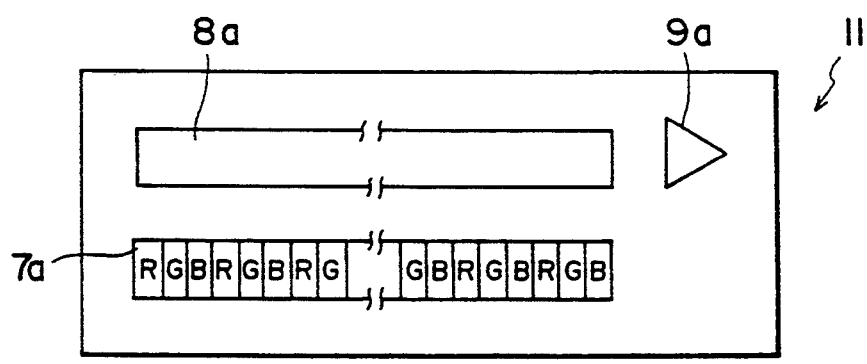
FIG. 9 is a diagram showing a second variation of the CCD line sensors shown in FIG. 2.

FIG. 9 shows a second variation of the CCD line sensor 6a shown in FIG. 2. A CCD line sensor 14 shown in FIG. 9 separates light into R, G and B in one line. As shown in FIG. 9, filters for colors R, G and B are periodically arranged on the photodiode array 7a. A one-line color read CCD line sensor corresponding to the CCD line sensor 6b is configured similarly.

Figure 10:
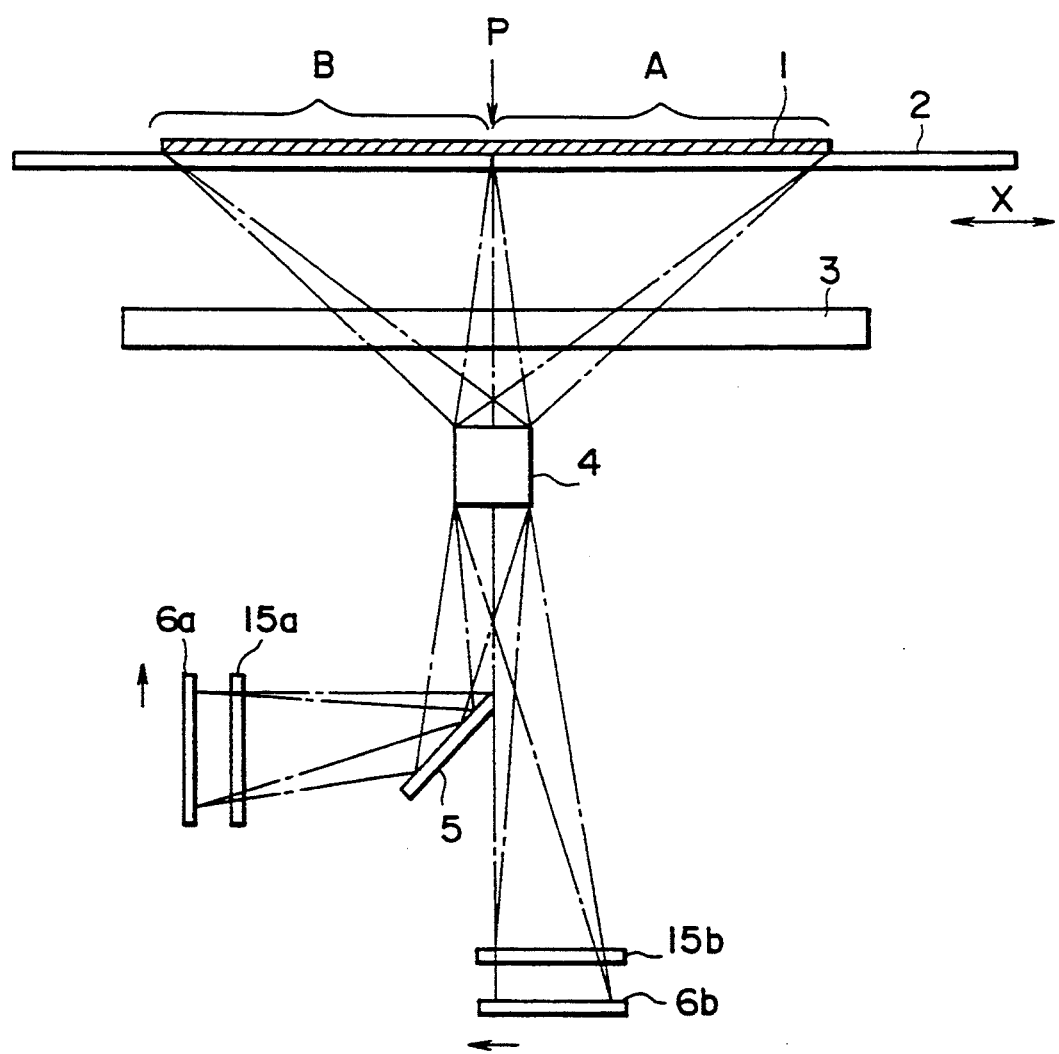
FIG. 10 is a diagram showing a fifth variation of the first embodiment of the present invention.
Figure 11:
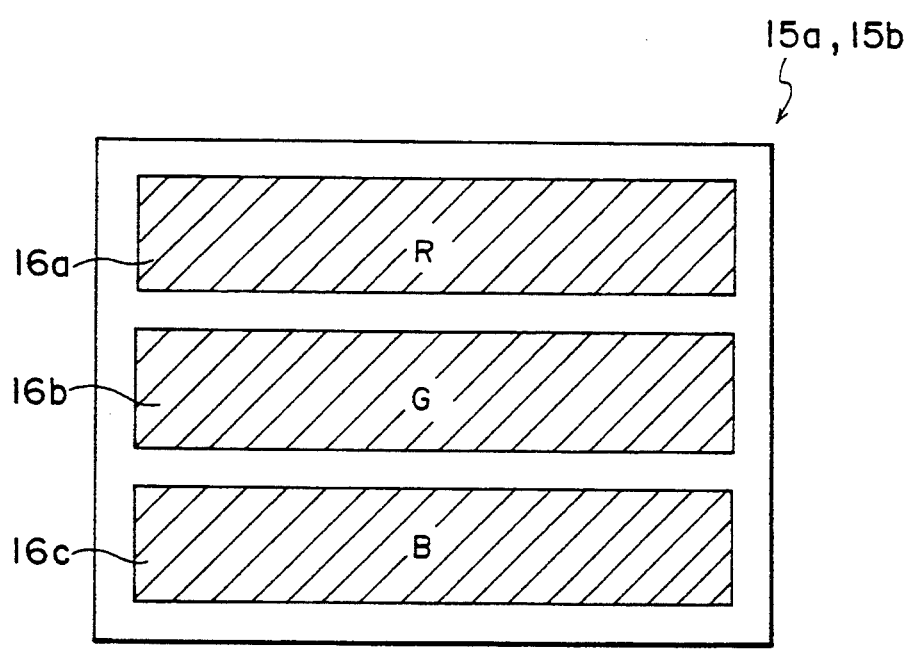
FIG. 11 is a diagram showing a color filter used together with each CCD line sensor.

FIG. 10 shows a fifth variation of the structure shown in FIG. 1. Referring to FIG. 10, color filters 15a and 15b are respectively disposed in light paths in front of the CCD line sensors 6a and 6b. FIG. 11 shows each of the color filters 15a and 15b. The color filters 15a and 15b each have a red filter 16a, a green filter 16b and a blue filter 16c. As shown in FIG. 12, the color filters 15a and 15b are connected to a filter switching unit 17, which drives the color filters 15a and 15b.

First, the light reflected by the original 1 is made to pass through the red filters 16a of the color filters 15a and 15b, and is projected onto the CCD line sensors 6a and 6b. In this manner, the original 1 is scanned in the main scanning and sub-scanning directions. Pixel information concerning the original 1 is stored in the signal processing unit 11. After the original 1 is completely scanned, the color filters 15a and 15b are driven by the filter switching unit 17 so that the light reflected by the original 1 is made to pass through the green filters 16b of the color filters 15a and 15b. Then, the reflected light is projected onto the CCD line sensors 6a and 6b. In this manner, the original 1 is scanned in the main scanning and sub-scanning directions. Pixel information concerning the original 1 is stored in the signal processing unit 11. After the original 1 is completely scanned, the color filters 15a and 15b are driven by the filter switching unit 17 so that the light reflected by the original 1 is made to pass through the blue filters 16c of the color filters 15a and 15b. In this manner, the original 1 is scanned in the main scanning and sub-scanning directions. Pixel information concerning the original is stored in the signal processing unit 11. The fifth variation shown in FIGS. 12 and 13 can be applied to the structures shown in FIGS. 4 through 7.

Figure 13:
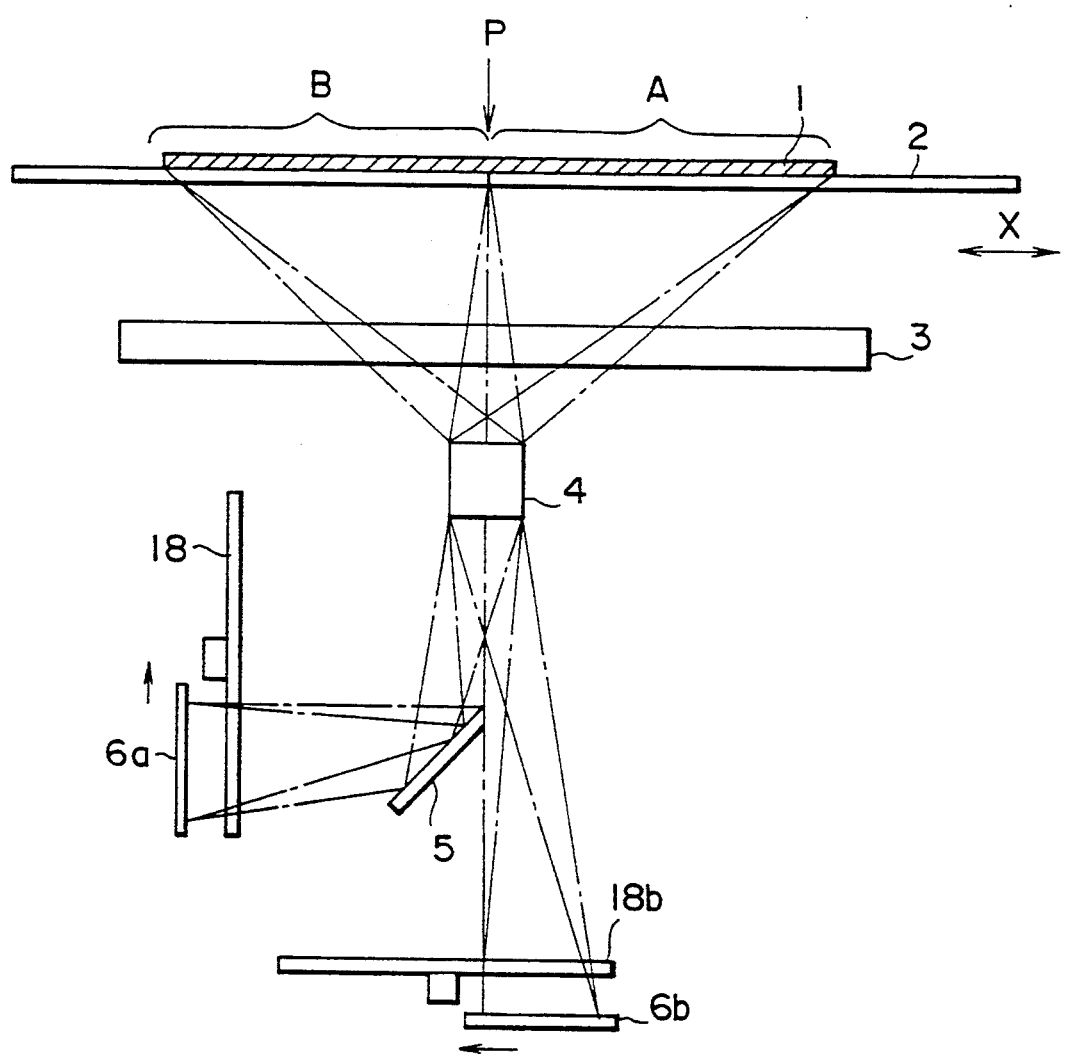
FIGS. 13, 14 and 15 are diagrams showing a sixth variation of the first embodiment of the present invention.
Figure 14:
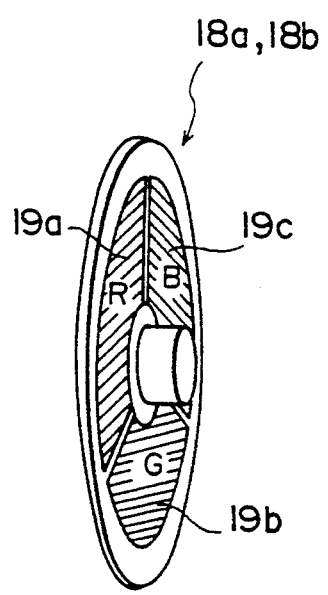
Figure 15:
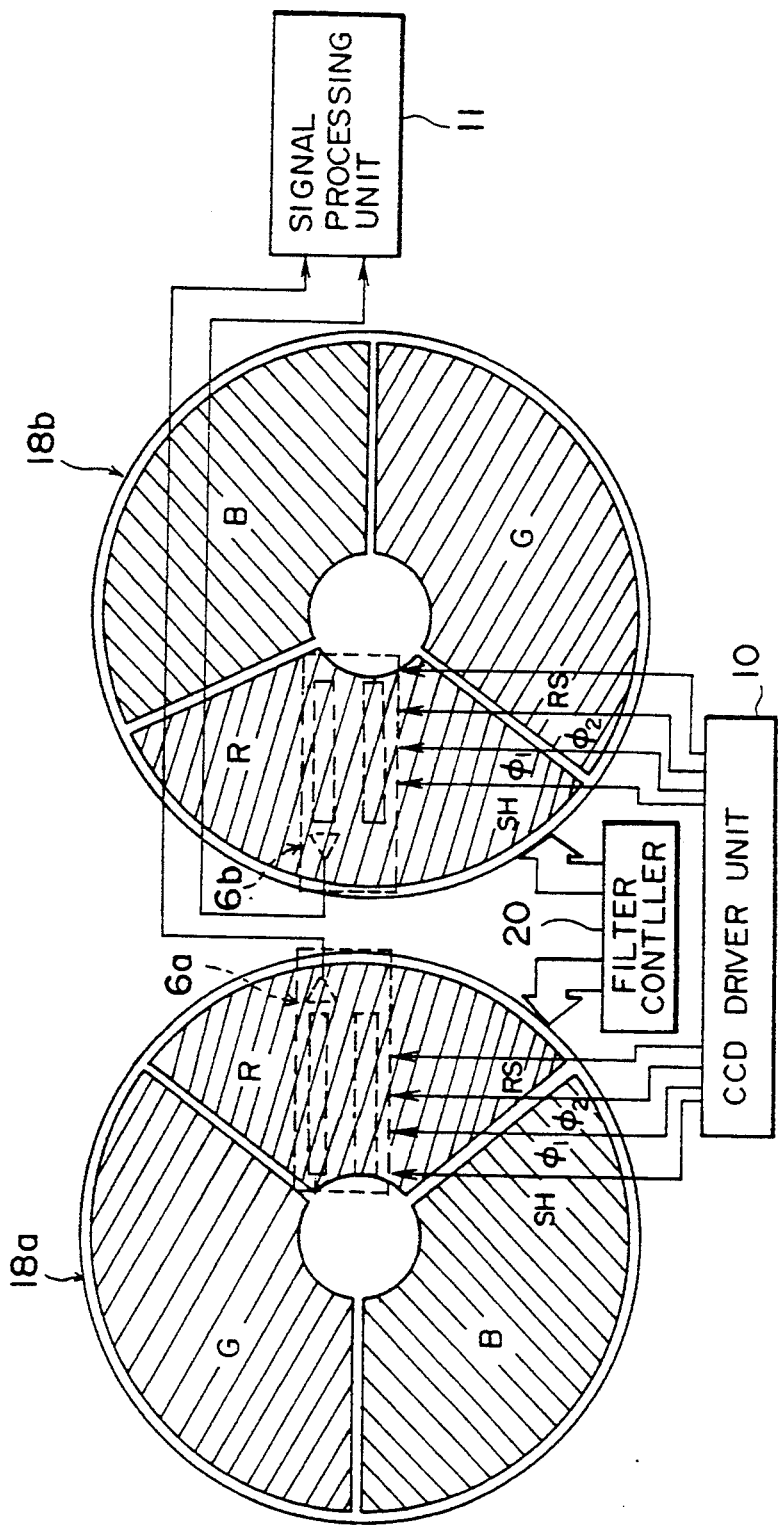

FIGS. 13 through 15 show a sixth variation of the structure shown in FIG. 1. Rotary color filters 18a and 18b are disposed in the light paths in front of the CCD line sensors 6a and 6b. FIG. 14 is a perspective view of each of the rotary color filters 18a and 18b. As shown in FIG. 14, each of the rotary color filters 18a and 18b comprises a red filter 19a, a green filter 19b, and a blue filter 19c. As shown in FIG. 15, the rotary color filters 18a and 18b are driven by means of a filter controller 20.

While the original 1 is being read by the CCD line sensors 6a and 6b, the rotary color filters 18a and 18b are being rotated. While one line on the original 1 is being read, the read filters 19a of the rotary color filters 18a and 18b are selected. While the next line on the original 1 is being read, the green filters 19b of the rotary color filters 18a and 18b are selected. While a line adjacent to the above next line is being read, the blue filters 19c of the rotary color filters 18a and 18b are selected. In this manner, the line read frequency is synchronized with the revolution speed of the rotary color filters 18a and 18b. The sixth variation shown in FIGS.

13 through 15 can be applied to the structures shown in FIGS. 4 through 7.

Figure 16:
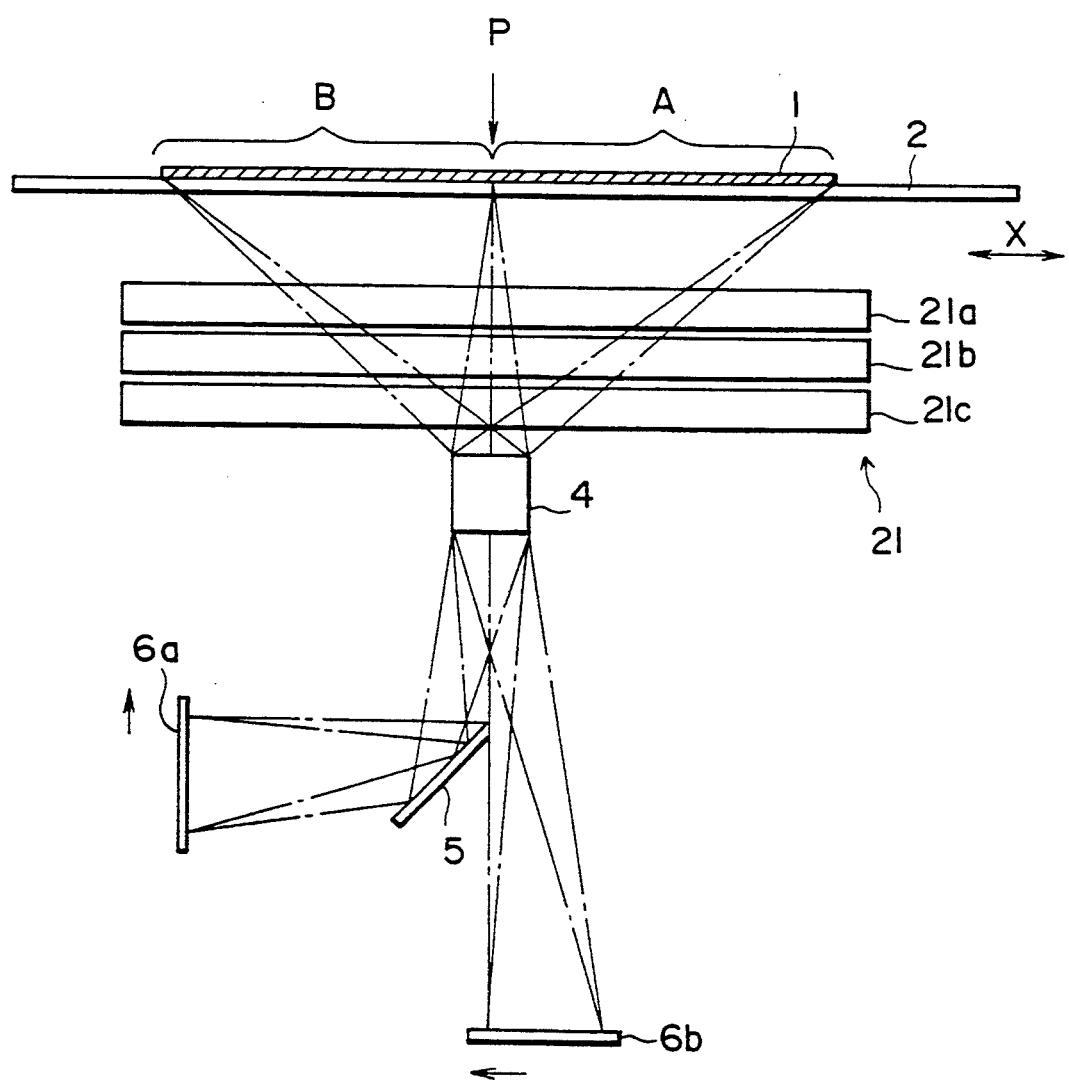
FIGS. 16, 17 and 18 are diagrams showing a seventh variation of the first embodiment of the present invention.
Figure 17:
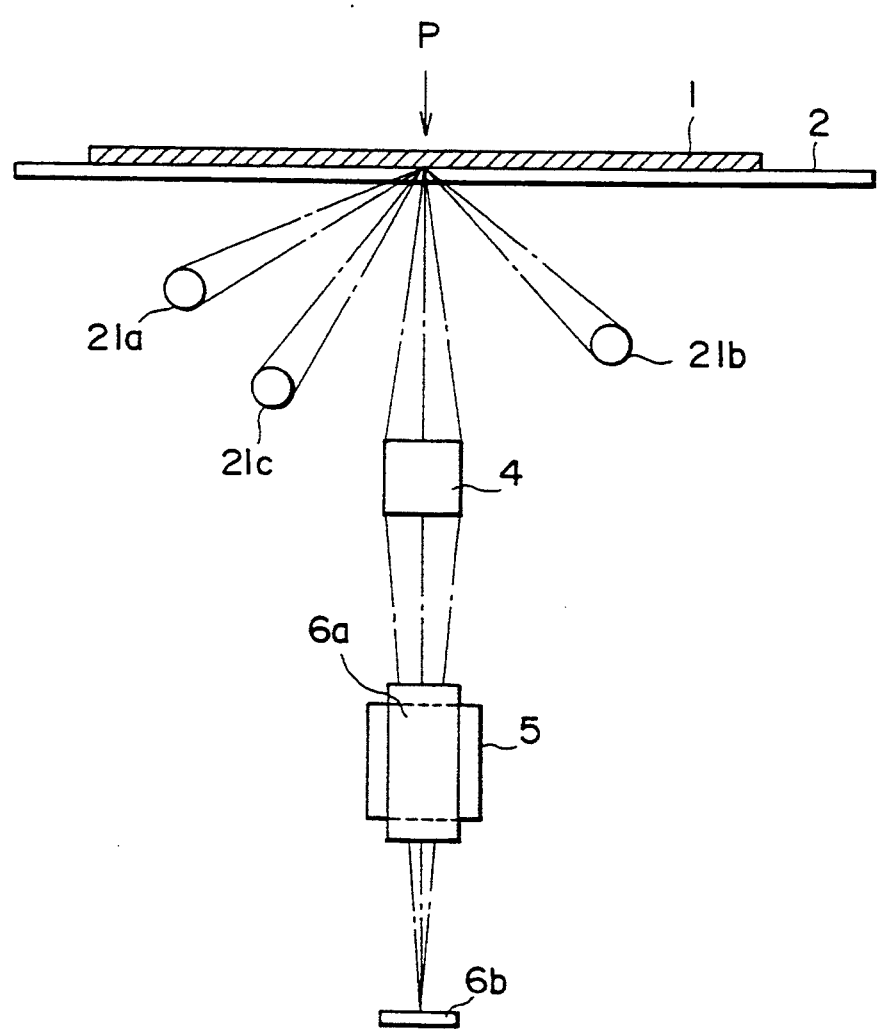
Figure 18:
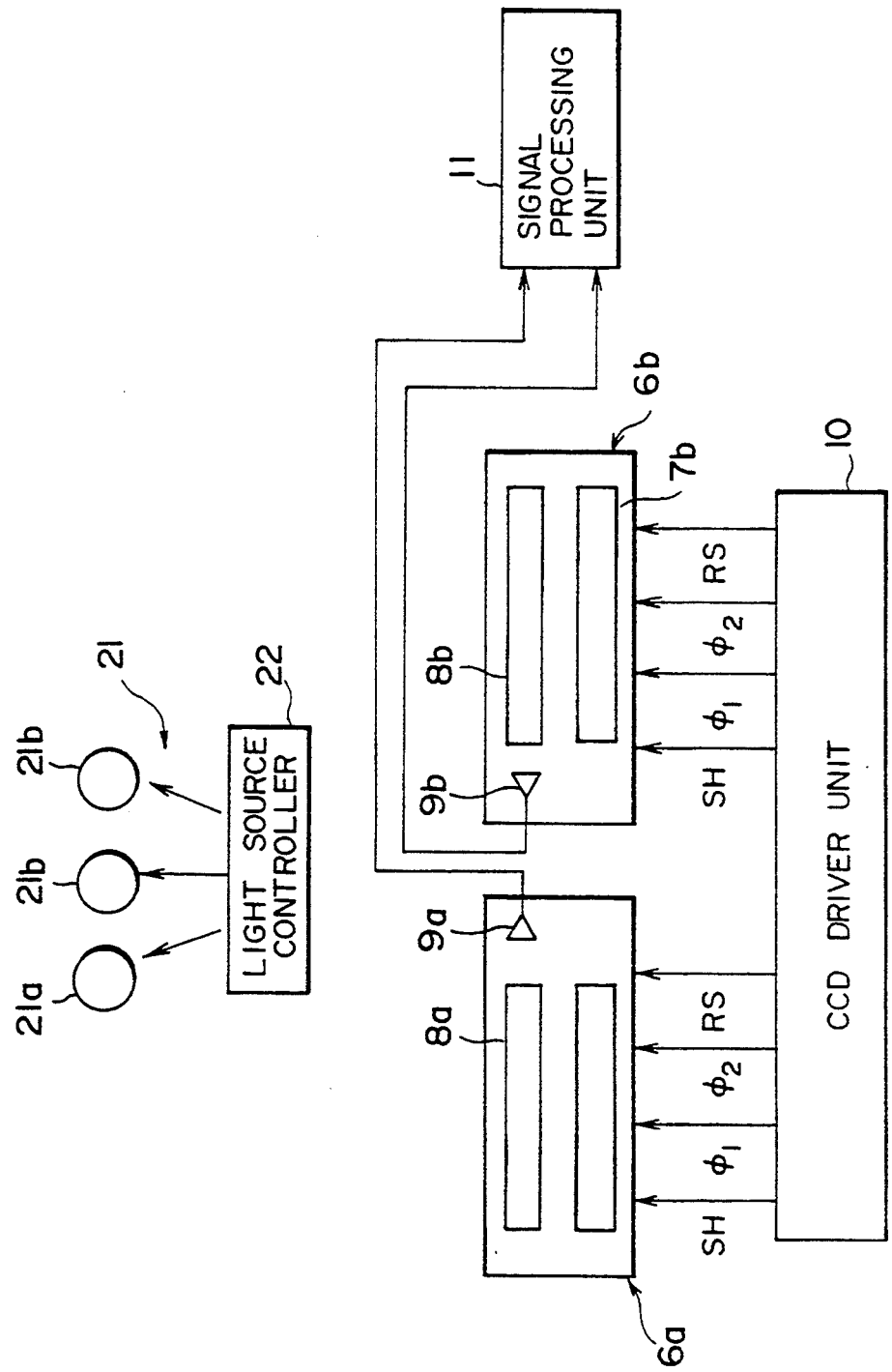

FIGS. 16 through 18 show a seventh variation of the structure shown in FIG. 1. The seventh variation shown in these figures uses a light source having a coloring function. More specifically, a light source 21 shown in FIGS. 16 through 18 comprises a red light source 21, a green light source 21b and a blue light source 21c. FIG. 17 is a view taken along the main scanning direction X. As shown in FIG. 18, the light source 21 is connected to a light source controller 22, which drives the light source 21 in the following manner. The light source controller 22 sequentially turns ON the light sources 21a, 21b and 21c in synchronism with a read frequency for one line on the original 1. Thereby, pixel information concerning three consecutive lines scanned respectively using the light sources 21a, 21b and 21c is obtained. It is also possible to scan the original 1 three times while one of the light sources 21a, 21b and 21c is sequentially selected each time the original 1 is scanned. The seventh embodiment of the present invention can be applied to the structure shown in FIGS. 4 through 7.

In a variation of the structure shown in FIG. 16, the light reflected by the original 1 and passing through the reimaging lens 4 is made to pass through a color separation prism 23 shown in FIG. 19 before the above light reaches the mirror 5. The color separation prism 23 separates white light into red, green and blue light components. Three mirrors 5 (pyramid-shaped mirrors or semi-transparent mirrors can be used) are provided for the respective light components. The mirrors 5 divide the respective light components into two parts. Each of the CCD line sensors 6a and 6b are segmented into two areas, which respectively receive the two parts of the corresponding light component. The above variations can be applied to the structures shown in FIGS. 4 through 7.

FIGS. 20A and 20B show an eighth variation of the structure shown in FIG. 1. As shown in FIGS. 20A, two imaging lenses 24a and 24b are used in place of the imaging lens 4 shown in FIG. 1. FIG. 20B is a view from the upper side of the CCD line sensors 6a and 6b. Lights reflected by the inner portions on the original 1 close to the center P are projected onto a left-side portion of the CCD line sensor 6b and onto a right-side portion of the CCD line sensor 6a, respectively.

FIG. 21 shows a first variation of the structure shown in FIG. 20A. Color filters 25a and 25b are placed in the light paths in front of the CCD line sensors 6a and 6b, respectively. Each of the color filters 25a and 25b has the same structure as that shown in FIG. 11. The color filters 25a and 25b can be driven by a filter switching unit which is the same as the aforementioned filter switching unit 17 shown in FIG. 12. The operation of the first variation shown in FIG. 21 is almost the same as that of the image reader shown in FIG. 10.

Figure 22:
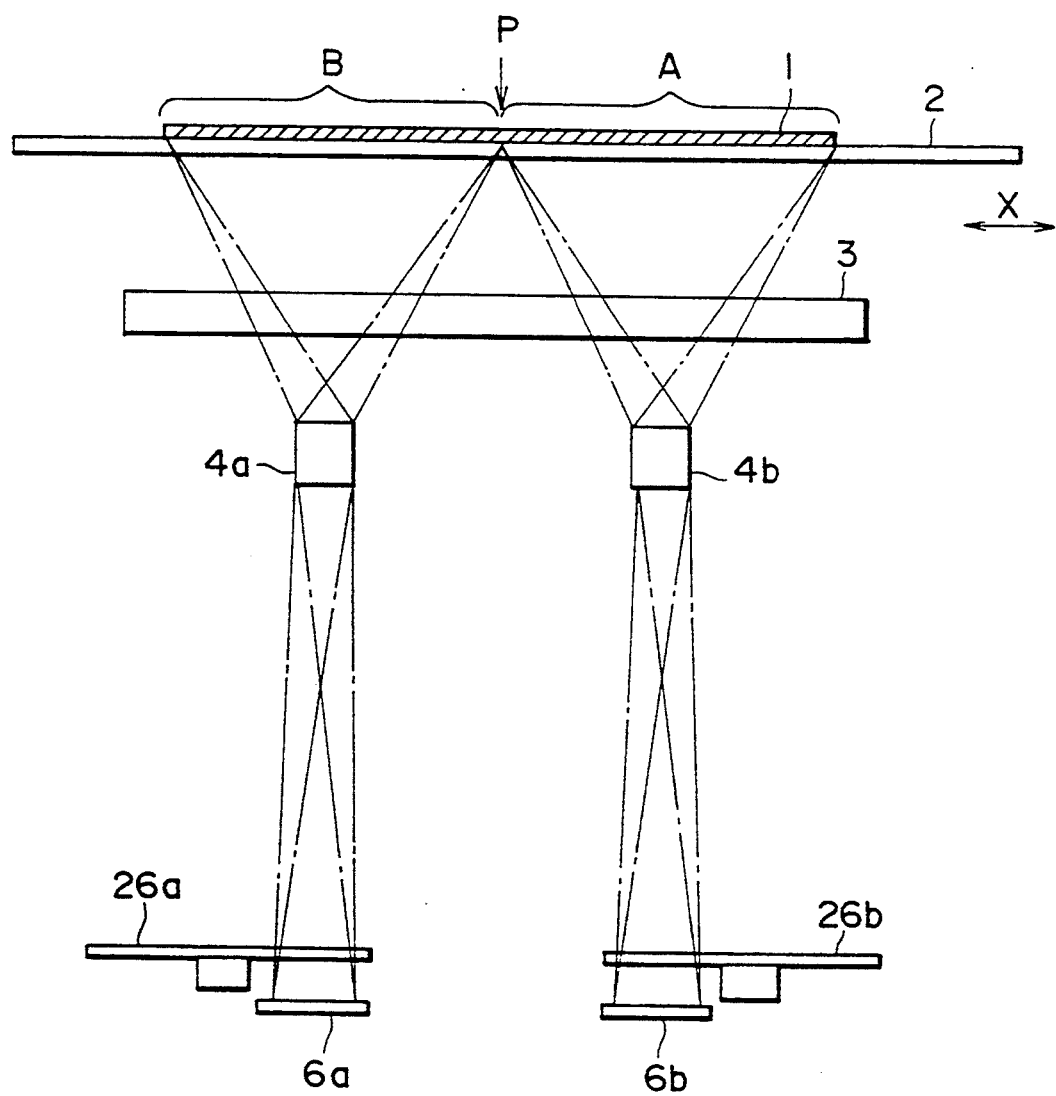
FIG. 22 is a diagram showing a second variation of the structure shown in FIG. 20A.

FIG. 22 shows a second variation of the structure shown in FIG. 20A. As shown in FIG. 22, rotary color filters 26a and 26b are disposed in the light paths in front of the CCD line sensors 6a and 6b. Each of the rotary color filters 26a and 26b is configured as shown in FIG. 14. The rotary color filters 26a and 26b are driven by a filter controller which is the same as the filter controller 20 shown in FIG. 15.

Figure 23:
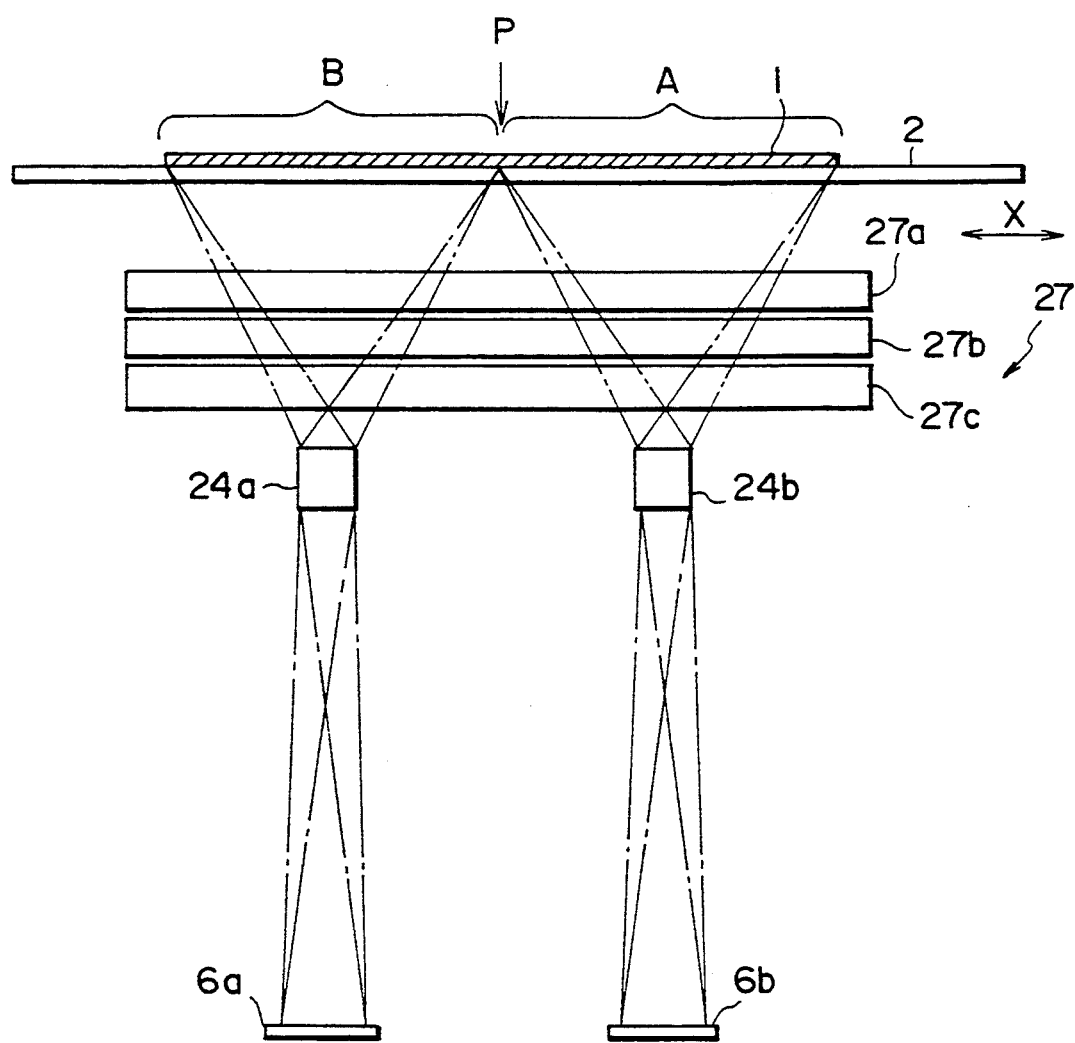
FIGS. 23 and 24 are diagrams showing a third variation of the structure shown in FIG. 20A.
Figure 24:
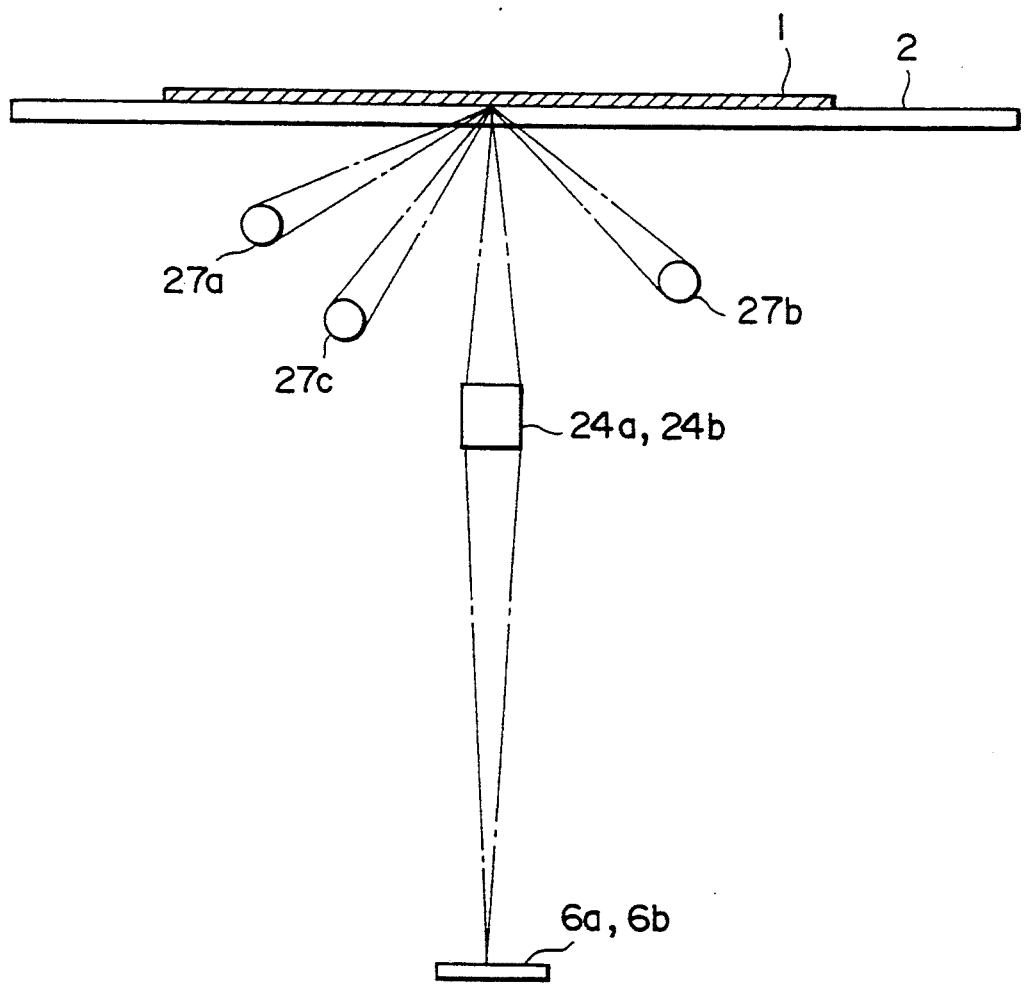

FIGS. 23 and 24 show a third variation of the structure shown in FIG. 20A. As shown in FIG. 22, a light source 27 comprising a red light source 27a, a green light source 27b, and a blue light source 27c is used in the same manner as shown in FIG. 16. The light source 27 is controlled by a light source controller which is the same as the light source controller 22 shown in FIG. 18.

Figure 25:
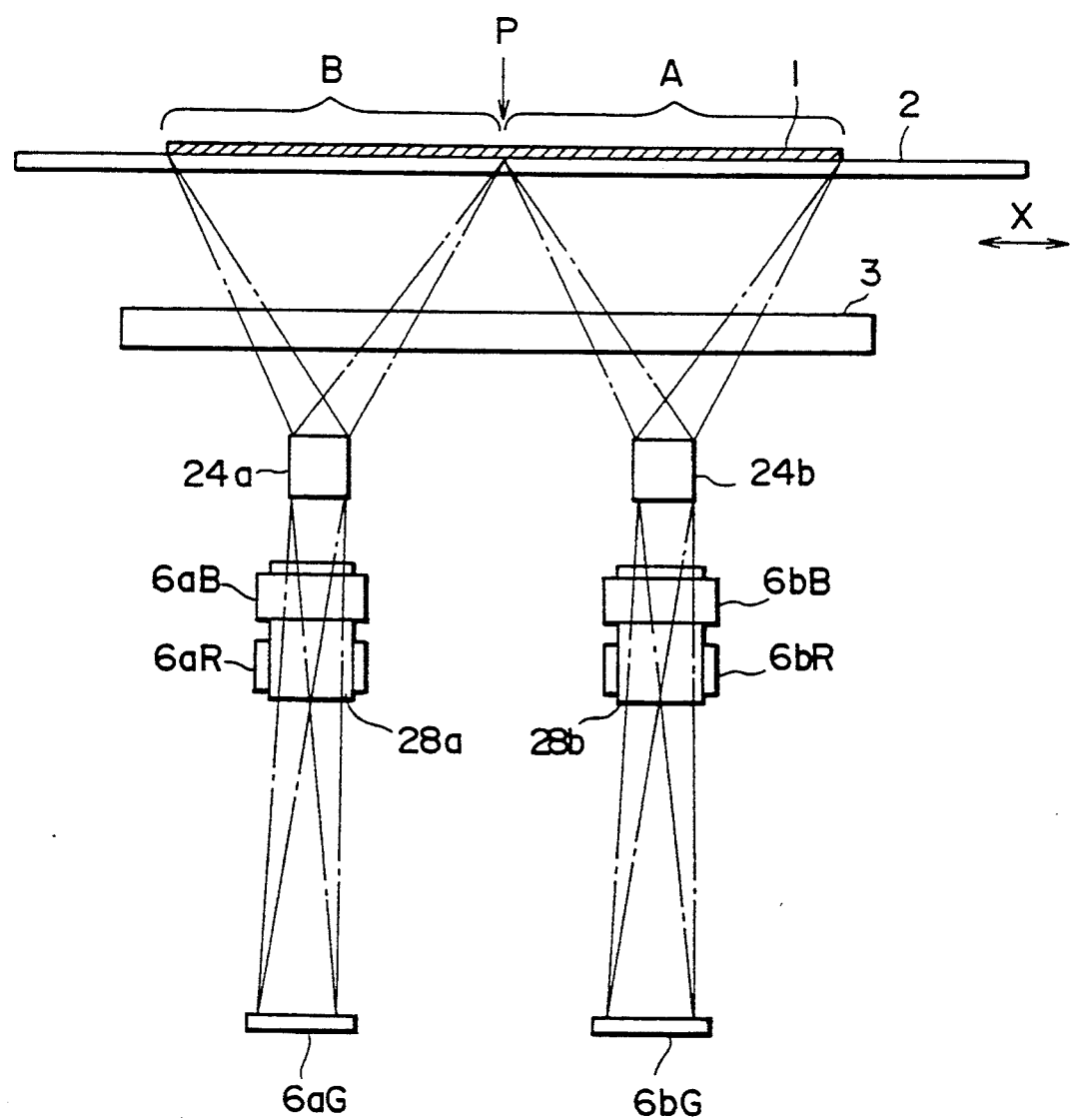
FIGS. 25 and 26 are diagrams showing a fourth variation of the structure shown in FIG. 20A.
Figure 26:
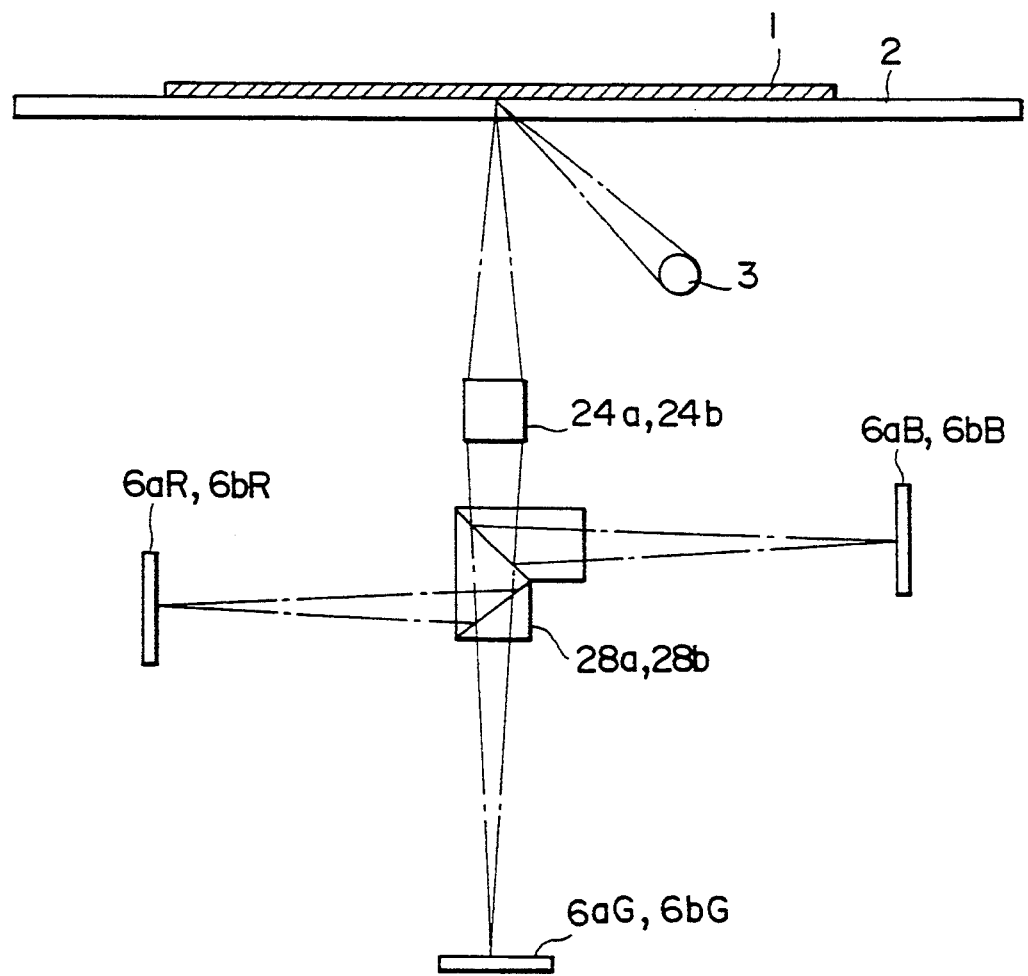

FIGS. 25 and 26 show a fourth variation of the structure shown in FIGS. 20A. FIG. 26 is a view taken along the main scanning direction X. As shown in these figures, color separation prisms 28a and 28b are provided in light paths from the imaging lenses 24a and 24b. CCD line sensors 6aR, 6aG and 6aB are placed in three light paths respectively extending from the color separation prism 28a. Similarly, CCD line sensors 6bR, 6bG and 6bB are placed in three light paths respectively extending from the color separation prism 28b. The color separation prisms 28a and 28b have the same structure as that shown in FIG. 19. Pairs of CCD line sensors 6aR and 6bR, 6aG and 6bG, and 6aB and 6bG respectively read red, green and blue image information.

Figure 27:
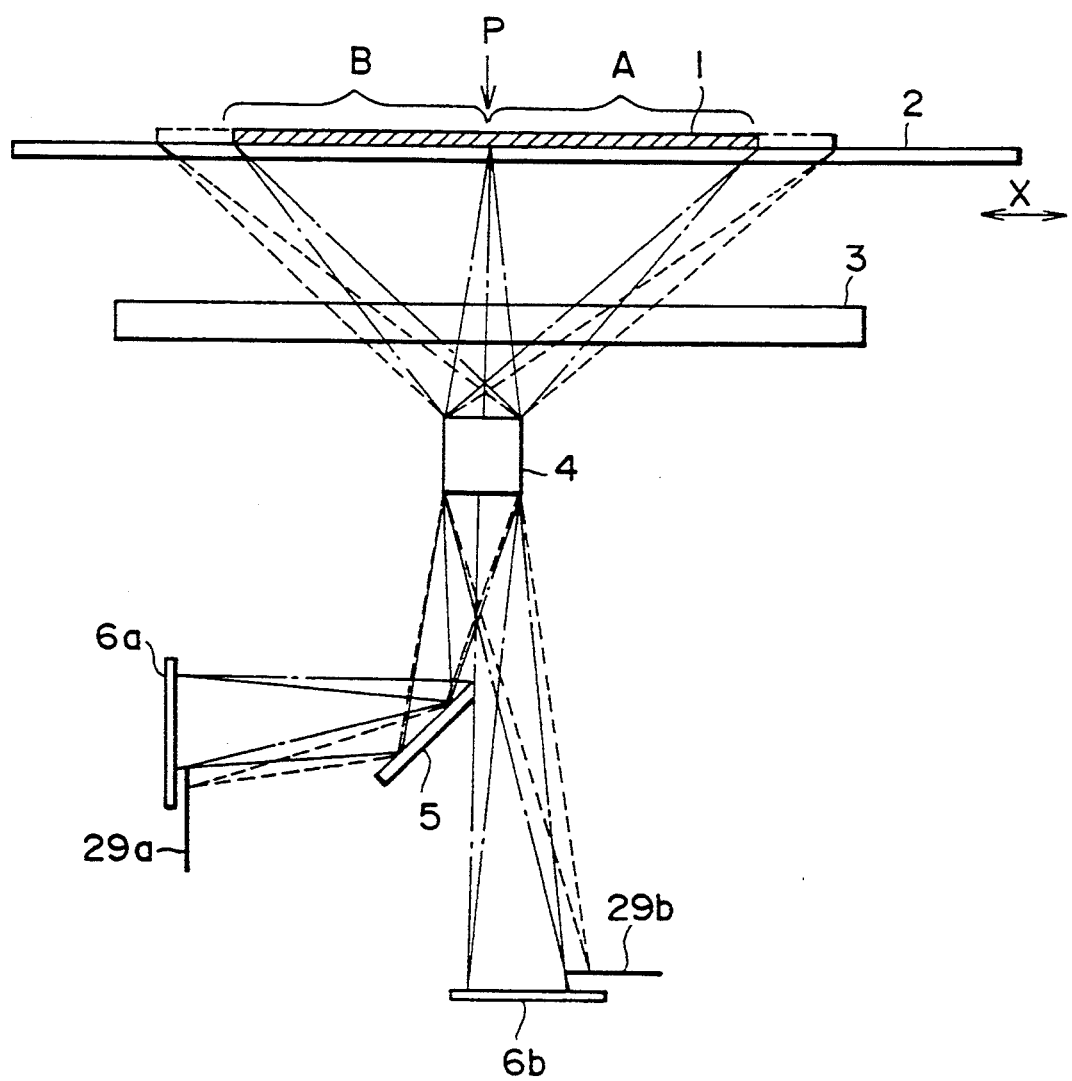
FIG. 27 is a diagram of a second embodiment of the present invention.
Figure 28A:
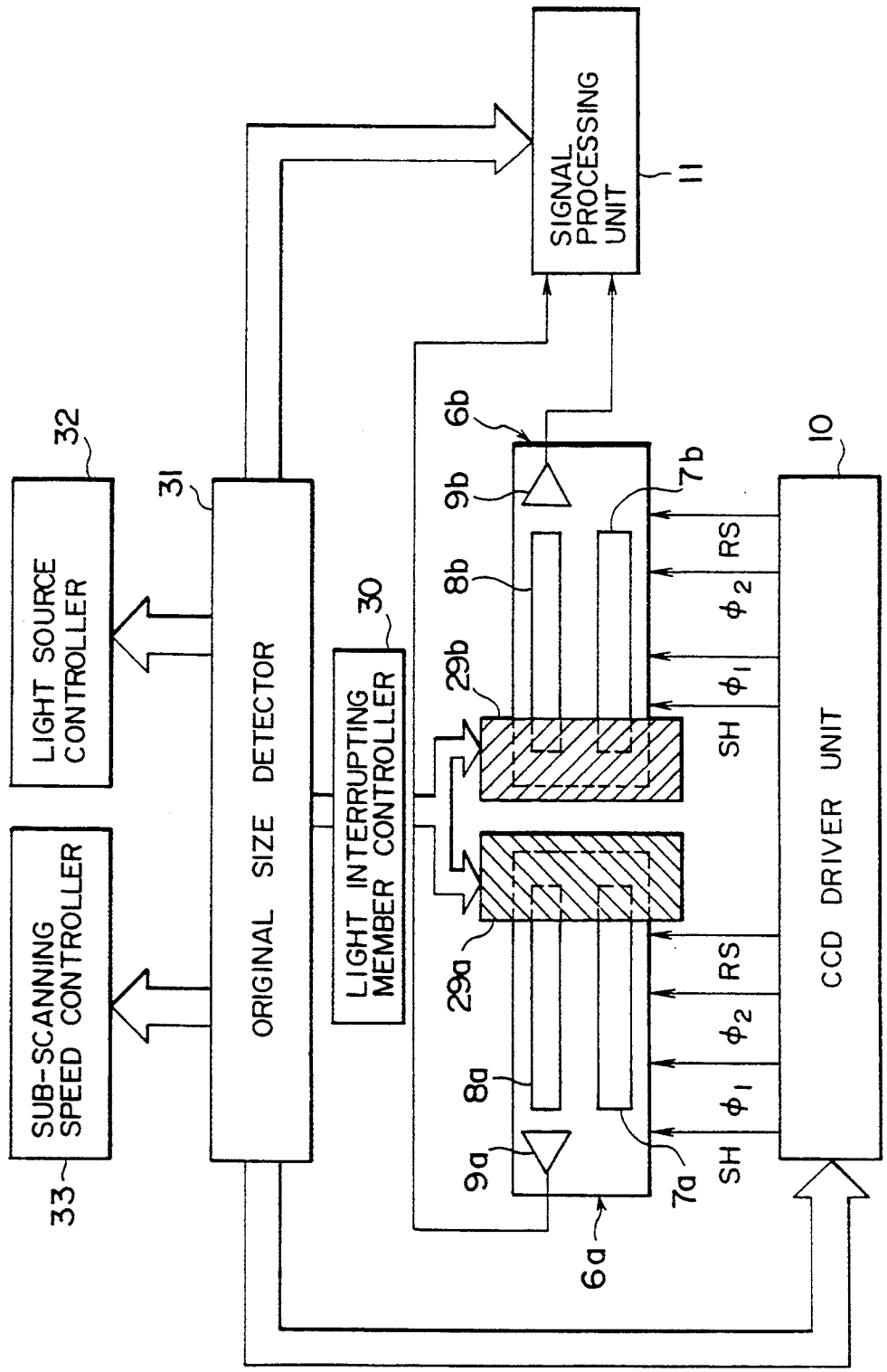
FIG. 28A is a diagram showing CCD line sensors, and their peripheral circuits, of the second embodiment of the present invention.

A description will now be given of an optical reader according to a second embodiment of the present invention. FIG. 27 shows an image reader according to the second embodiment of the present invention. As shown in FIG. 27, two light interrupting members 29a and 29b are placed in the light paths in front of the CCD line sensors 6a and 6b so that light other than the light reflected by the original 1 is interrupted. In other words, the light interrupting members 29a and 29b allow only light reflected by the original 1 to be projected onto the CCD line sensors 6a and 6b. As shown in FIG. 28A, the optical reader of the second embodiment of the present invention comprises, in addition to the light interrupting members 29a and 29b, a light interrupting member controller 30, an original size detector 31, and a light source controller 32, and a sub-scanning speed controller 33. The light interrupting member controller 30 moves the light interrupting members 29a and 29b. The original size detector 31 detects the size of the original 1. The light source controller 32 adjusts the intensity of light on the basis of the size of the original 1. The sub-scanning speed controller 33 controls the sub-scanning speed in a sub-scanning direction Y (orthogonal to the main scanning direction X) on the basis of the size of the original 1.

It will now be assumed that a maximum readable range is indicated by a broken line shown in FIG. 27 and tht the original has a size smaller than the maximum readable range or size. Each of the CCD line sensors 6a and 6b has large enough number of photoelectric conversion elements to cover half of the maximum readable range. When the original 1 having a size smaller than the maximum readable range is optically read, it is not necessary to read all pixel information in the maximum readable range. That is, it is enough to obtain only pixel information concerning the original 1. With the above in mind, the light interrupting members 29a and 29b are provided so that light coming from portions other than the original 1 is interrupted thereby. Assuming that each of the CCD line sensors 6a and 6b has n photoelectric conversion elements (photodiodes) where n is an integer and the original 1 has a size corresponding to 2m photodiodes in the main scanning direction where m is smaller than n, each of the light interrupting members 29a and 29b is positioned so that light reflected by the non-original portion corresponding to (n-m) photodiodes (pixels) is not incident on the corresponding CCD line sensor 6a or 6b. The original size detector 31 detects the size of the original in a conventional manner, and calculates the number m of photodiodes necessary for reading half of the original on the basis of the detected original size in the main scanning direction X. Then, the light interrupting member controller 30 moves the light interrupting members 29a and 29b so that in each of the CCD line sensors 6a and 6b m photodiodes are made to receive light reflected from the original 1, and (n-m) photodiodes are prevented from receiving light. Information indicating the number m of photodiodes is also supplied to the CCD driver unit 10, the signal processing unit 11, the light source controller 32, and the sub-scanning direction controller 33. The light source controller 32 controls the light source 3 so that it emits light having an intensity suitable for the size of the original 1. The sub-scanning speed controller 33 controls a motor (not shown) for moving the original 1 in the sub-scanning direction on the basis of the size of the original 1.

The light interrupting member controller 30 moves the CCD line sensors 6a and 6b in the above-mentioned manner. The CCD driver 10 receives the information indicating the number m of pixels and generates m shift pulses $\phi_1$ and m shift pulses $\phi_2$. Thereafter, the CCD driver 10 generates the shift pulse SH. The signal processing unit 11 is informed that the number of pixels in one line being scanned is equal to 2 m, and executes the signal processing based on the 2 m pixels. The sub-scanning speed controller 33 determines the sub-scanning speed based on the information indicating the number m of pixels, and controls the motor for moving the original 1. The time necessary for reading one line consisting of 2 m is m/n times that necessary for reading 2 n pixels. Hence, the sub-scanning speed at which 2 m pixels are scanned can be set equal to n/m times the sub-scanning speed at which 2 n pixels are scanned. The light source controller 32 controls the light source 3 on the basis of the information indicating the number m of pixels. Since the time it takes to read one line consisting of 2 m pixels is m/n times the time it takes to read one line consisting of 2 n pixels, luminance (light intensity) necessary to read 2 m pixels is reduced to m/n times the light intensity necessary to read 2 n pixels. In the above-mentioned manner, pixel information concerning non-original portions is discarded, and the original 1 having a size smaller than the maximum readable range can be read at high speed. The advantages obtained in the first embodiment of the present invention can be obtained also in this embodiment.

It is possible to increase the clock rate for driving the CCD line sensors 6a and 6b to m/n times without changing the light intensity of the light source 3 and the sub-scanning speed. With this operation, it is possible to reduce power consumed in driving the CCD line sensors 6a and 6b. It is also possible to supply the CCD line sensors 6a and 6b with the clock pulses $\phi_1$ and $\phi_2$ without changing the luminance, the sub-scanning speed, or the clock rate only while pixel information on the first m pixels is being transferred from each of the CCD line sensors 6a and 6b.

It will be noted that the concept of the second embodiment of the present invention can be applied to the image reader shown in FIGS. 4 through 7. It is also possible to use two CCD line sensors 13 for use in color reading as shown in FIG. 8 in lieu of the CCD line sensors 6a and 6b shown in FIGS. 4 through 7 and to use the light interrupting members 29a and 29b.

Figure 28B:
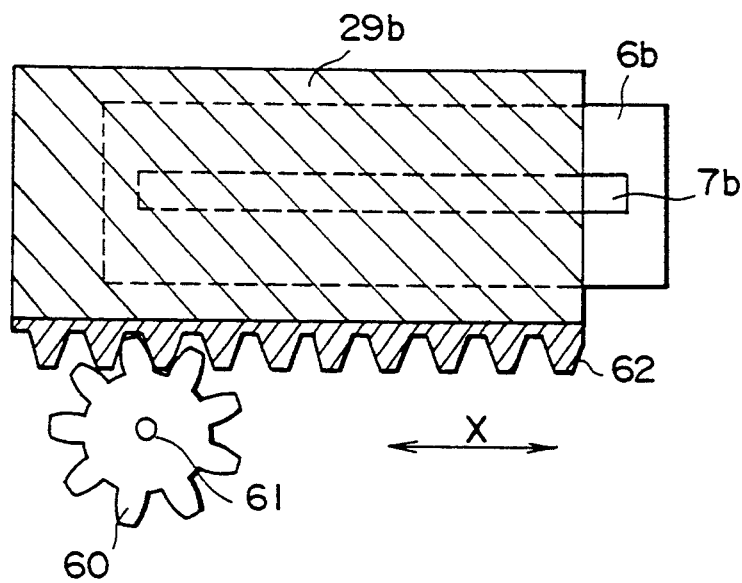
FIGS. 28B and 28C are diagrams showing a mechanism for moving a CCD line sensor in main scanning directions.
Figure 28C:
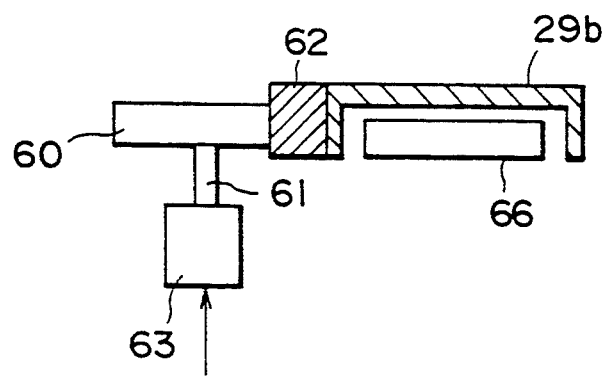

FIGS. 28B and 28C show a mechanism for moving the light interrupting member 29b which partially covers the CCD line sensor 6b. A rack 62 is fastened to a side wall of the light interrupting member 29b extending in the main scanning direction X. A pinion 60 is provided so that it engages the rack 62. The pinion 60 is fastened to a shaft 61, which is rotated by a motor 63, such as a stepping motor. The motor 63, which is fastened to a housing (not shown) of the image reader, is controlled by the light interrupting member controller 30 shown in FIG. 28A. More specifically, the controller 30 determines the rotating direction of the motor 63 and a rotating angle on the basis of the information indicating the size of the original 1.

Figure 29:
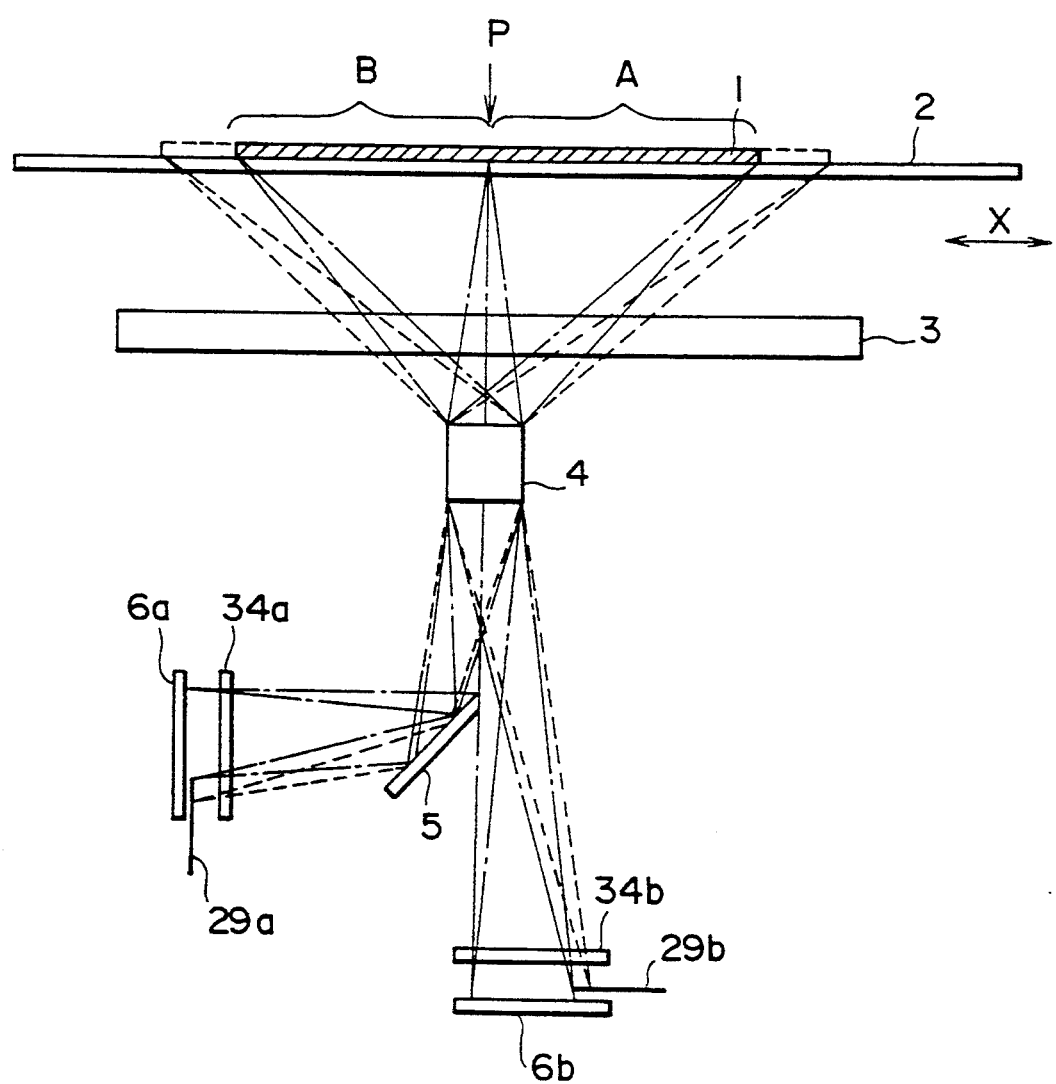
FIG. 29 is a diagram showing a first variation of the second embodiment of the present invention.

FIG. 29 shows a first variation of the second embodiment of the present invention. Color filters 34a and 34b, each having the structure as shown in FIG. 11, are placed in the light paths in front of the light interrupting members 29a and 29b, respectively. Each time the original 1 is scanned, the filters of the color filters 34a and 34b are changed. The structure shown in FIGS. 4 through 7 can be modified using the structure shown in FIG. 29.

Figure 30:
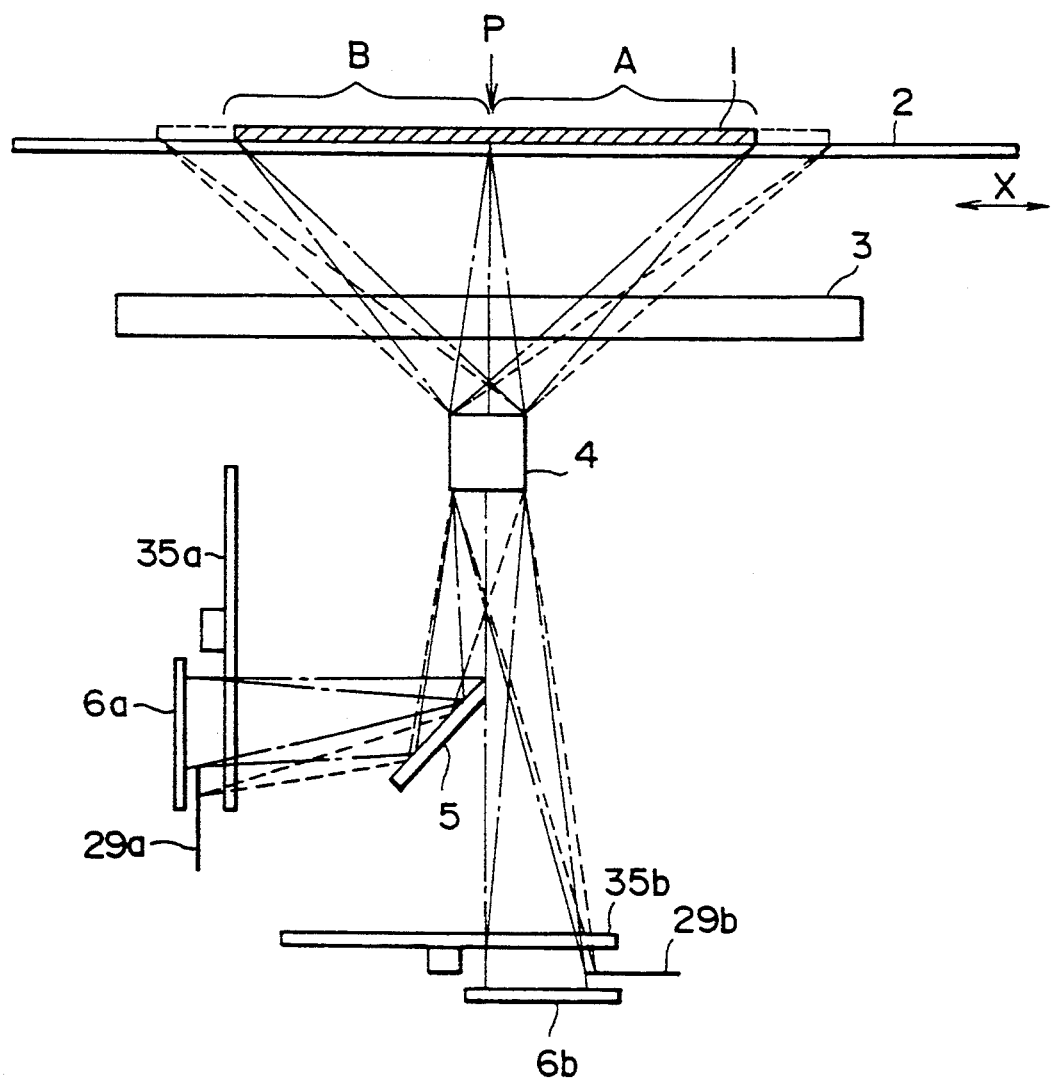
FIG. 30 is a diagram showing a second variation of the second embodiment of the present invention.

FIG. 30 shows a second variation of the second embodiment of the present invention. As shown in FIG. 30, rotary color filters 45a and 45b, each having the same structure as shown in FIG. 14, are used in lieu of the color filters 34a and 34b shown in FIG. 29. The rotary color filters 45a and 45b are rotated in synchronism with the line read frequency in the manner as has been described previously. The structure shown in FIGS. 4 through 7 can be modified using the structure shown in FIG. 30.

Figure 31:
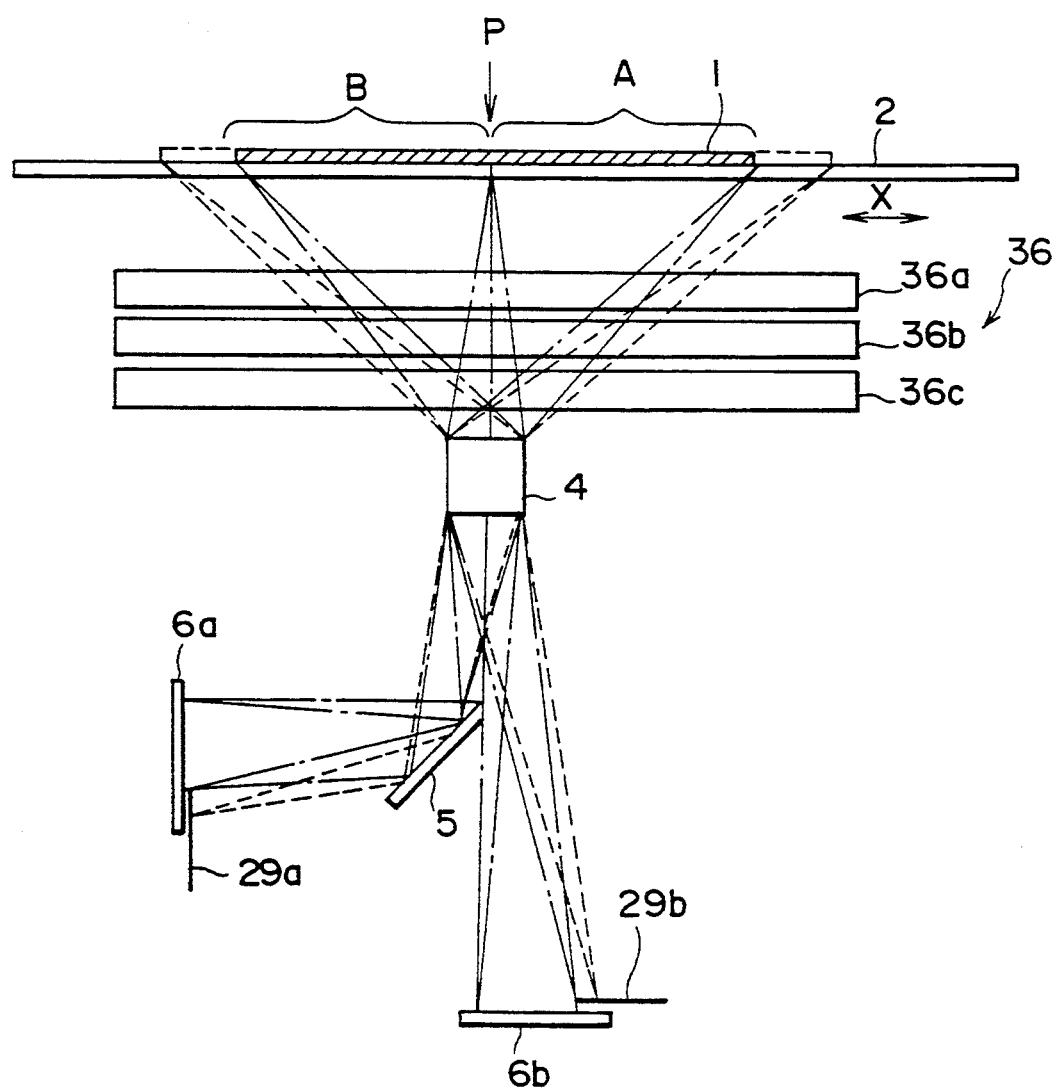
FIG. 31 is a diagram showing a third variation of the second embodiment of the present invention.

FIG. 31 shows a third variation of the second embodiment of the present invention. As shown in FIG. 31, a color light source 36 having the same structure as has been previously described is used in place of the light source 3. The light source 36 shown in FIG. 31 comprises a red light source 36a, a green light source 36b, and a blue light source 36c. One of the light sources 36a-36c is sequentially selected for each line on the original 1 in the main scanning direction X. It is also possible to sequentially select one of the light sources 36a-36c each time the entire original 1 is scanned. The image reader shown in FIGS. 4 through 7 can be modified using the structure shown in FIG. 31. As shown in FIG. 26 it is also possible to use the color separation prism 23 shown in FIG. 19 so that the reflected light from the original 1 is separated into two parts. Three lights of red, green and blue are separated from the reflected white light by means of the prism 23. The mirrors 5 (pyramid-shaped mirror 11 or semi-transparent mirror 12) respectively separate each of the three lights into two parts. The two parts of each of the lights are received by a pair of CCD line sensors. During this operation, the two parts are partially interrupted by the light interrupting members 29a and 29b. In this manner, color reading can be made.

Figure 32:
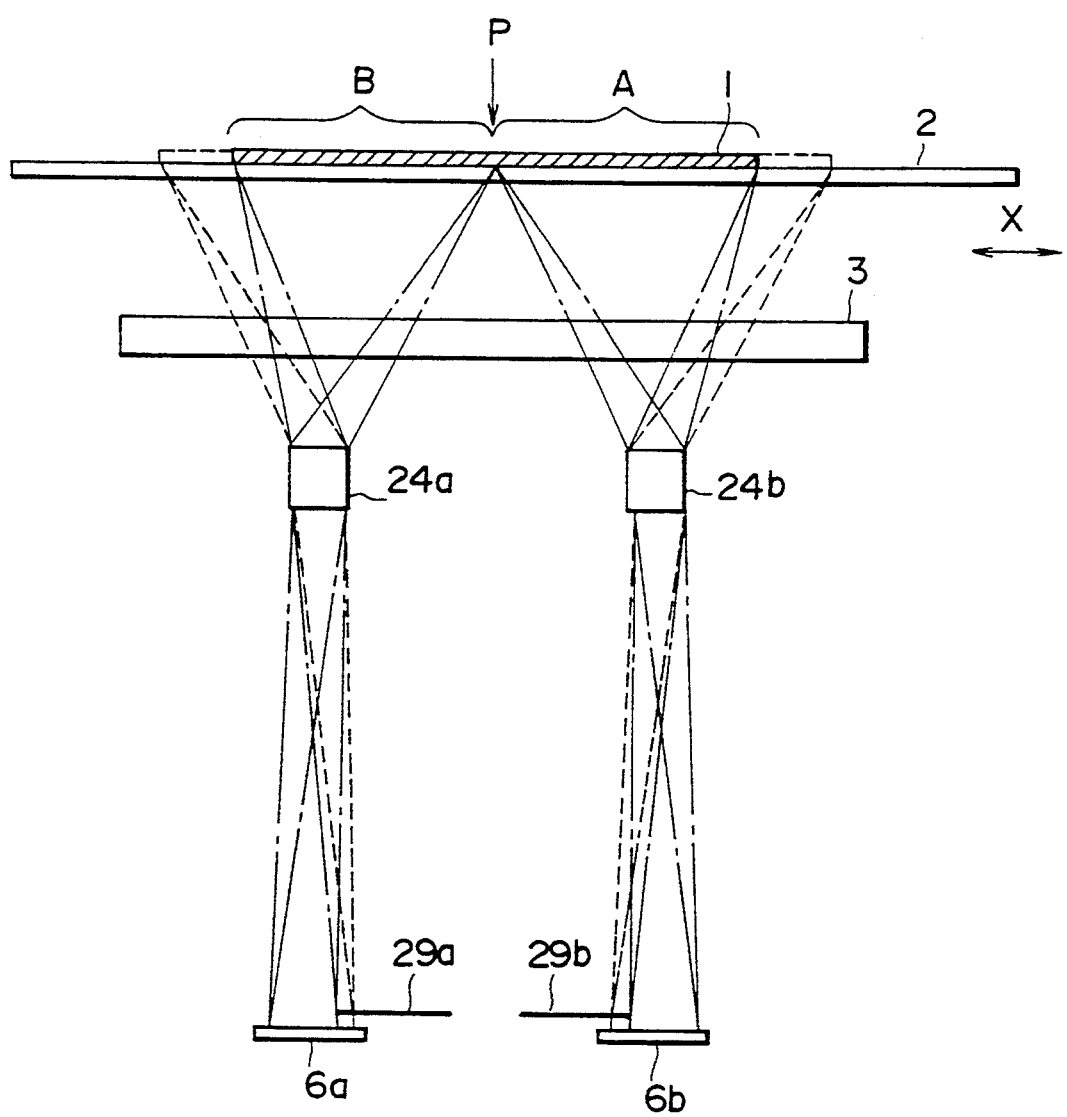
FIG. 32 is a diagram showing a fourth variation of the second embodiment of the present invention.

FIG. 32 shows a fourth variation of the second embodiment of the present invention. The light reflected by the original area B is focused on the CCD line sensor 6a, and the light reflected by the original area A is focused on the CCD line sensor 6b. Two imaging lenses 24a and 24b are used in lieu of the imaging lens 24. The operation of the fourth variation shown in FIG. 32 is the same as that of the image reader shown in FIG. 27.

Figure 33:
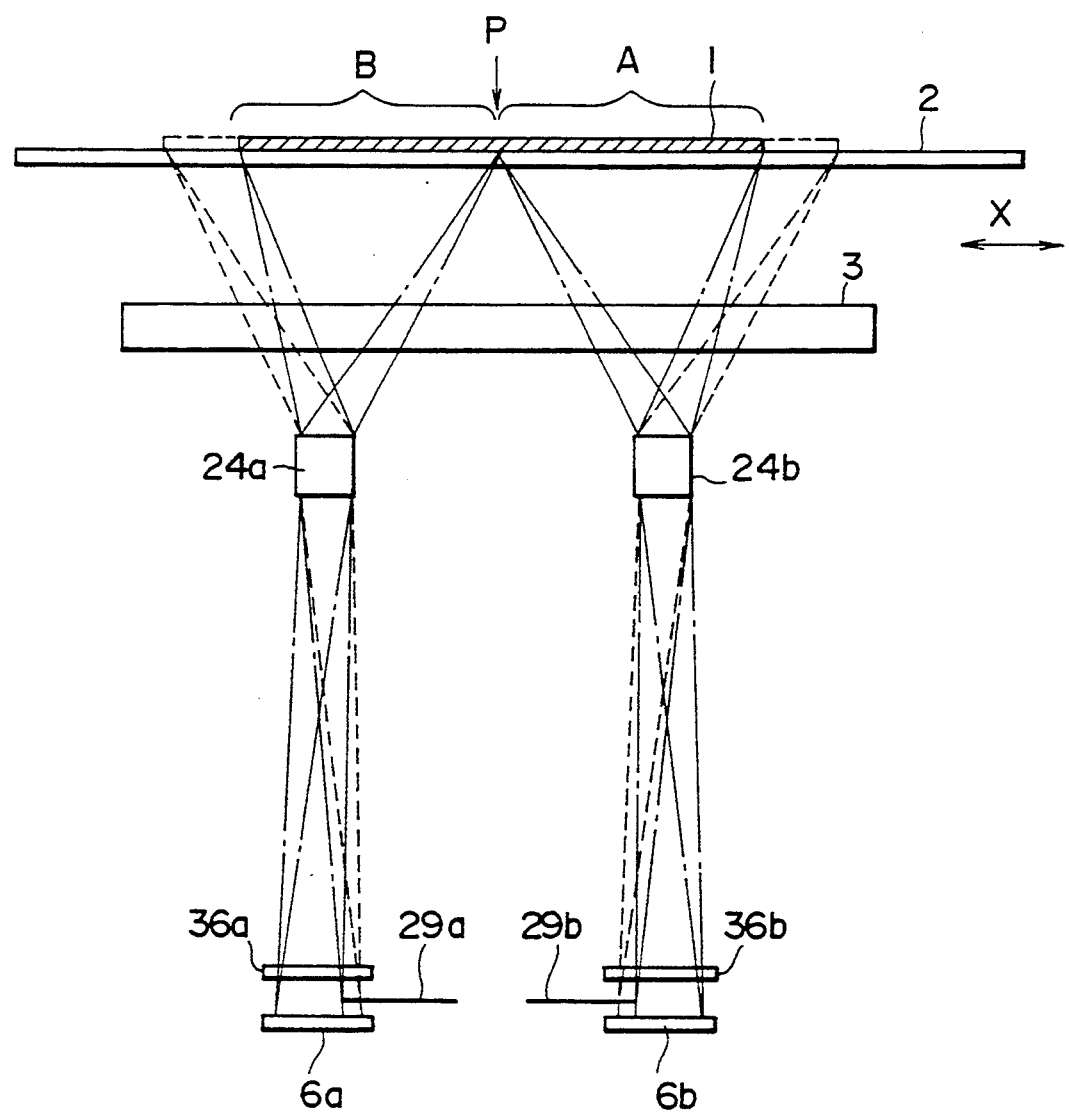
FIG. 33 is a diagram showing a fifth variation of the second embodiment of the present invention.

FIG. 33 shows a fifth variation of the second embodiment of the present invention. The image reader shown in FIG. 33 is obtained by providing color filters 36a and 36b in front of the CCD line sensors 6a and 6b so that the light interrupting members 29a and 29b are respectively located between the CCD line sensors 6a and 36a and between the CCD line sensor 6b and 36b. The color filters 36a and 36b each have the same structure as that shown in FIG. 11, and are controlled by a filter switching unit identical to the filter switching unit 17 shown in FIG. 12.

Figure 34:
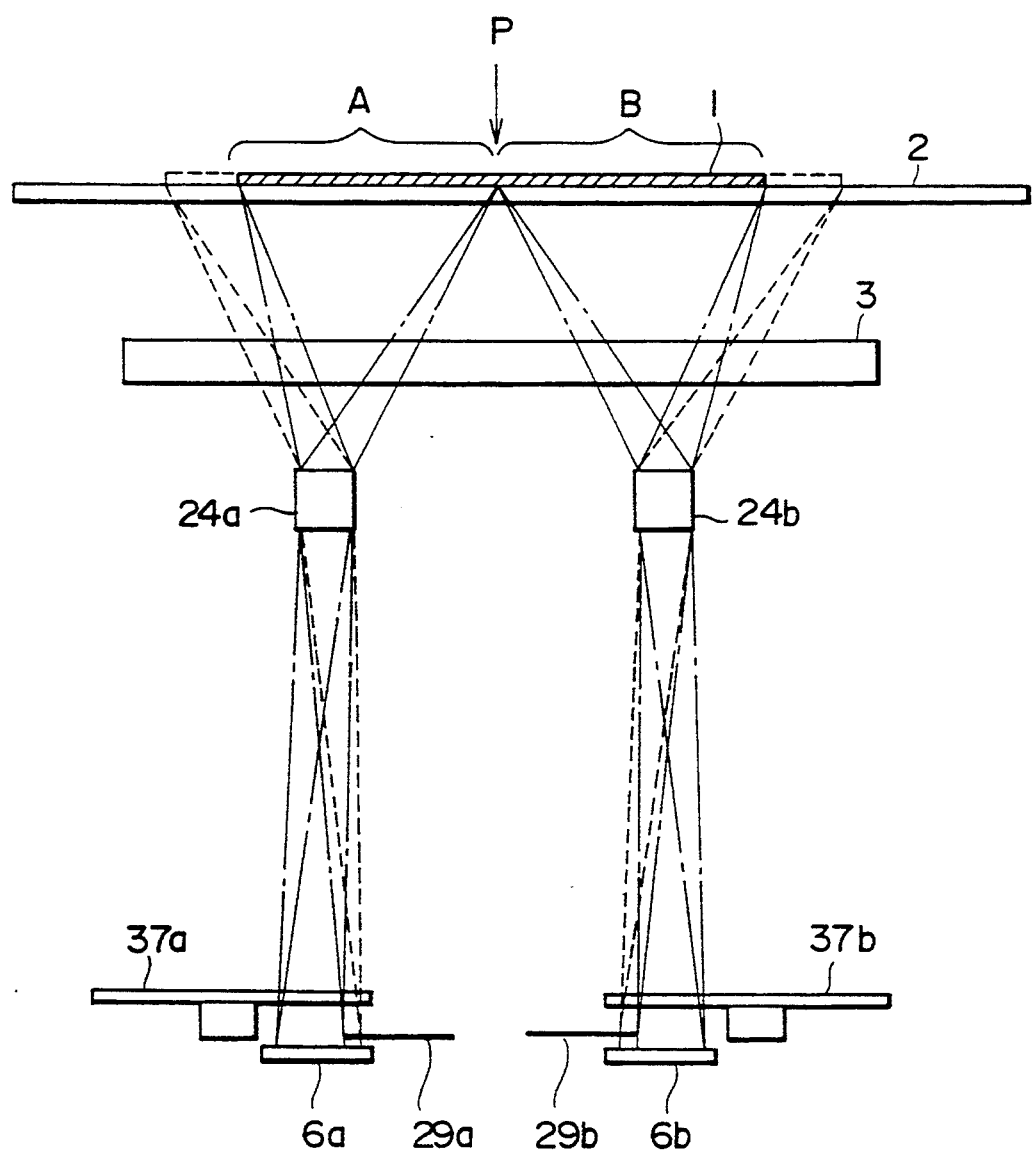
FIG. 34 is a diagram showing a sixth variation of the second embodiment of the present invention.

FIG. 34 shows a sixth variation of the second embodiment of the present invention in which the light interrupting members 29a and 29b are used. As shown in FIG. 34, rotary color filters 37a and 37b are substituted for the color filters 29a and 29b shown in FIG. 33. Each of the rotary color filters 37a and 37b has the same structure as shown in FIG. 14. The rotary color filters 37a and 37b are driven by a filter controller 20 identical to the filter controller 20 shown in FIG. 15. The rotary color filters 37a and 37b are rotated in synchronism with the line read frequency in the same manner as in the case of the image reader shown in FIG. 15.

Figure 35:
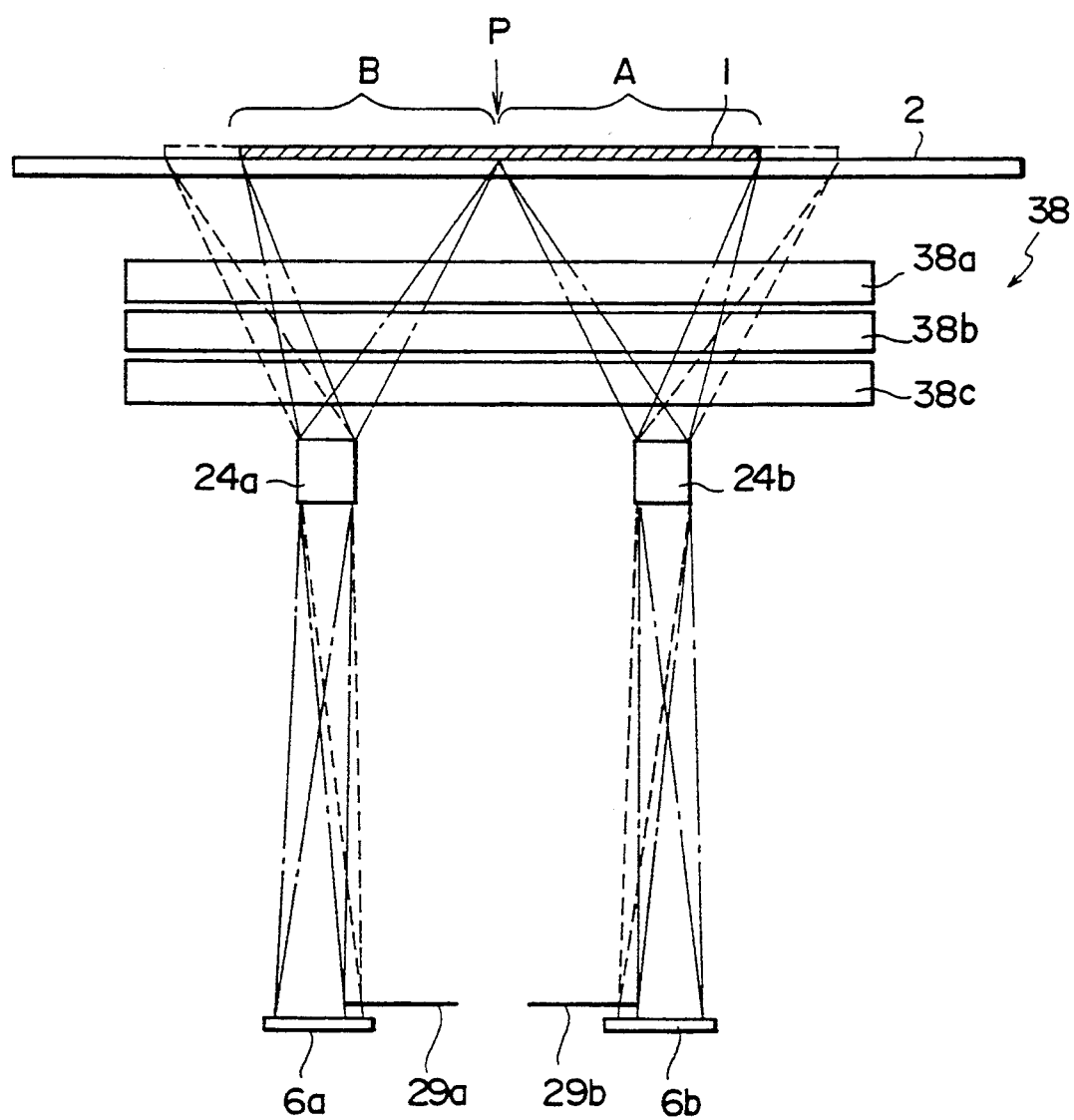
FIG. 35 is a diagram showing a seventh variation of the second embodiment of the present invention.

FIG. 35 shows a seventh variation of the second embodiment of the present invention. A light source 38 is substituted for the light source 3 shown in FIG. 32. The light source 38 comprises a red light source 38a, a green light source 38b and a blue light source 38c. The light source 38 is controlled by a light source controller which is the same as the light source controller 22 shown in FIG. 18.

Figure 36:
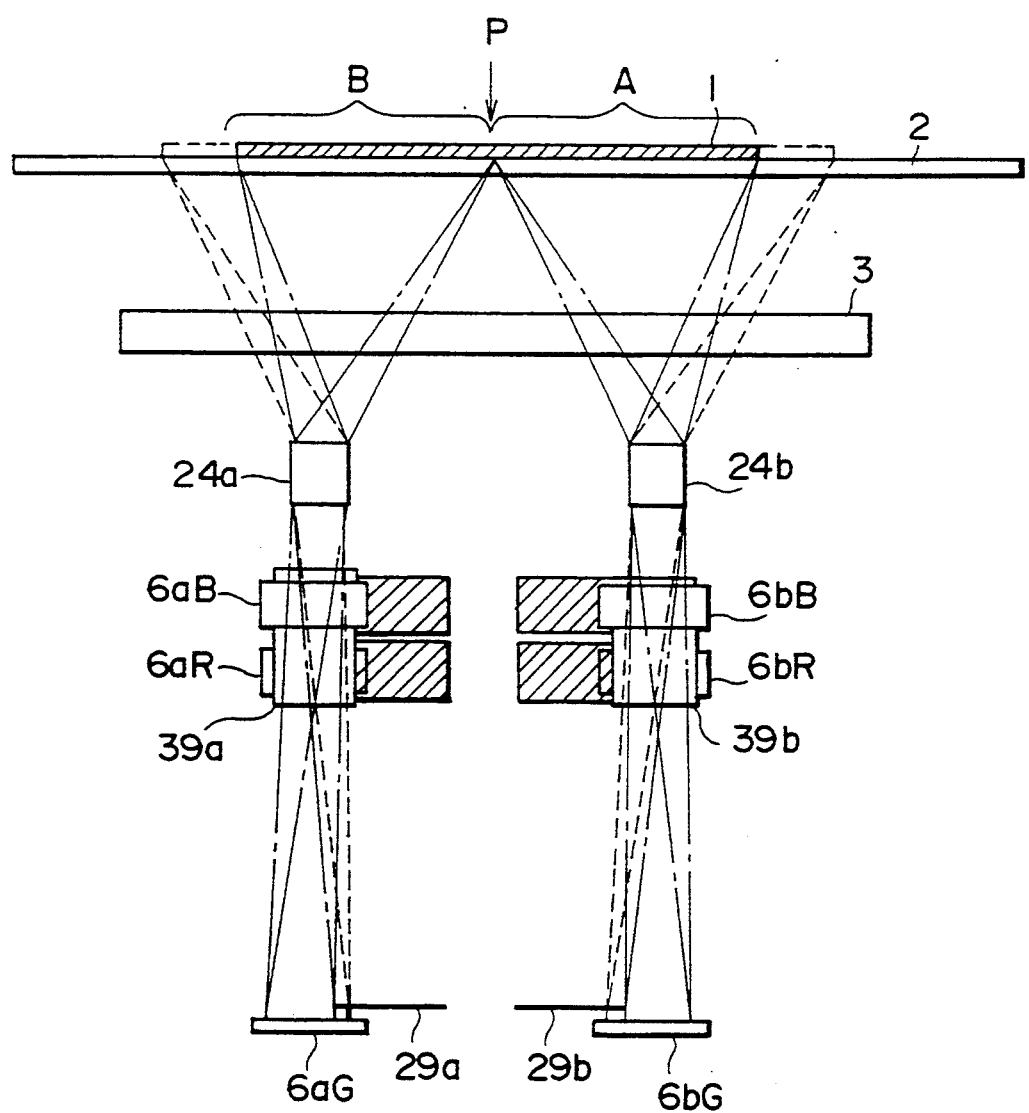
FIG. 36 is a diagram showing an eight variation of the second embodiment of the present invention.

FIG. 36 shows an eighth variation of the second embodiment of the present invention. As shown in FIG. 36, color separation prisms 39a and 39b are placed in the light paths from the imaging lenses 24a and 24b. Lights separated by the color separation prism 39a are respectively projected onto the aforementioned CCD line sensors 6aR, 6aG and 6aB. Similarly, lights separated from the color separation prism 39b are respectively projected onto the aforementioned line sensors 6bR, 6bG and 6bB.

A description will now be given of the signal processing unit 11 used in the first embodiment of the present invention. As has been described previously, the original 1 is scanned in the two directions from the center P the original 1 in the main scanning direction X. The signal processing unit 11 has the function of processing two pixel information strings respectively output from the CCD censors 6a and 6b so that a single pixel information series starting from an end of the original 1 can be produced.

Figure 37:
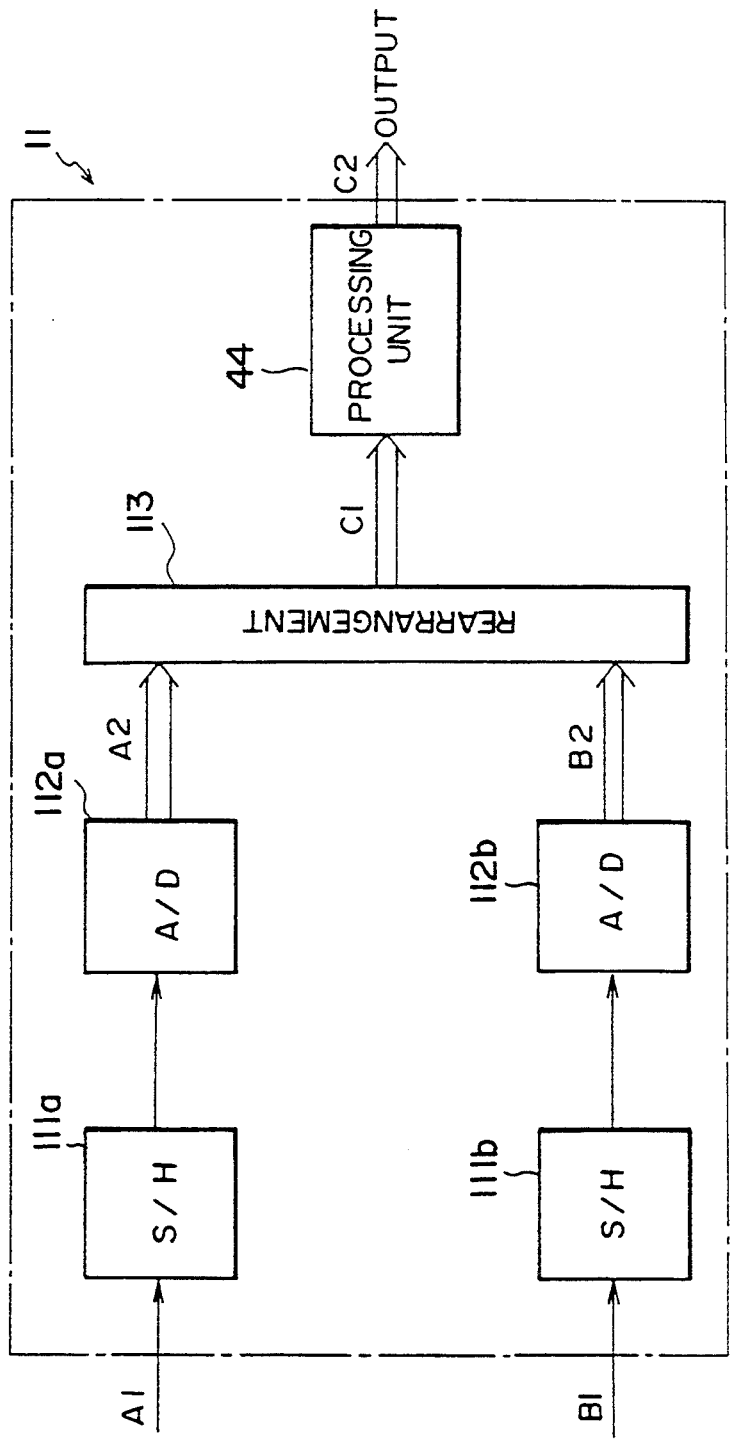
FIG. 37 is a block diagram of a signal processing unit used in the first embodiment of the present invention.

FIG. 37 is a block diagram of the signal processing unit 11, which is made up of two sample and hold (S/H) circuits 111a and 111b, two analog-to-digital (A/D) converters 112a and 112b, a rearrangement circuit 113, and a processing unit 114. Output signals A1 and B1 respectively output by the CCD line sensors 6a and 6b are applied to the S/H circuits 111a and 111b, respectively. Signals sampled and held by the S/H circuits 111a and 111b are applied to A/D converters 112a and 112b, which respectively generate digital signals A2 and B2. As has been described previously, each of the CCD line sensors 6a and 6b has n photodiodes (photoelements), and the CCD line sensors 6a and 6b respectively output information concerning n pixels in the two opposite directions from the center P towards the ends of the original 1.

When the pixels on the original 1 are numbered, from the left end thereof, as 1, 2, 3, ..., 2n−2, 2n−1, 2n, the digital signal A2 output from the A/D converter 111a has pixel information on the pixels from the nth pixel to the first pixel, and the digital signal B2 output from the A/D converter 111b has pixel information on the pixels from the (n+1)th pixel to the 2nth pixel. The digital signals A2 and B2 are applied to the rearrangement circuit 113 in parallel. A signal C1 output by the rearrangement circuit 113 has pixel information on pixels from the first pixel to the 2nth pixel arranged in this order. The operation of the rearrangement circuit 113 will be described in detail later. The signal C1 is processed by the processing circuit 114 in which shading correction is carried out for the signal C1. Then, the processing circuit 114 outputs an output signal C2 to a following stage. It is also possible to perform the shading correction process before the rearrangement process by means of the rearrangement circuit 113.

Figure 38:
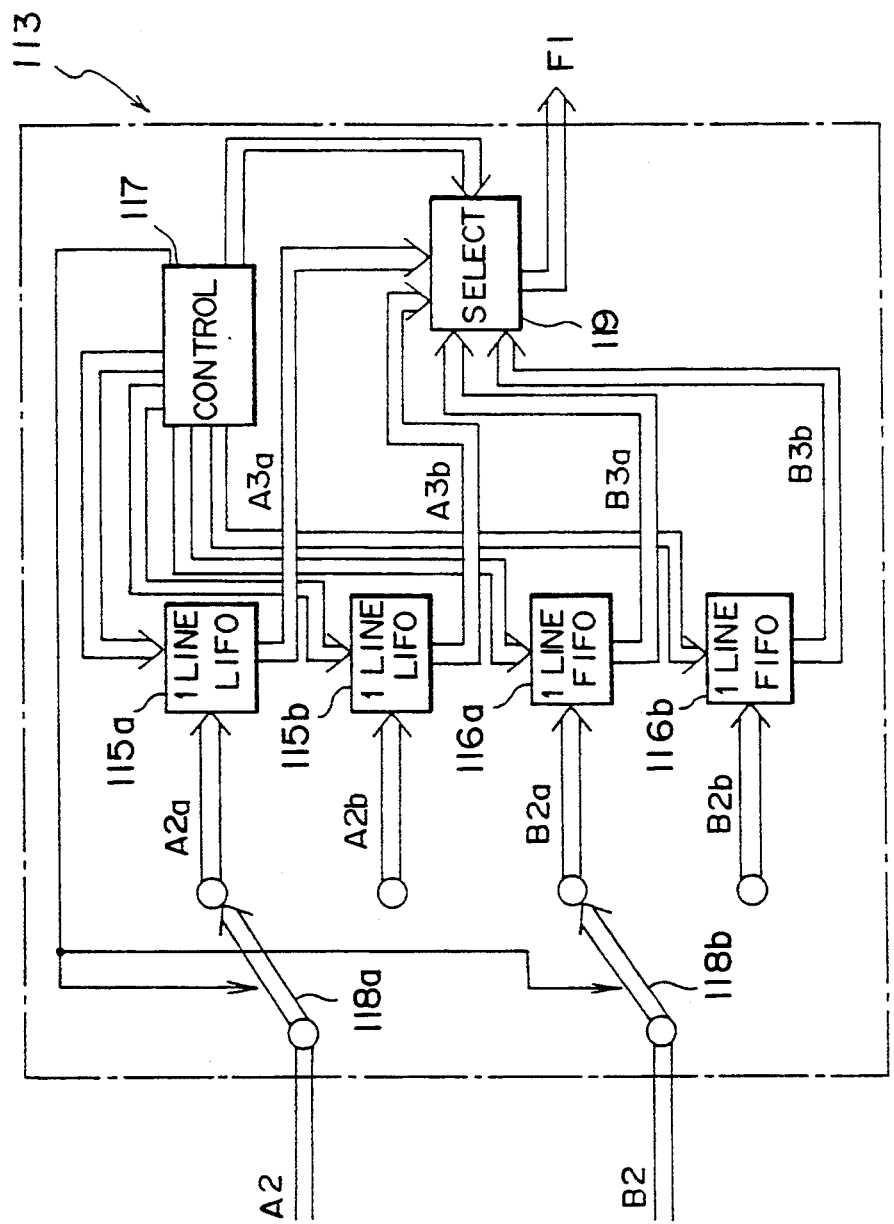
FIG. 38 is a block diagram of a rearrangement circuit shown in FIG. 37.
Figure 39:
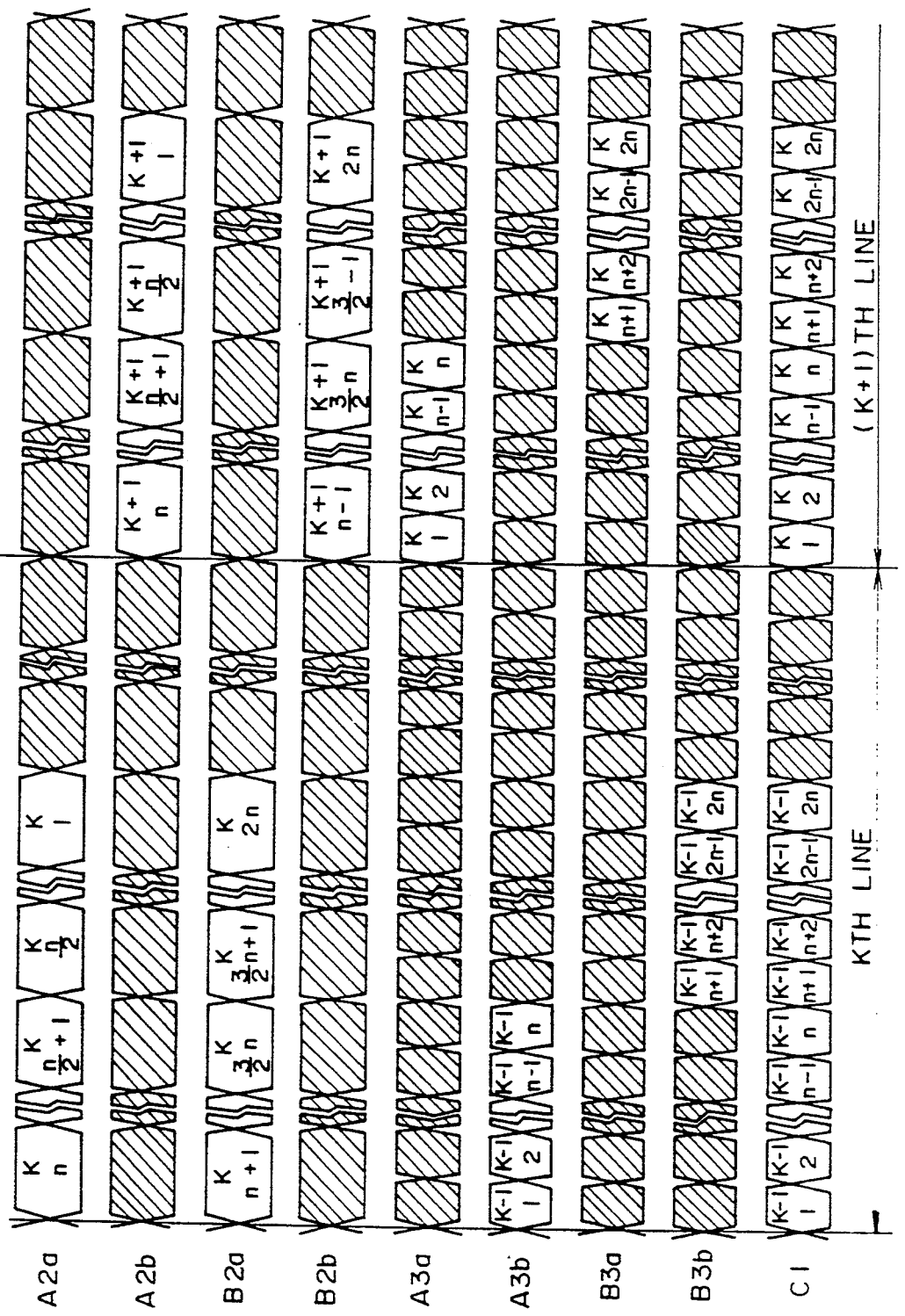
FIGS. 39 and 40 are diagrams showing the operation of the rearrangement circuit shown in FIG. 38.

FIG. 38 is a block diagram of the rearrangement circuit 113 shown in FIG. 37. The rearrangement circuit 113 comprises LIFO (Last-In First Out) memories 15a and 15b each having a memory area equal to or greater than n pixels, and FIFO (First-In First-Out) memories 16a and 16b each having a memory area equal to or greater than n pixels. A controller 117 outputs respective control signals to the memories 115a, 115b, 116a and 116b, two switches 18a and 18b, and a select circuit 119. More specifically, the controller 117 outputs write clock signals, read clock signals, write enable signals, read enable signals, write address reset signals, read address reset signals, beginning read address initializing signals, and switch control signals to the memories 115a, 115b, 116a and 116b. The switches 18a and 18b are switched at the beginning of one line under the control of the controller 117. As shown in FIG. 39, signals A2a, A2b from the selector 118a (FIG. 38), and signals B2a and B2b from the selector 118b (FIG. 38) are obtained when n is an even number. The output signals A2a, A2b, B2a and B2b are written into the memories 115a, 115b, 116a and 116b in synchronism with the write clock signals when the respective write enable signals are ON. Signals A3a, A3b, B3a and B3b are respectively read from the memories 115a, 115b, 116a and 116b in synchronism with the read clock signals when the respective read enable signals are ON.

Figure 40:
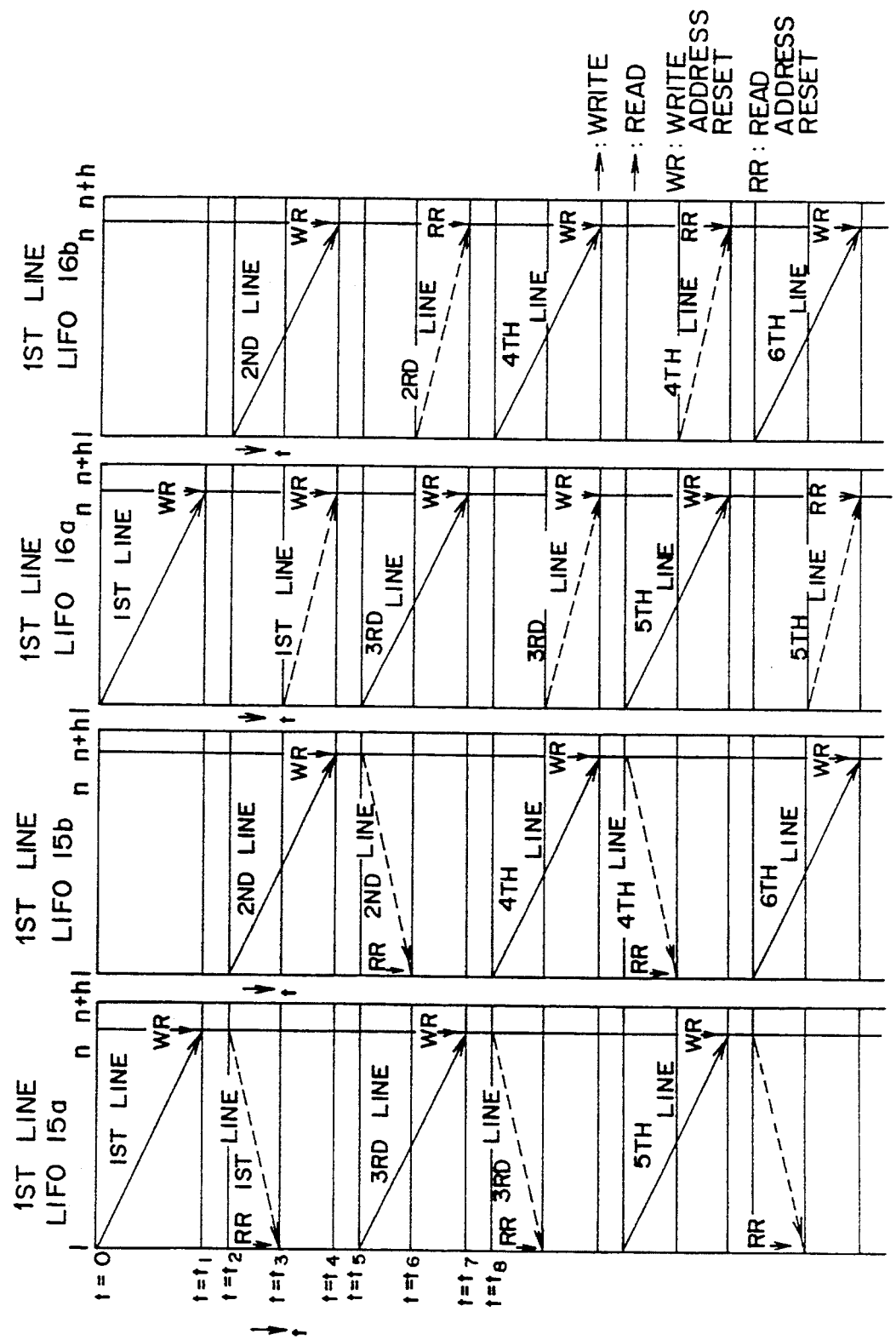

FIG. 40 shows the write/read operations of the memories 115a, 115b, 116a and 116b. The horizontal axis in FIG. 40 denotes time, and the vertical axis denotes memory addresses. The controller 113 commences to set the beginning read addresses for the LIFO memories 115a and 115b to the first address (1). Pixel information on pixels from the nth pixel to the first pixel in the first line is sequentially written into the LIFO memory 115a during the period between $t=0$ and $t=t_1$ in synchronism with the write clock signal having the same frequency as the output frequency of the CCD line sensors 6a and 6b. Pixel information on the pixels from the (n+1)th pixel to the 2nth pixel in the first line is sequentially written into the LIFO memory 116a during the period between $t=0$ and $t=t_1$ in synchronism with the write clock signal having the same frequency as the output frequency of the CCD line sensors 6a and 6b. At $t=t_1$, the write addresses of the LIFO memories 115a and 116a are reset to the initial values. During the period between $T=t_1$ and $t=_2$, the memories 115a, 115b, 116a and 116b do not perform the write/read operation at all. During the period between $t=t_2$ and $t=t_3$, pixel information on the pixels from the first pixel to the nth pixel in the first line is sequentially read from the LIFO memory 115a in synchronism with the read clock signal having a frequency twice that of the write clock signal. The read address of the LIFO memory 115a is reset to the initial value. During the period between $t=t_3$ and $t=t_4$, pixel information on pixels from the $(n+1)$th pixel to $2n$th pixel in the first line is sequentially read from the FIFO memory 116a in synchronism with the read clock signal having a frequency twice that of the write clock signal. At $t=t_4$, the read address of the FIFO memory 116a is reset to the initial value. At the same time as the read operation on the first line, the write operation on the second line is performed. During the period between $t=t_2$ and $t=t_4$, pixel information on pixels from the nth pixel to the first pixel in the second line is written into the LIFO memory 115b in synchronism with the write clock signal having a frequency equal to the frequencies of the output signals of the CCD line sensors 6a and 6b, and simultaneously pixel information on pixels from the $(n+1)$ pixel to the $2n$th pixel in the second line is written into the FIFO memory 116b with the above write clock signal. At $t=t_4$, the write addresses of the LIFO memory 115b and the FIFO memory 116b are reset to the initial values. During the period between $t=t_4$ and $t=t_5$, the memories 115a, 115b, 116a and 116b do not perform the write/read operations at all. During the period between $t=t_5$ and $t=t_8$, pixel data concerning the third line is written into the memories 15a and 16a. During the period between $t=t_5$ and $t=t_6$, the pixel information which has been written into the memory 115b during the period between $t=t_2$ and $t=t_4$ is read out from the memory 115b. During the period between $t=t_6$ and $t=t_7$, the pixel information which have been written into the memory 116b during the period between $t=t_2$ and $t=t_4$ is read out from the memory 116b. After $t=t_8$, the same operation as that performed between $t=t_2$ and $t=t_8$ is carried out.

In the above manner, the signals A3a, A3b, B3a and B3b are are applied to the select circuit 119. In order to rearrange these signals, the select circuit 119 selects the signal A3b between the first pixel and the nth pixel in the $(k-1)$th line, and selects the signal B3b between the $(n+1)$th pixel and the $2n$th pixel. Further, the select circuit 119 selects the signal A3a between the first pixel to the nth pixel in the kth line, and selects the signal B3a between the $(n+1)$th pixel and the $2n$th pixel. In the above-mentioned manner, lines from the $(k+1)$th line are processed. As a result, as shown in FIG. 39, the signal C1 contains pixel information on pixels from the first pixel to the $2n$th pixel in this sequence. The above operation relates to the case where n is an even number. When n is an odd number, the signals A3a, A3b, B3a and B3b are rearranged in the same manner as described above.

Figure 41:
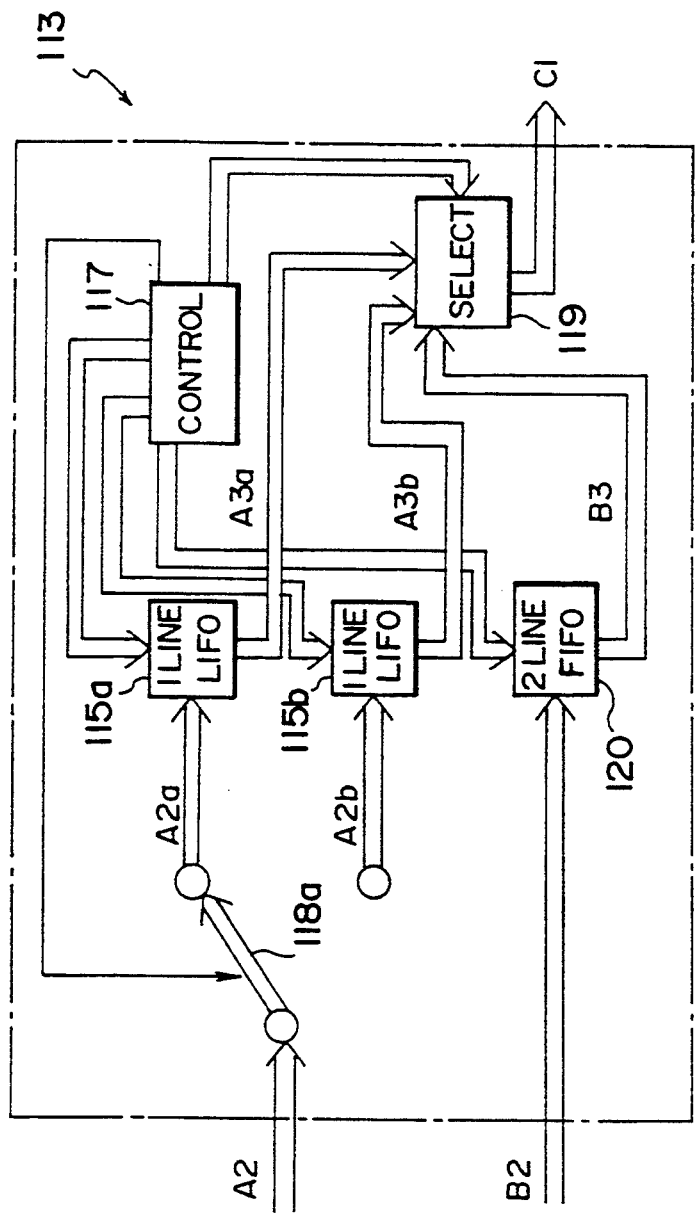
FIG. 41 is a block diagram showing a first variation of the rearrangement circuit shown in FIG. 38.
Figure 42:
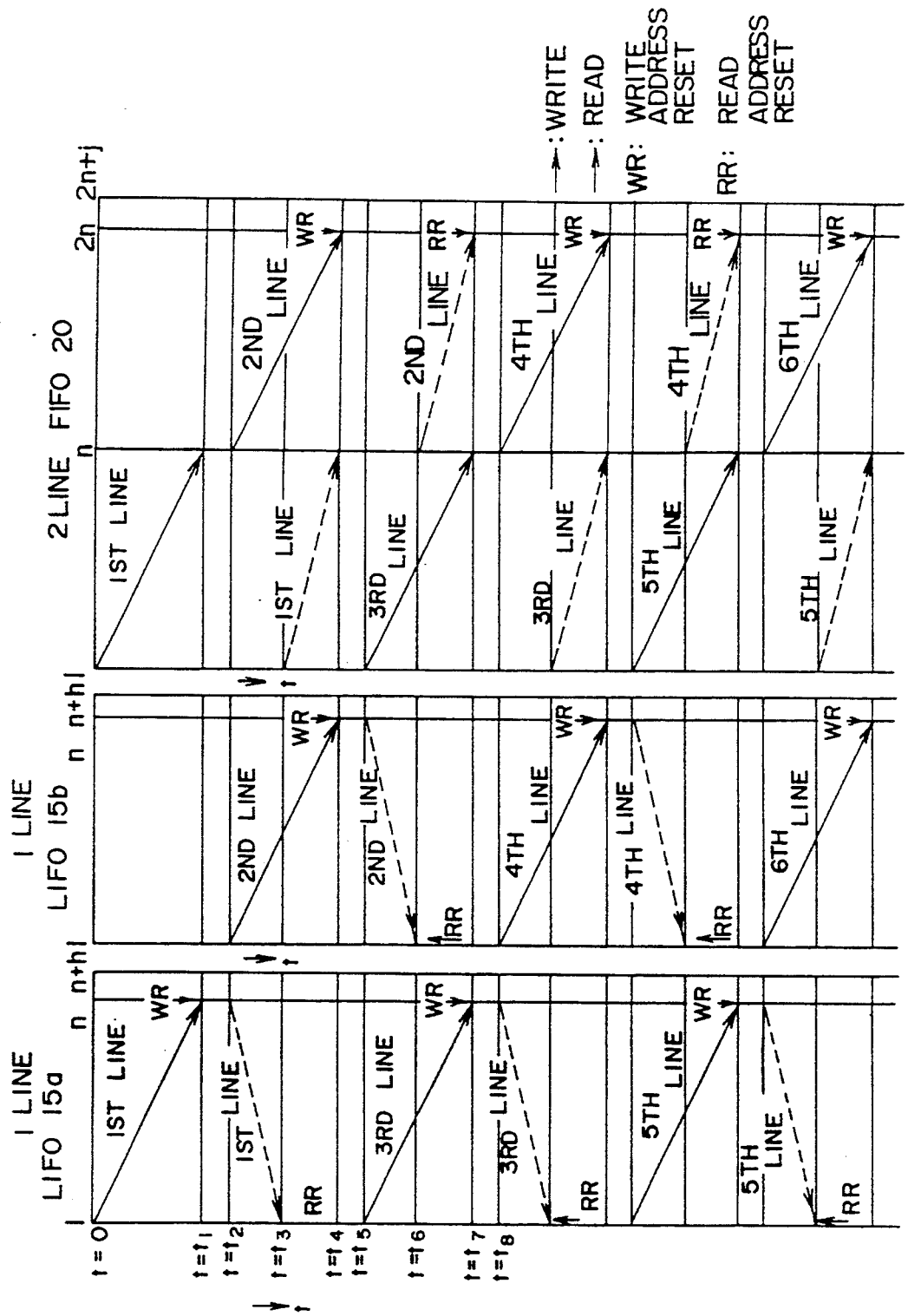
FIGS. 42 and 43 are diagrams showing the operation of the configuration shown in FIG. 41.

FIG. 41 is a first variation of the rearrangement circuit 113. An FIFO memory 120 having a storage capacity equal to or greater than 2 n pixels is used in lieu of the memories 116a and 116b shown in FIG. 38. The switch 118b shown in FIG. 38 is not used in the first variation shown in FIG. 41. The signals A2a, A2b and B2 are respectively written into the LIFO memories 115a and 115b and the FIFO memory 120 in a manner as shown in FIG. 42. At the commencement of the operation of the first variation shown in FIG. 41, the controller 117 sets the beginning read address of the LIFO memories 115a and 115b to the nth address, and sets the beginning read address of the FIFO memory 120 to the first address. Thereafter, the write and read operations of the LIFO memories 115a and 115b are carried out in the manner as shown in FIG. 40.

Figure 43:
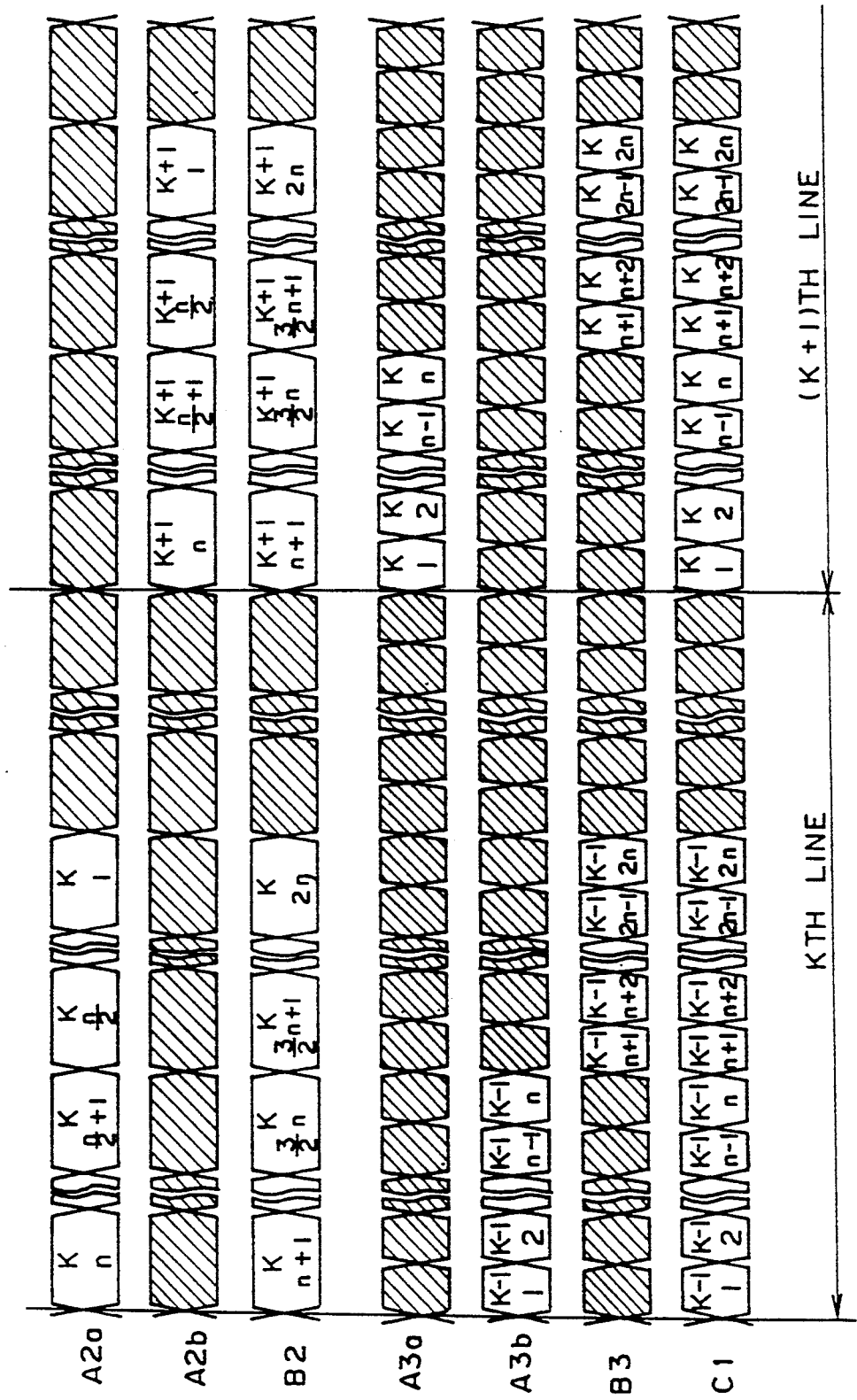

The operation of the FIFO memory 120 will now be described. Pixel information on pixels from the $(n+1)$th pixel to the $2n$th pixel in the first line is written into the FIFO memory 120 during the period between $t=0$ and $t=t_1$ in synchronism with the write clock signal having a frequency equal to that of the output frequency of the CCD line sensors 6a and 6b. The write and read operations are not carried out during the period between $t=t_2$ and $t=t_4$. During the period between $t=t_2$ and $t=t_4$, pixel information on pixels from the $(n+1)$th pixel to the $2n$th pixel in the second line is written into the FIFO memory 120. During the period between $t=t_3$ and $t=t_4$, the pixel information on pixels from the $(n+1)$th pixel to the $2n$th pixel in the first line is read from the FIFO memory 120 in synchronism with the read clock signal having a frequency twice that of the write clock signal. At $t=t_4$, the write address is reset to the initial value. During the period between $t=t_4$ and $t=t_5$, the write and read operations are not performed at all. During the period between $t=t_5$ and $t=t_7$, pixel information on pixels from the $(n+1)$th pixel to the $2n$th pixel in the third line are written into the FIFO memory 120 in synchronism with the write clock signal. During the period between $t=t_6$ and $t=t_7$, the pixel information on pixels from the $(n+1)$th pixel to the $2n$th pixel in the second line is read out from the FIFO memory 120 in synchronism with the read clock signal. At $t=t_7$, the read address of the FIFO memory 120 is reset to the initial value. During the period between $t=t_7$ and $t=t_8$, the write and read operations are not carried out. In this manner, the operation performed during the period between $t=t_2$ and $t=t_8$ is repeatedly carried out. As a result, when n is an even number, the select circuit 119 is supplied with the signals A3a, A3b and B3 shown in FIG. 43. In order to rearrange these signals in sequential order starting from the first pixel, as shown in FIG. 43, the select circuit 119 selects the signal A3b between the first pixel and the nth pixel in the $(k-1)$th line, and selects the signal B3 between the $(n+1)$th pixel and the $2n$th pixel. Further, the select circuit 119 selects the signal A3a between the first pixel and the nth pixel in the kth line, and selects the signal B3 between the $(n+1)$th pixel and the $2n$th pixel. In the above-mentioned manner, lines from the $(k+1)$th line are processed. Hence, as shown in FIG. 43, the signal C1 has pixel information on pixels from the first pixel to the $2n$th pixel in this order. The first variation needs a number of parts smaller than the number of parts used in the configuration shown in FIG. 38. The above operation relates to the case where n is an even number. The signals A3a, A3b and B3 can be rearranged in the same manner for the case where n is an odd number.

Figure 44:
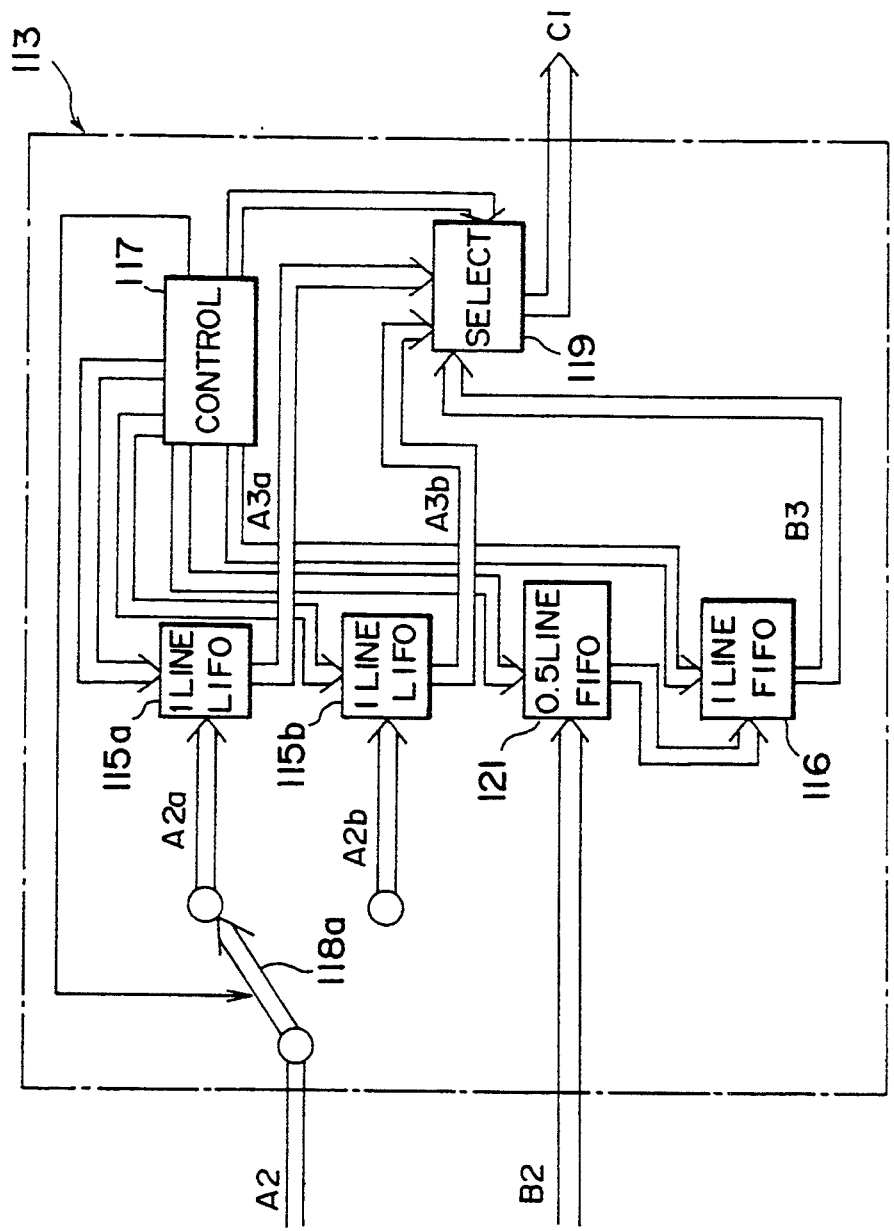
FIG. 44 is a diagram showing a second variation of the rearrangement circuit shown in FIG. 38.

FIG. 44 shows a second variation of the rearrangement circuit 113. The rearrangement circuit shown in FIG. 44 has an FIFO memory 121 having a storage capacity equal to or greater than n/2 pixels. An FIFO memory 116 has a storage capacity equal to or greater than n pixels. The switch 118b shown in FIG. 38 is not used in the configuration shown in FIG. 44. At the commencement of the operation, the controller 117 sets the beginning read addresses of the LIFO memories 115a and 115b to the nth address, and sets the beginning read addresses of the FIFO memories 121 and 116 to the first address. The LIFO memories 115a and 115b operate in the same manner as shown in FIG. 40.

The operation of the FIFO memory 121 will now be described with reference to FIG. 45. During the period between $t=0$ and $t=t_2$, pixel information on pixels from the $(n+1)$th pixel to the $2n$th pixel in the first line is written into the FIFO memory 121 in synchronism with the write clock signal having a frequency equal to the output frequencies of the CCD line sensors 6a and 6b. At t=t₃, the write address is reset to the initial value. During the period between t=t₁ and t=t₄, the pixel information on pixels from the (n+1)th pixel to the 2nth pixel in the first line is read from the FIFO memory 121 in synchronism with the read clock signal having a frequency equal to that of the write clock signal. At t=t₄, the read address is reset to the initial value. During the period between t=t₃ and t=t₆, pixel information on pixels from the (n+1)th pixel to the 2nth pixel in the second line is written into the FIFO memory 121 in synchronism with the write clock signal. At t=t₆, the write address is reset to the initial value. In this manner, the write and read operations are carried out as shown in FIG. 45.

Figure 46:
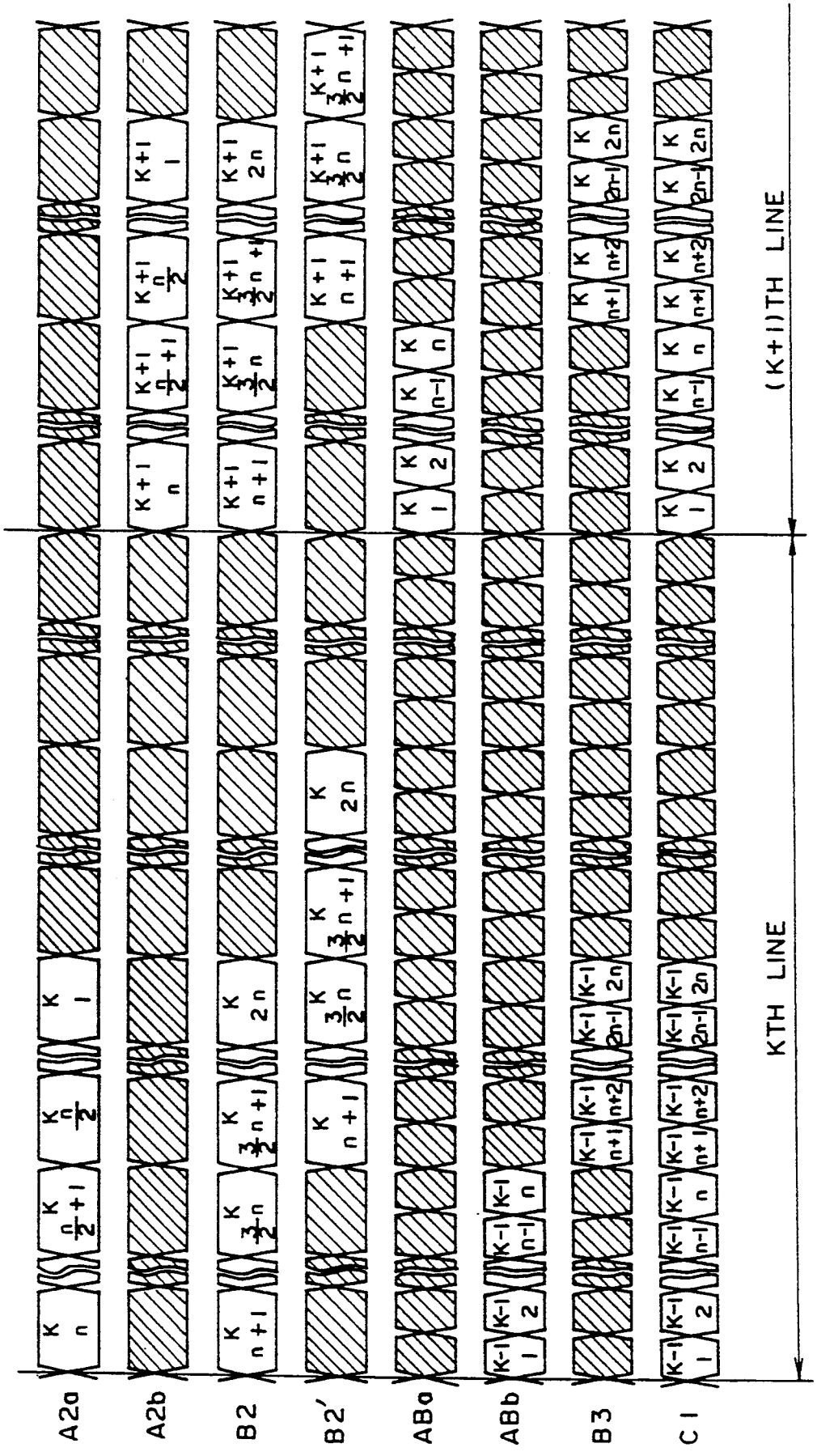

A description will now be given, with reference to FIG. 45, of the FIFO memory 116 shown in FIG. 44. During the period between t=t₁ and t=t₄, pixel information on pixels from the (n+1)th pixel to the 2nth pixel in the first line read from the FIFO memory 121 is written into the FIFO memory 116 in synchronism with the write clock signal having a frequency equal to that of the read clock signal of the FIFO memory 121. At t=t₄, the write address of the FIFO memory 116 is reset to the initial value. During the period between t=t₄ and t=t₅, the write and read operations are not carried out. During the period between t=t₅ and t=t₆, the pixel information on pixels from the (n+1)th pixel to the 2nth pixel in the first line is read from the FIFO memory 116. At t=t₆, the read address of the FIFO memory 116 is reset to the initial value. During the period between t=t₅ and t=t₈, pixel information on pixels from the (n+1)th pixel to the 2nth pixel in the second line is written into the FIFO memory 116 in synchronism with the write clock signal having a frequency equal to that of the read clock signal of the FIFO memory 121. At t=t₈, the write address is reset to the initial value. During the period between t=t₈ and t=t₉, the write and read operations are not carried out. After t=t₉, the operation performed between t=t₅ and t=t₉ is repeatedly carried out. As a result, the input signals A3a, A3b and B3 are applied to the select circuit 119, as shown in FIG. 46, when n is an even number. The inputting of these operations is the same as shown in FIG. 43. Hence, the select circuit 119 operates in the same manner as has been described with reference to FIG. 41. It is possible to assemble the rearrangement circuit 113 using fewer parts than in the circuit shown in FIG. 38 or FIG. 41.

As has been described, it is necessary for the FIFO memory 121 to have a storage capacity equal to or greater than n/2. Even when this condition is satisfied, there is a possibility that pixel information concerning the (k+1)th line may be overwritten into a storage area from which pixel information concerning the kth line is being read. In order to avoid the above problem, the following condition must be satisfied:

$$ta + tb \leq (ta/2) + (ma/n) \times ta$$

where ta denotes the time necessary to execute the writing or reading of pixel information concerning valid pixels in one line, tb denotes the time necessary to transfer information concerning invalid pixels, and ma denotes a memory capacity of the FIFO memory 121.

Figure 47:
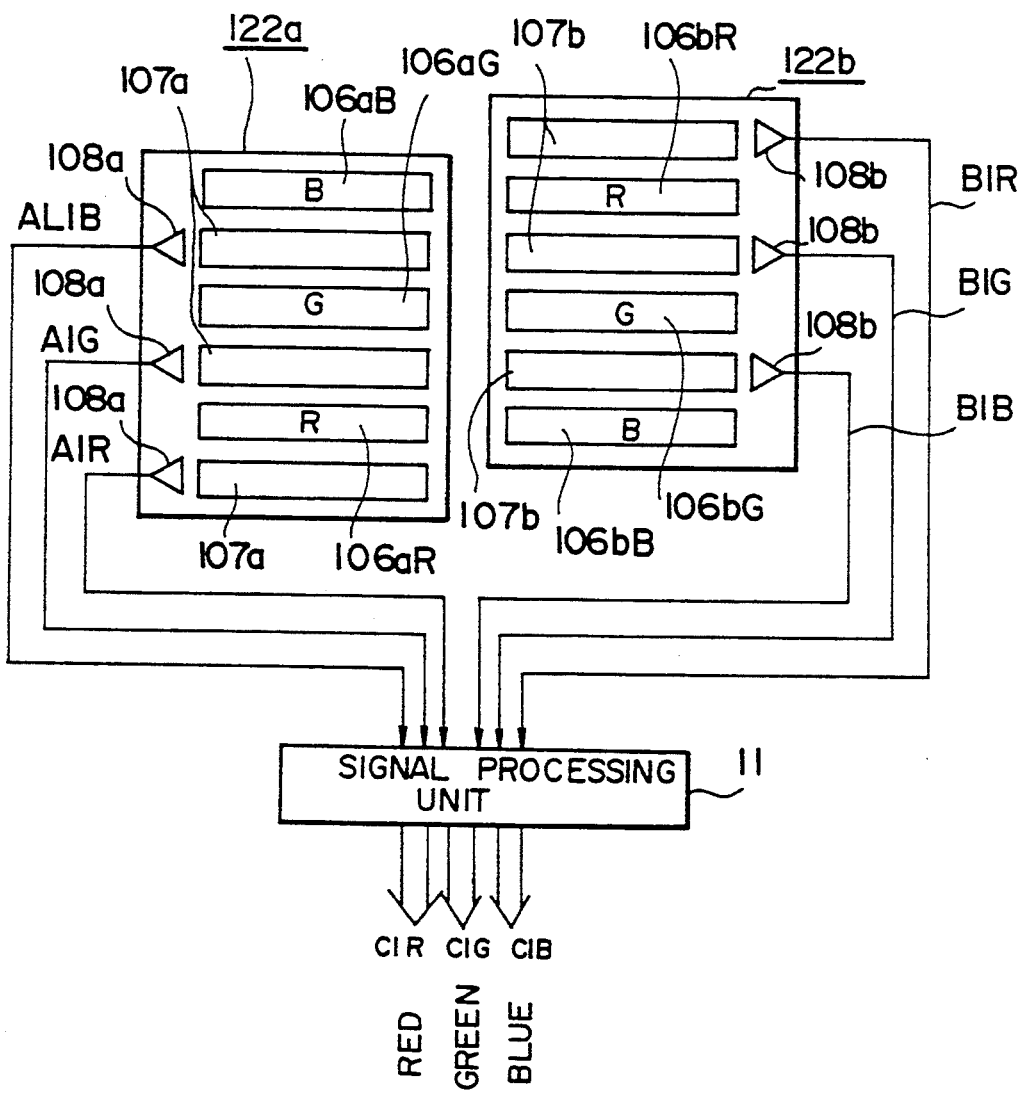
FIG. 47 is a diagram showing CCD line sensors for color reading.

It is possible to use CCD line sensors for color reading in lieu of the CCD line sensors 6a and 6b. FIG. 47 shows CCD line sensors 122a and 122b for color reading. The CCD line sensor 122a comprises a photodiode array 106aB with a blue filter added thereto, a photodiode array 106aG with a green filter added thereto, and a photodiode array 106aR with a red filter added thereto. Further, the CCD line sensor 122a comprises a CCD shift register 107a and an output unit 108a. The CCD line sensor 122b comprises a photodiode array 106bB with a blue filter added thereto, a photodiode array 106bG with a green filter added thereto, and a photodiode array 106bR with a red filter added thereto. Further, the CCD line sensor 122b comprises a CCD shift register 107b and an output unit 108b. By using the CCD line sensors 122a and 122b, it is possible to separate red, green and blue lights from white light in each line.

Figure 48:
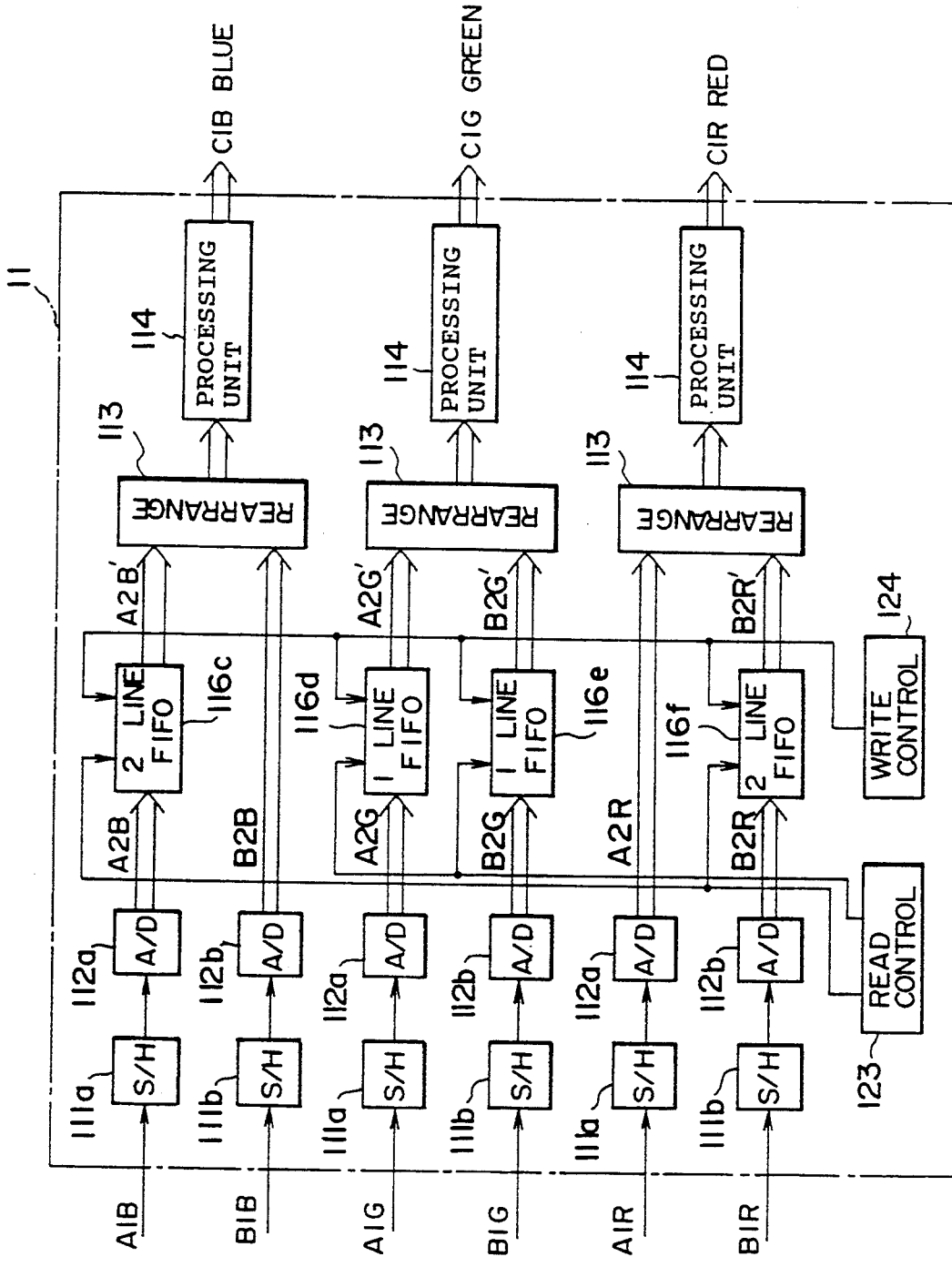
FIG. 48 is a block diagram showing the structure of the signal processing unit employed when the CCD line sensors shown in FIG. 47 are used.

When the CCD line sensors 122a and 122b are in which sensors the respective arrangements of photodiodes are spaced apart from each other by one line in the sub-scanning direction, the signal processing unit 11 configured as shown in FIG. 48 is used. The signal processing unit 11 shown in FIG. 48 comprises FIFO memory 116c and 116f each having a storage capacity equal to or larger than 21 lines, FIFO memories 116d and 116e each having a storage capacity equal to or larger than one line, a read controller 123 for controlling the read operations of these FIFO memories, and a write controller 124 for controlling the write operations of these FIFO memories. The signal processing unit 11 comprises three rearrangement circuits 113, each of which is configured as shown in FIG. 38, FIG. 41 or FIG. 44.

Figure 49:
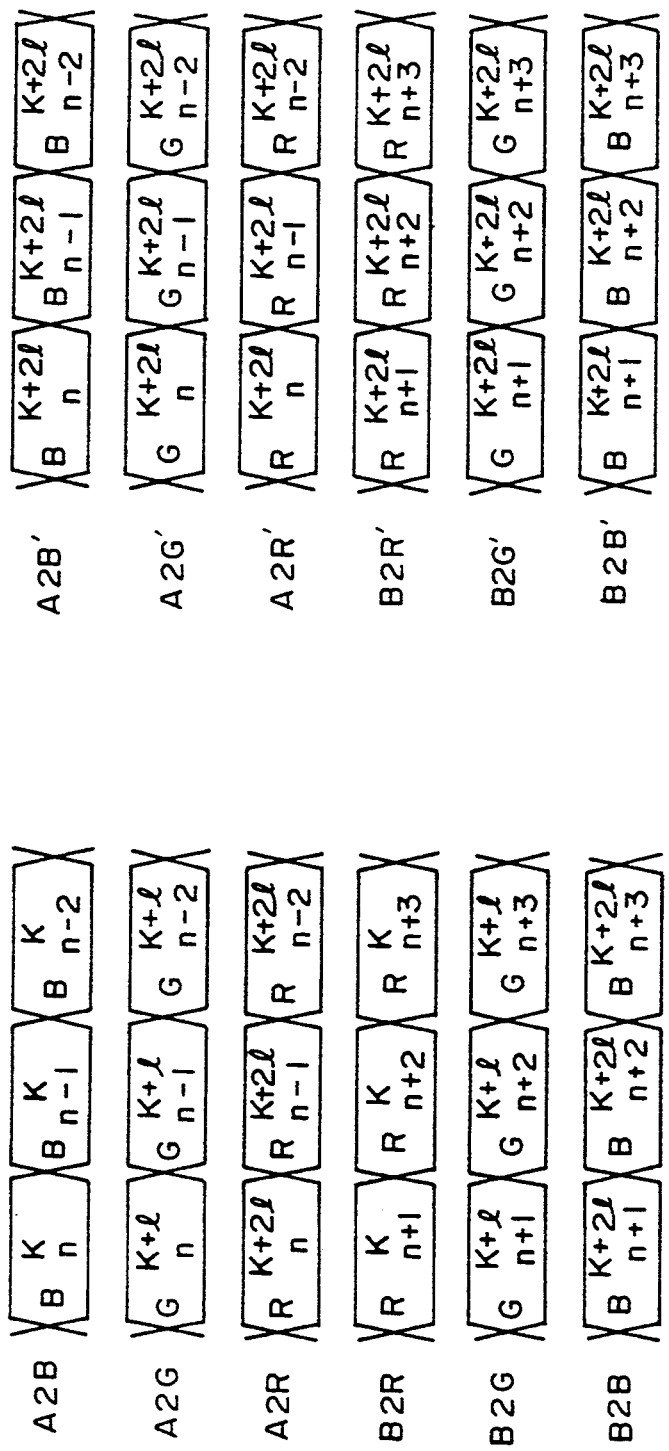
FIGS. 49A and 49B are diagrams showing the operation of a rearrangement process executed in the signal processing unit shown in FIG. 48.

Output signals A1B, B1B, A1G, B1G, A1R and B1R respectively output from the photodiode arrays 106aB, 106bB, 106aG, 106bG, 106aR and 106bR are sampled and held by six S/H circuits 111a and 111b shown in FIG. 48. Output signals of the S/H circuits 111a and 111b are converted into digital signals A2B, B2B, A2G, B2G, A2R and B2R by A/D converters 112a and 112b. As shown in FIG. 47, the photodiode arrays of the CCD line sensors 122a and 122b handle three adjacent lines. Thus, the signals A1B, B1B, A1G, B1G, A1R and B1R have pixel information concerning the three lines at one time. With the above in mind, the signal A2B is delayed by means of the FIFO memory 116c by a time equal to 21 lines. The signal A2G is delayed by means of the FIFO memory 116d by a time equal to one line. The signal B2G is delayed by the FIFO memory 116e by one line. The signal B2R is delayed by the FIFO memory 116f by 21 lines. Hence, the read controller 123 and the write controller 124 execute the read and write operation at the same clock frequency. Further, the read controller 123 and the write controller 124 make the read clock signal lag behind the write clock signal by 21×n with respect to the FIFO memories 116c and 116f, and makes the read clock lag behind the write clock signal by 1×n with respect to the FIFO memories 116d and 116e. As a result, the signals A2B, B2B, A2G, B2G, A2R and B2R shown in FIG. 49A are converted into signals A2B', B2B', A2G', B2G', A2R' and B2R' shown in FIG. 49B, which respectively have information concerning the same line at the same time. Then, the signals A2B', B2B', A2G', B2G', A2R' and B2R' are applied to the related rearrangement circuits 113, which derive, therefrom, one-line signals for the respective colors. Then, the shading correction is carried out in the circuits 114. As has been described above, by using the three-line color reading CCD line sensors 122a and 122b, it is possible to perform the color reading. If CCD line sensors have three, photodiode arrays arranged in a line, it is possible to obtain the signals shown in FIG. 49B by using FIFO memories equal in number to the FIFO memories 116c–116f.

A description will now be given of the signal processing unit 11 used in the aforementioned second embodiment of the present invention, as shown in FIG. 28A. As has been described previously, the second embodiment uses the light interrupting members 29a and 29b.

Figure 50:
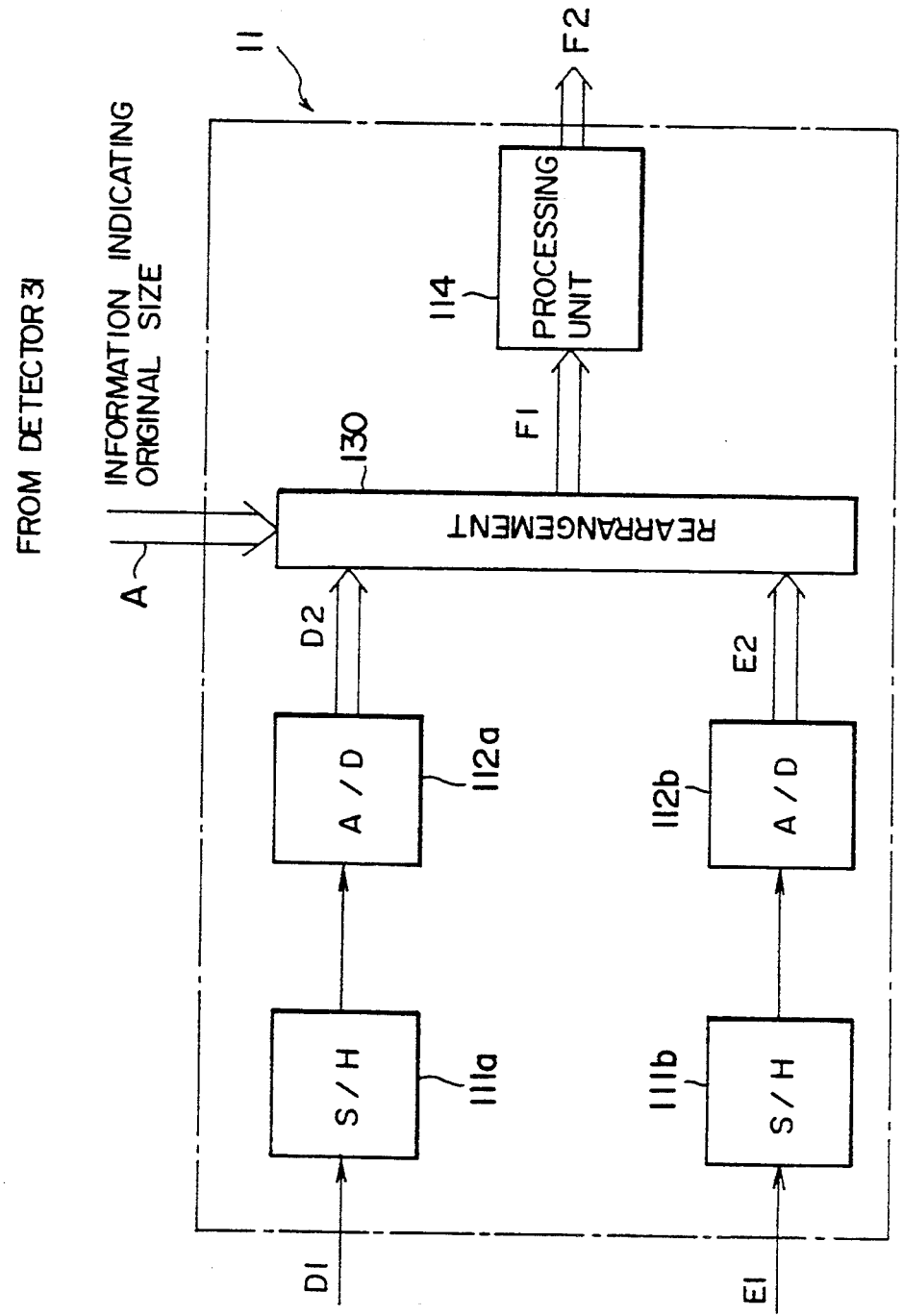
FIG. 50 is a block diagram showing the structure of the signal processing unit used in the second embodiment of the present invention.

FIG. 50 shows the signal processing unit 11 used in the second embodiment of the present invention. The rearrangement circuit 113 shown in FIG. 37 is replaced by a rearrangement circuit 130, as shown in FIG. 50. The rearrangement circuit 130 receives, from the original size detector 31 shown in FIG. 28A, information A indicating the size of the original 1.

Figure 51:
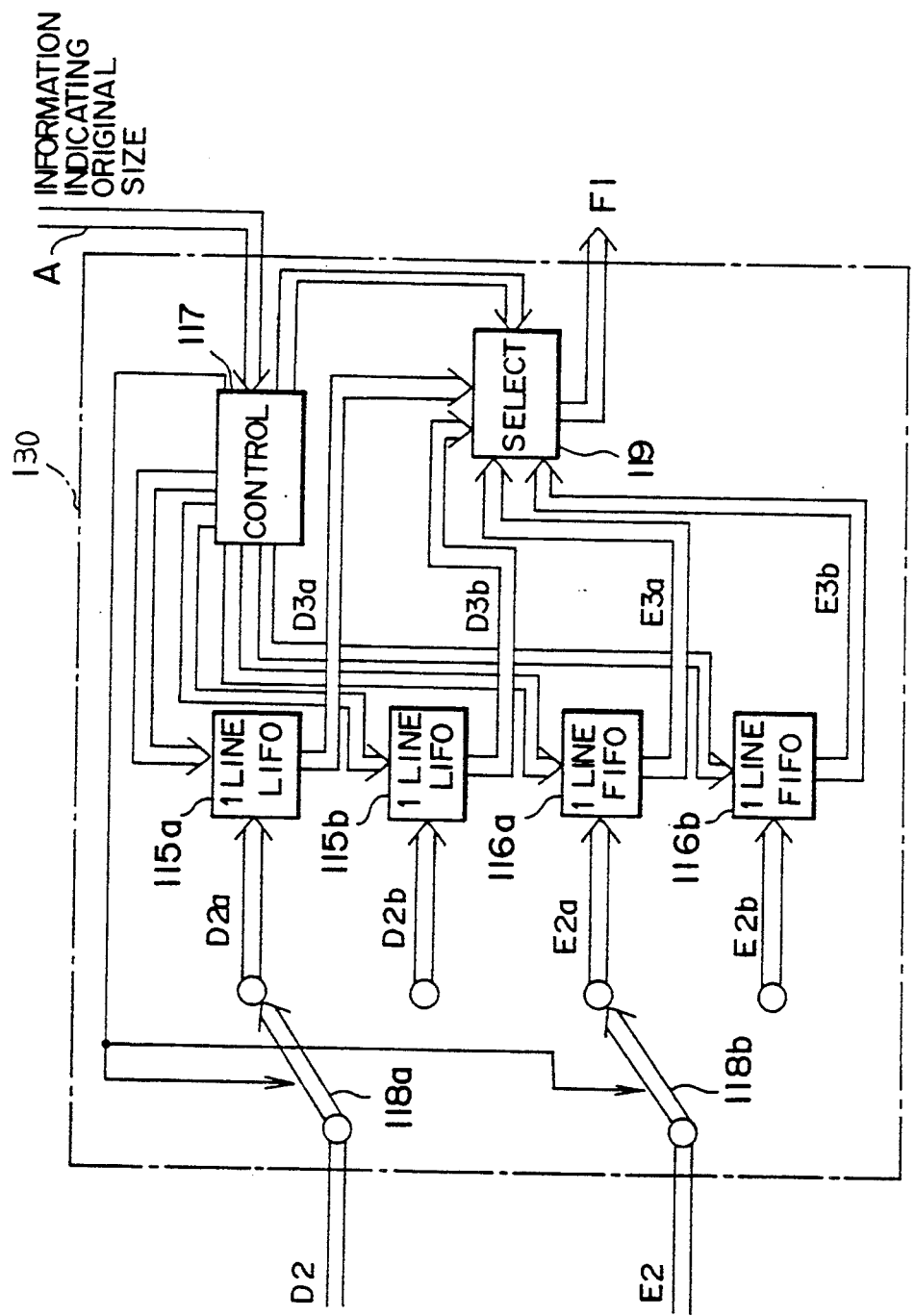
FIG. 51 is a block diagram of a rearrangement circuit shown in FIG. 50.
Figure 52:
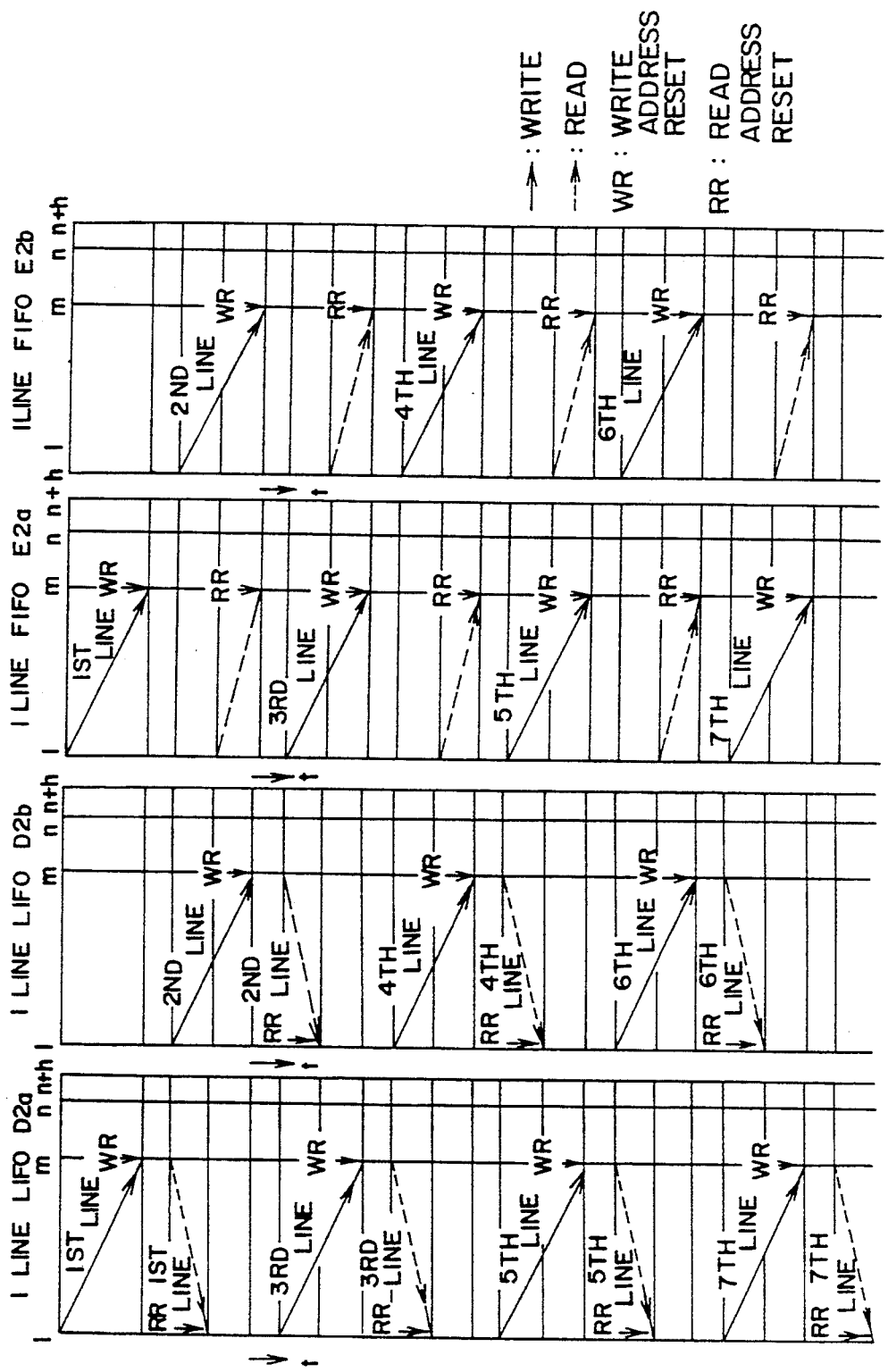
FIGS. 52 and 53 are diagrams showing the operation of the rearrangement circuit shown in FIG. 51.
Figure 53:
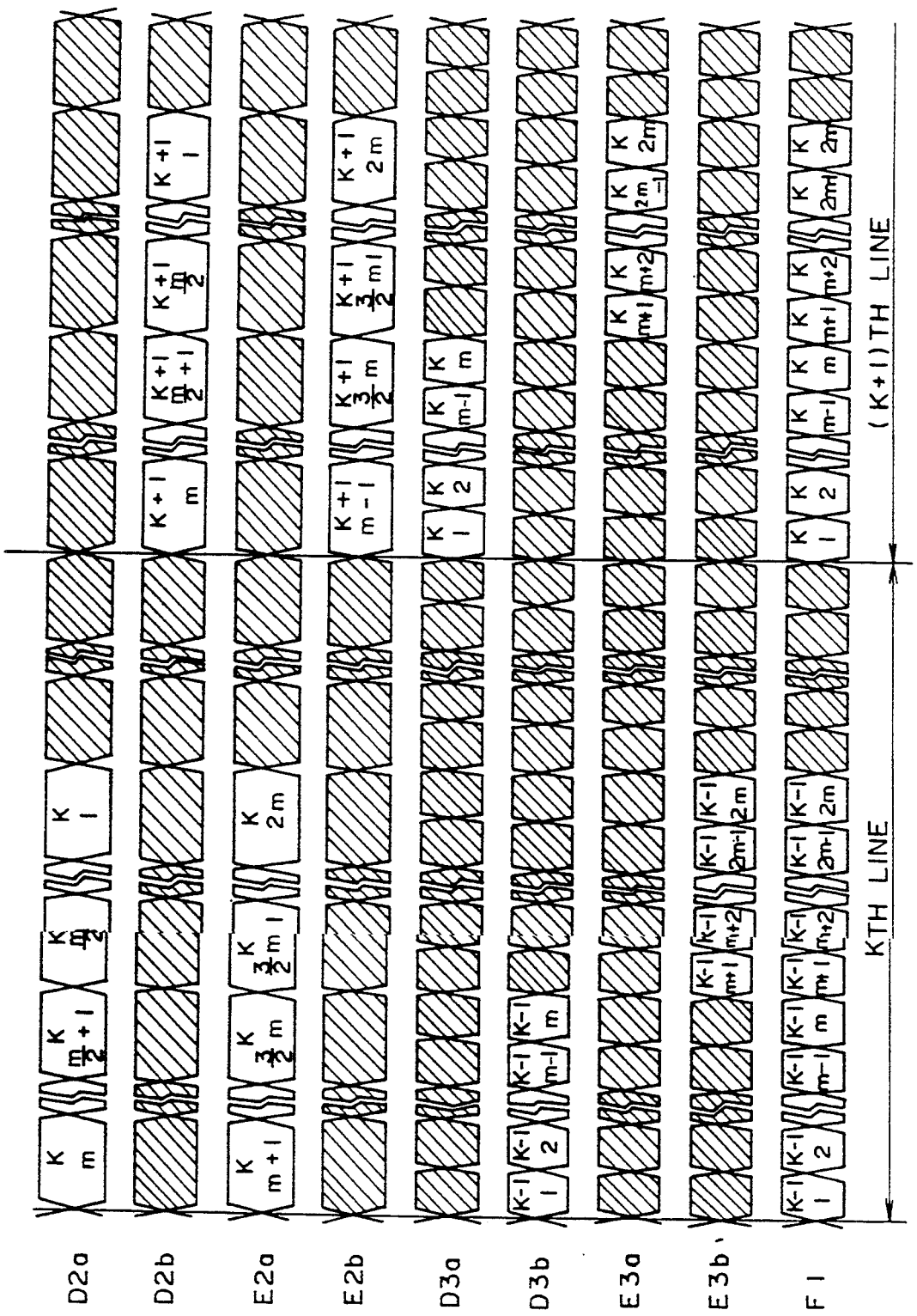

FIG. 51 shows the rearrangement circuit 130 shown in FIG. 50. In FIG. 51, parts which are the same as those shown in FIG. 38 are given the same reference numerals as previously. The controller 117 receives the original size information A, and controls, on the basis thereof, the switches 118a, 118b, the LIFO memories 115a and 115b, the FIFO memories 116a and 116b, and the select circuit 119. The control process of the controller 117 shown in FIG. 51 is different from that of the controller 117 shown in FIG. 38 in the following. When the original size information showing the number of pixels in one line changes from 2 n to 2 m, as shown in FIGS. 52 and 53 the write and read operations are stopped when n pixel signals are written or read, and the write and read addresses are reset to the respective initial values.

Figure 54:
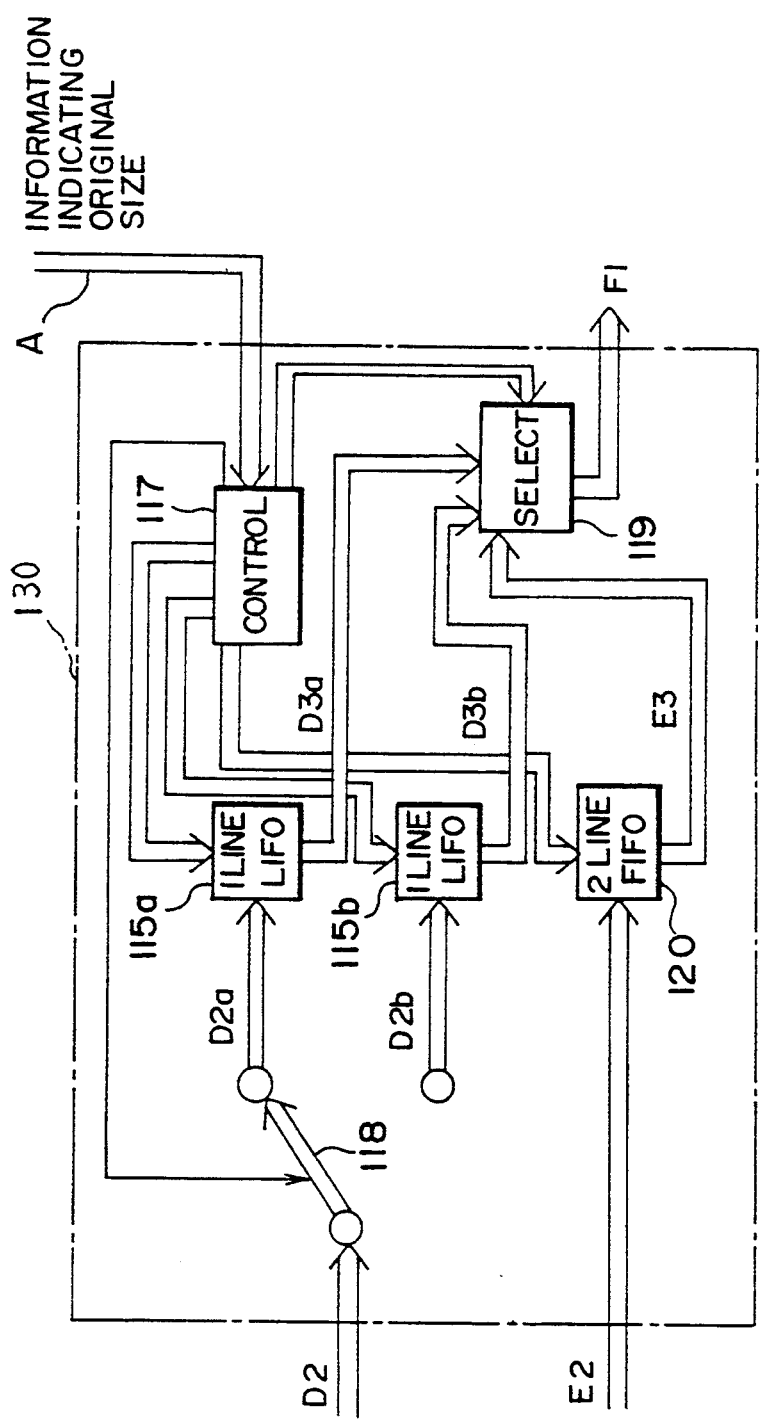
FIG. 54 is a block diagram of a variation of the rearrangement shown in FIG. 51.
Figure 55:
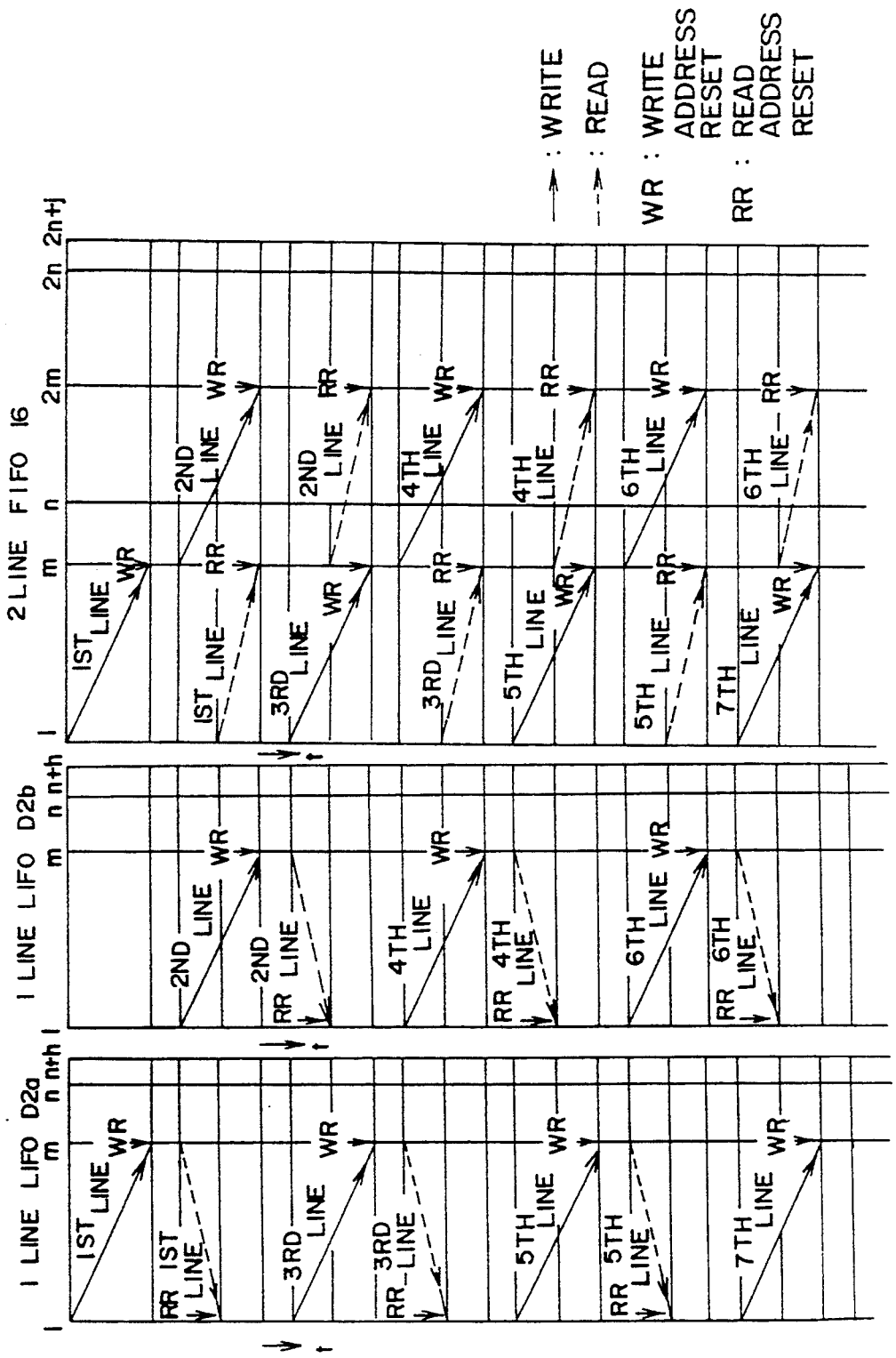
FIGS. 55 and 56 are diagrams showing the operation of the configuration shown in FIG. 54.
Figure 56:
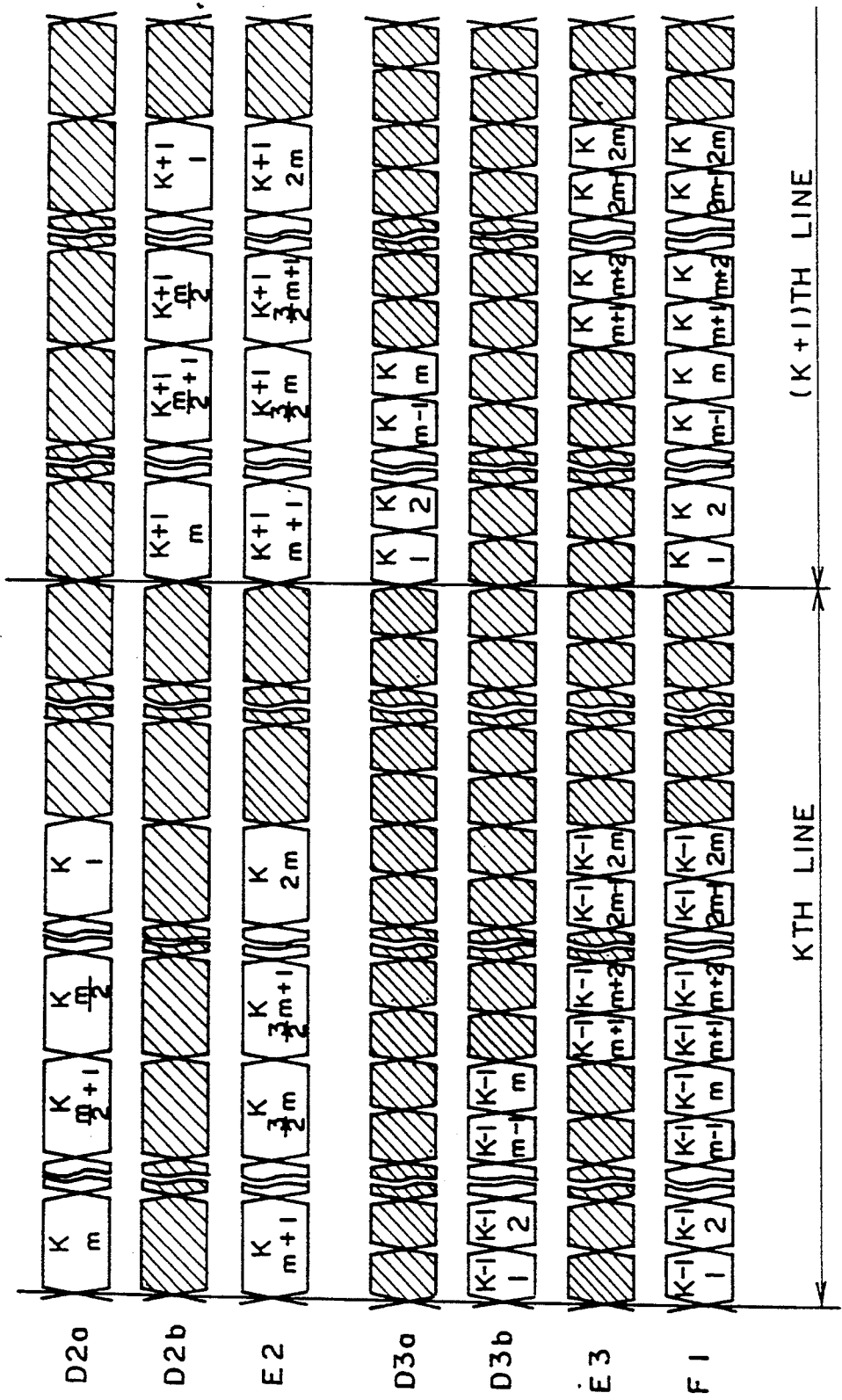

It is possible to use the rearrangement circuit 130 having a configuration as shown in FIG. 54. The controller 117 shown in FIG. 54 has functions based on the functions of the controller 117 shown in FIG. 41 and the controller 117 shown in FIG. 51. FIGS. 55 and 56 show the operation of the rearrangement circuit 130 shown in FIG. 54.

Figure 57:
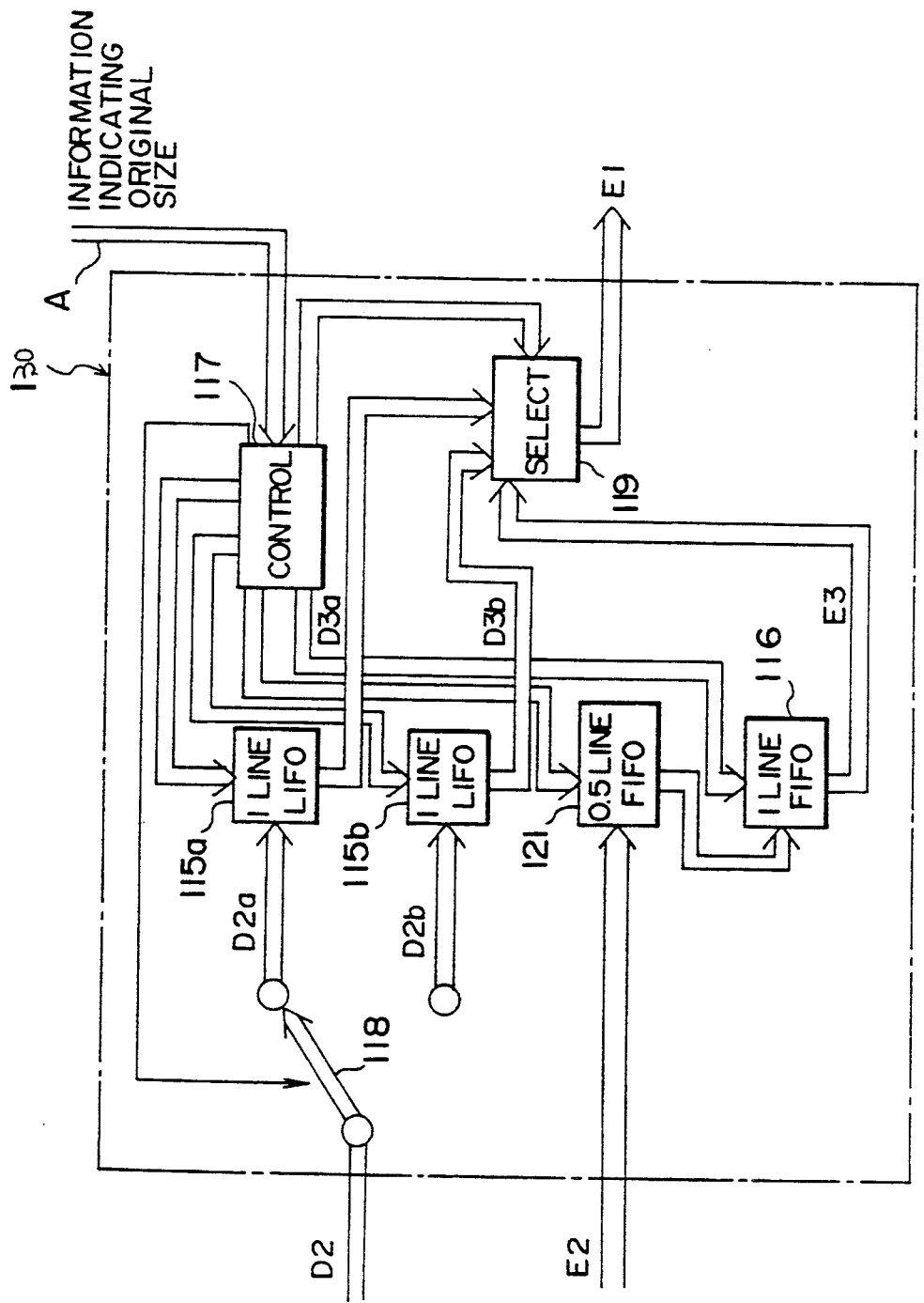
FIG. 57 is a block diagram of another variation of the rearrangement circuit.
Figure 58:
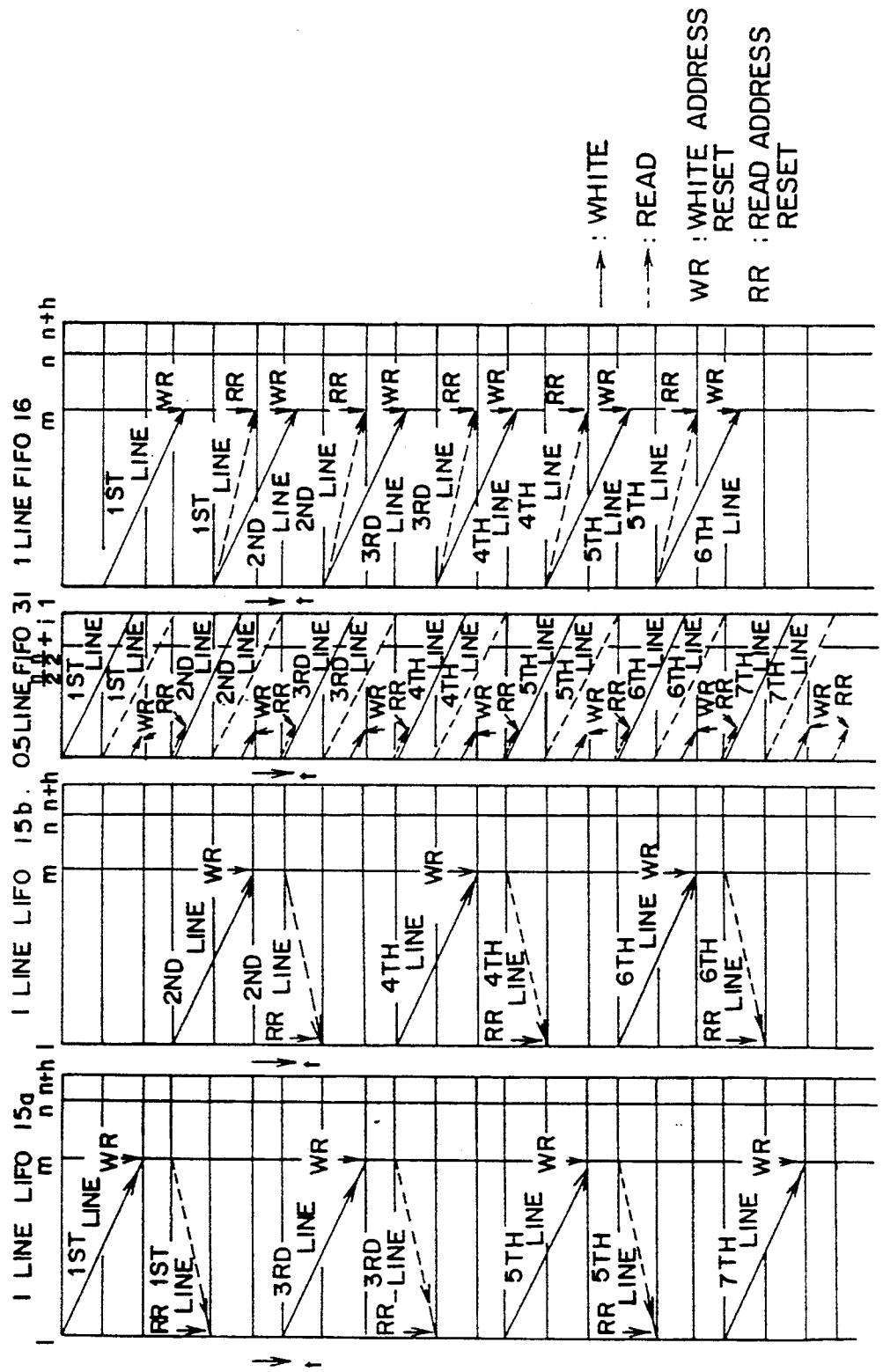
FIGS. 58 and 59 are diagrams showing the operation of the rearrangement circuit shown in FIG. 57.
Figure 59:
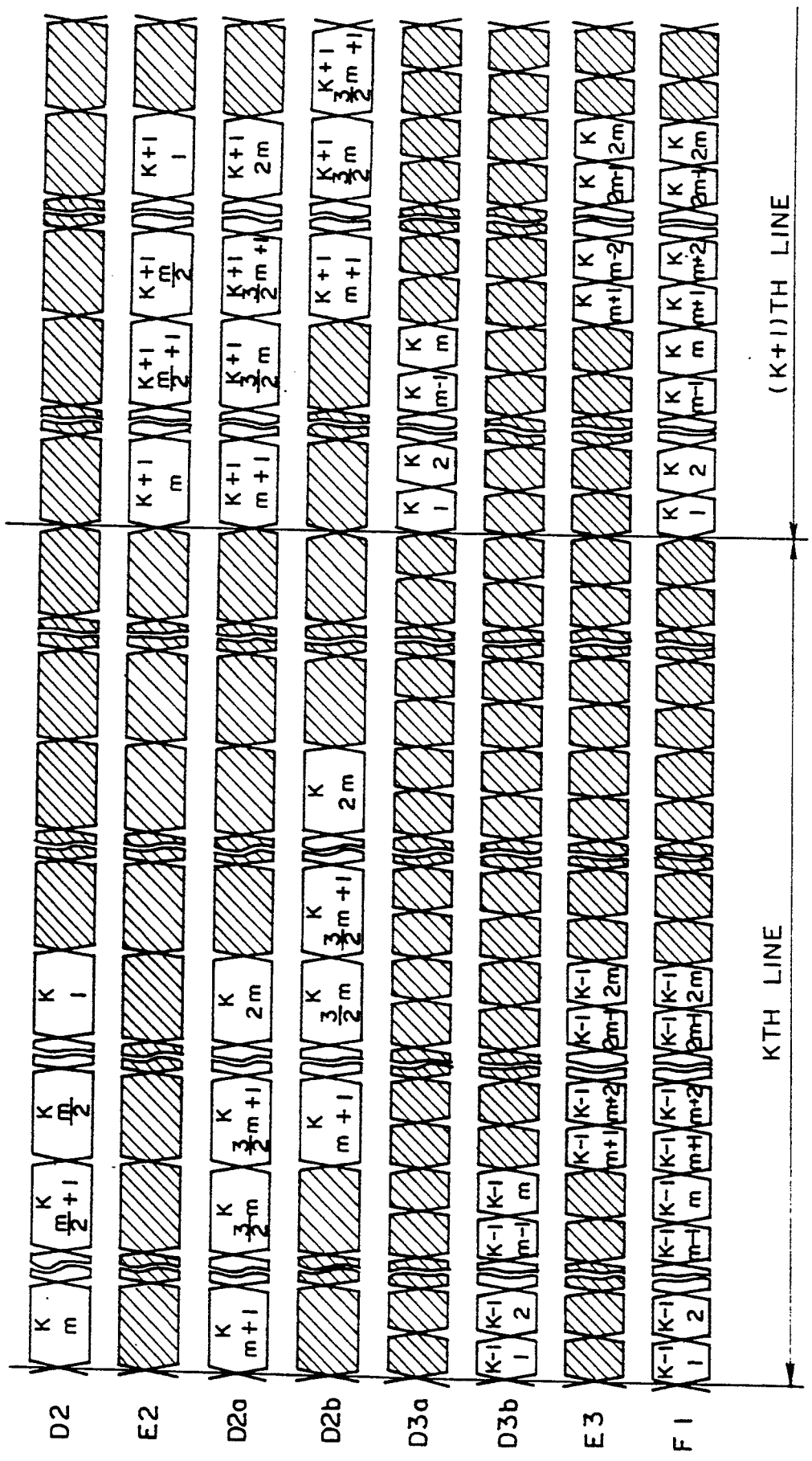

It is also possible to use the rearrangement circuit having a configuration as shown in FIG. 57, which can be replaced by the configuration shown in FIG. 44. That is, the controller 117 shown in FIG. 57 has functions based on the functions of the controller 117 shown in FIG. 44 and the controller 117 shown in FIG. 51. FIGS. 58 and 59 show the operation of the rearrangement circuit 130 shown in FIG. 57.

As has been described previously with reference to FIG. 44, it is required that the FIFO memory 121 has a storage capacity equal to or greater than 2/n pixels. Even if this condition is satisfied, there is a possibility that pixel information concerning the (k+1)th line may be overwritten into a storage area from which pixel information concerning the kth line is being read. In order to avoid the above problem, the following condition must be satisfied:

$$ta' + tb' \leq (ta'/2) + (ma'/n) \times ta'$$

where ta' denotes the time necessary to execute the writing or reading of pixel information concerning valid pixels in one line, tb' denotes the time necessary to transfer information concerning invalid pixels, and ma' denotes a memory capacity of the FIFO memory 121.

Figure 60:
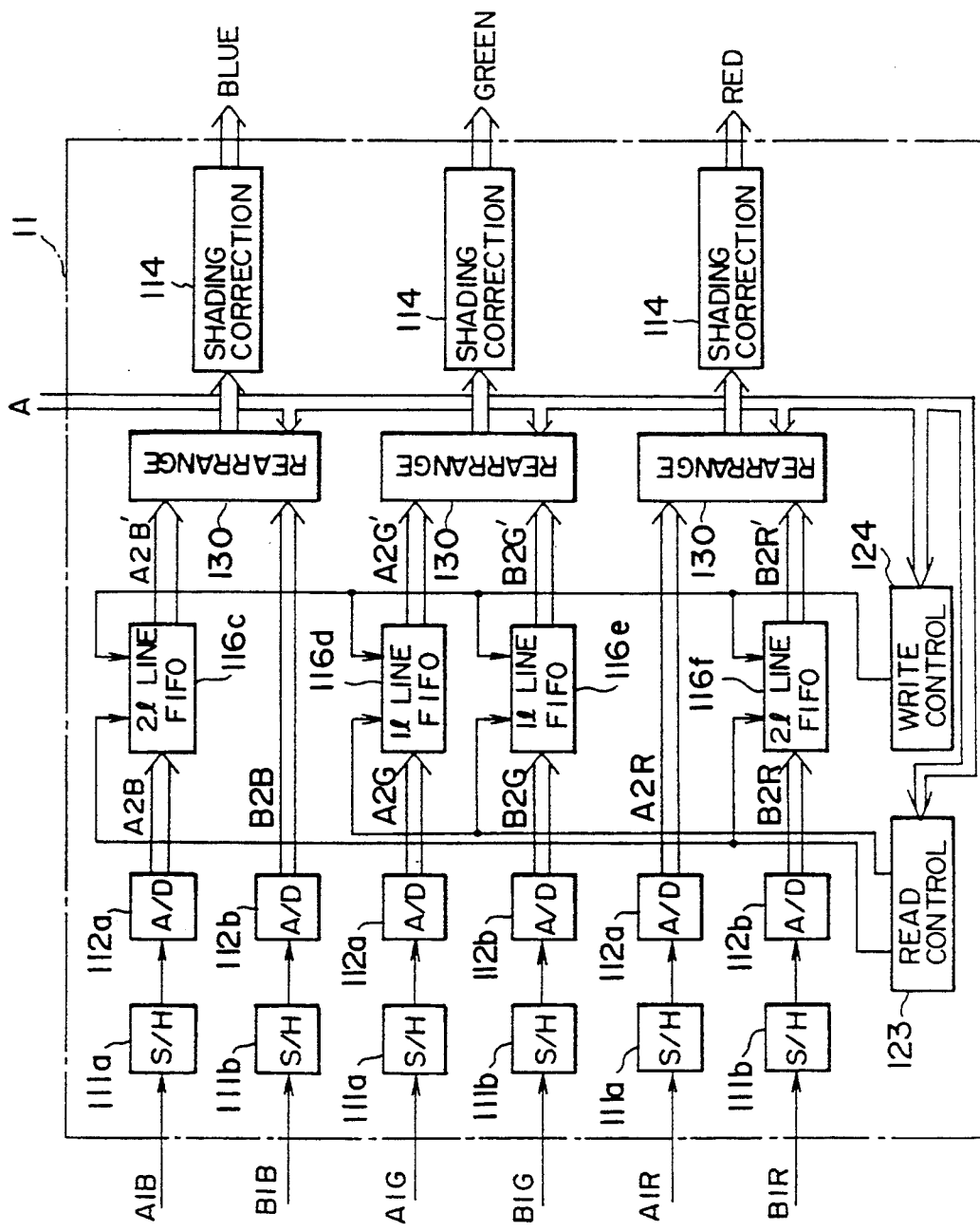
FIG. 60 is a block diagram showing the structure of the signal processing unit employed when the CCD sensors shown in FIG. 47 are used.

When the color reading CCD sensors as shown in FIG. 47 are used together with the light interrupting members 29a and 29b, the signal processing unit 11 is configured as shown in FIG. 60, which is obtained by changing the configuration shown in FIG. 48 so that the rearrangement circuit 113 are replaced by the rearrangement circuits 130 shown in FIG. 50. As shown in FIG. 60, the rearrangement circuits 130 operate in response to the original size information A. The rearrangement circuits 130 are configured as shown in FIG. 51, FIG. 54 or FIG. 57. The read controller 123 and the write controller 124 are also changed so that they operate in response to the original size information A. The read controller 123 and the write controller 124 operate at the same clock frequency. The read clock is made to lag behind the write clock by 21 lines with respect to the FIFO memories 116c and 116f. The read clock is made to lag behind the write clock by 1×m with respect to the FIFO memories 116d and 116e. In this manner, the color reading can be performed.

A description will now be given of a third embodiment of the present invention, which is intended to precisely correct dark output signals of the CCD line sensors even when a number of pixels of the original smaller than the number of pixels of each CCD line sensor is transferred therefrom. The correction of the dark output signals of the CCD line sensors is carried out in the signal processing unit 11.

Figure 61:
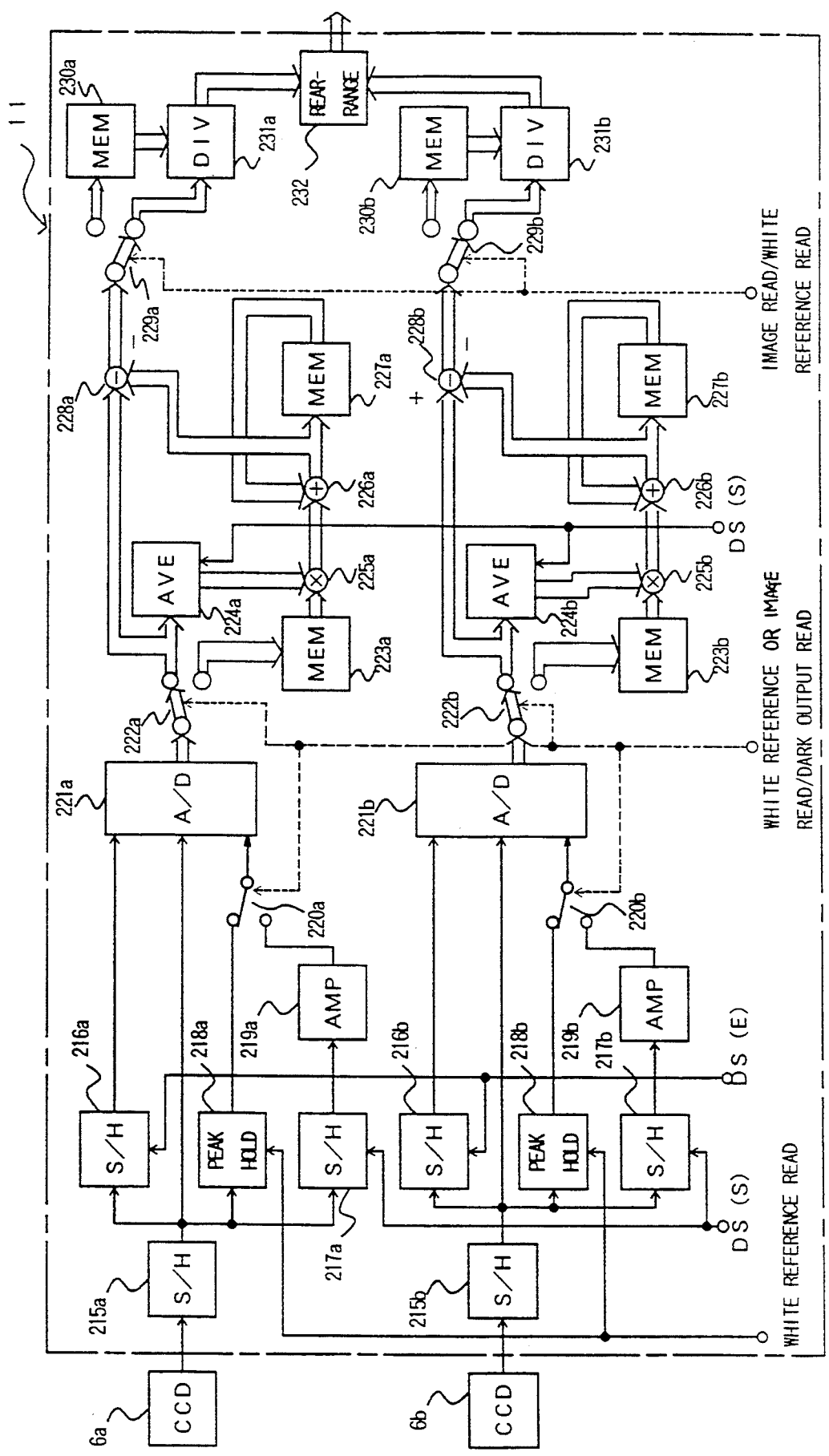
FIG. 61 is a block diagram showing the structure of the signal processing unit used in a third embodiment of the present invention.

FIG. 61 shows the structure of the signal processing unit 11 used in the third embodiment of the present invention. The output signals of the CCD line sensors 6a and 6b of the image reader shown in, for example, FIG. 28A are applied to the signal processing circuit shown in FIG. 61. The essential features of the signal processing unit 11 used in the third embodiment of the present invention will be described below.

The output signals of the CCD line sensors 6a and 6b are based on the sum of signals dependent to the amount of exposure, and on dark output signals which occur regardless of the amount of exposure. When pixel information concerning only pixels of the original 1 is read from each of the CCD line sensors 6a and 6b, a photoelectric conversion output signal of a pixel of the original 1, which photoelectric conversion output signal is dependent on the amount of exposure corresponds to the sum of a dark output signal generated at the above pixel and a dark output signal generated at a non-read pixel located in a line prior to the line having the above pixel being considered is located and which is read during the previous scanning.

Figure 62:
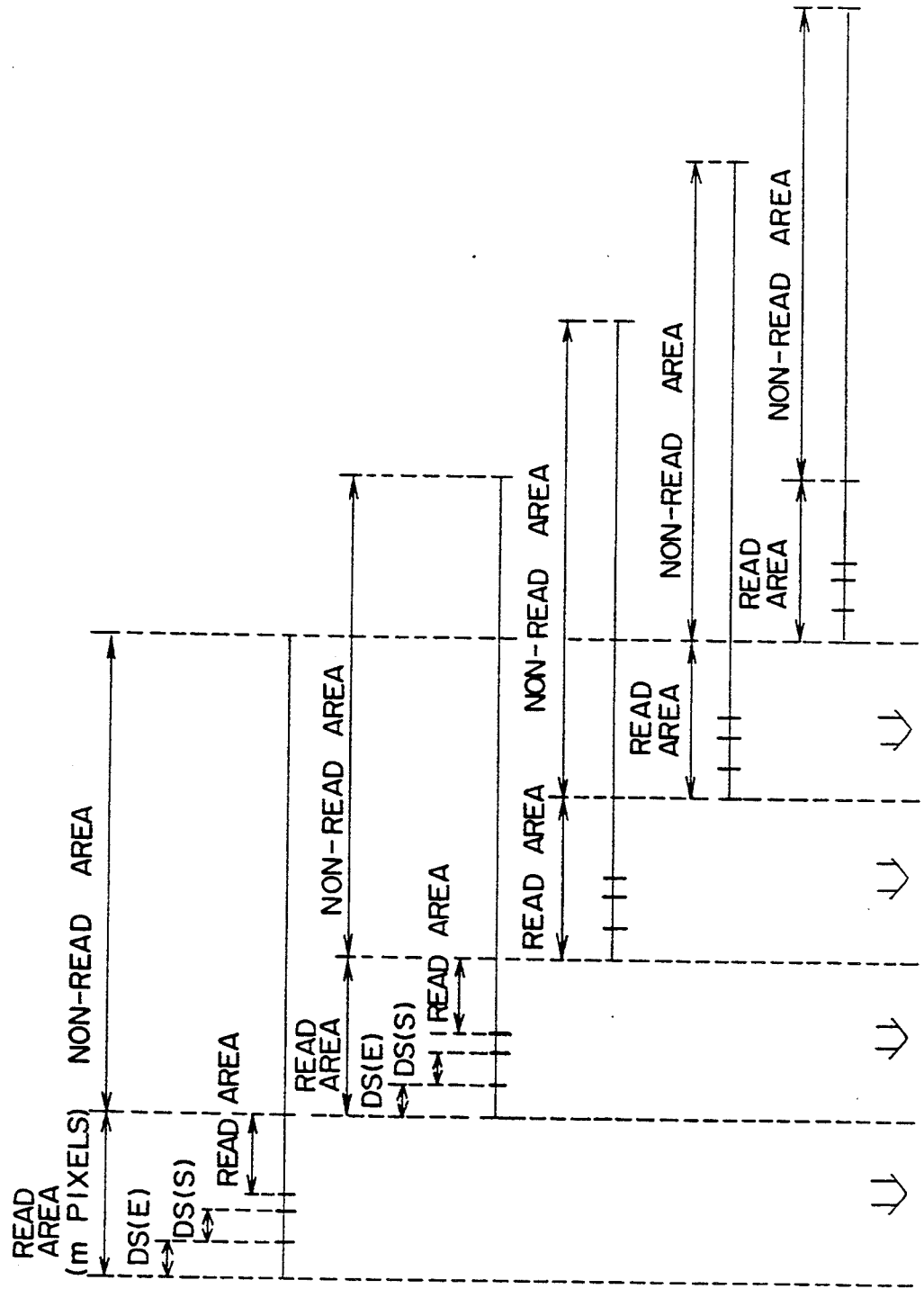
FIG. 62 shows a diagram showing how dark output signals overlap when 25% of all pixels of each CCD line sensor are read.

FIG. 62 shows how the dark output signals overlap when 25% of all the pixels of each of the CCD line sensors 6a and 6b are read therefrom. When m pixels are read from each of the CCD line sensors 6a and 6b respectively having the CCD shift registers 8a and 8b each having n pixels in the state where there are no changes in the dark output signals during the time when the original is being read one time, a pixel output signal dout(i,j) of the jth pixel located in the ith line is written as follows:

$$dout(i,j) = dmo(i,j) + \Sigma\{dbk(j + m(h-1))\} \quad (1)$$

where dmo(i,j) denotes a pixel output signal of the jth pixel in the ith line, dbk(k) denotes a dark output signal generated at the kth pixel of the CCD line sensor, and is equal to zero when k>n.

In order to efficiently convert pixel information concerning the original 1 to an electric signal, it is necessary to execute a first correction process for reducing the dark output signals in the output signals of the CCD line sensors 6a and 6b, a second correction process for canceling variations in the sensitivities of the pixels of the CCD line sensors 6a and 6b, and a third correction process for correcting variations in the intensity distribution of the light source 3 (shading correction). In addition, the rearrangement process for rearranging the output signals of the CCD line sensors 6a and 6b is needed. The signal processing unit 11 used in the third embodiment of the present invention performs the above first to third correction processes as well as the rearrangement process.

Returning now to FIG. 61, the signal processing unit 11 is configured as follows. Sample and hold circuits 215a and 215b, which receive the output signals of the CCD line sensors 6a and 6b, respectively. A sample and hold circuit 216a holds pixel information concerning pixels other than isolation pixels of the CCD line sensor 6a provided on each end of the photodiode array 7a. Similarly, a sample and hold circuit 216b holds pixel information concerning pixels other than isolated pixels of the CCD line sensor 6b provided on each end of the photodiode array 7b. As is well known, CCD line sensors have isolation pixels. A sample and hold circuit 217a holds pixel information concerning pixels which are covered by the light interrupting member 29a shown in FIG. 29. Similarly, a sample and hold circuit 217b holds pixel information concerning pixels which are covered by the light interrupting member 29b shown in FIG. 29. Further, the signal processing unit 11 comprises peak hold circuits 218a and 218b, amplifiers 219a and 219b, switch circuits 220a and 220b, A/D converters 22a and 22b, switch circuits 222a and 222b, dark output memories 223a and 223b, and averaging circuits 224a and 224b. The A/D converter 221a functions as a normalizing circuit, which normalizes the dark output signal in one line with respect to the output signals of the sample and hold circuits 216a and 217a. Similarly, the A/D converter 221b functions as a normalizing circuit, which normalizes the dark output signal in one line with respect to the output signals of the sample and hold circuits 216b and 217b. The dark output memories 223a and 223b store the normalized dark output signals output from the A/D converters 221a and 221b, respectively. The averaging circuit 224a stores output signals of pixels covered by the light interrupting member 29a. The averaging circuit 224b stores output signals of pixels covered by the light interrupting member 29b. A multiplier circuit 225a multiplies the output signal read from the dark output memory 223a by the output signal of the averaging circuit 224a, and generates a dark output signal generated at each pixel. A multiplier circuit 225b multiplies the output signal read from the dark output memory 223b by the output signal of the averaging circuit 224b, and generates a dark output signal generated at each pixel. A combination of an adder 226a and a memory 227a generates an actual dark output signal actually output from the CCD line sensor 6a by using the output signal of the multiplier circuit 225a. A combination of an adder 226b and a memory 227b generates an actual dark output signal actually output from the CCD line sensor 6b by using the output signal of the multiplier circuit 225b. A subtracter 228a subtracts the output signal of the adder 226a from the signal from the A/D converter 221a via the switch circuit 222a. A subtracter 228b subtracts the output signal of the adder 226b from the signal from the A/D converter 221b via the switch circuit 222b. A switch 229a connects the subtracter 228a to either a white reference memory 230a or a divider 231a. A switch 229b connects the subtracter 228b to either a white reference memory 230b or a divider 231b. Output signals of the dividers 231a and 231b are applied to a rearrangement circuit 232, which rearranges the output signals of the dividers 231a and 231b so that one-line pixel information concerning pixels arranged from an end of the original can be obtained.

Figure 63:
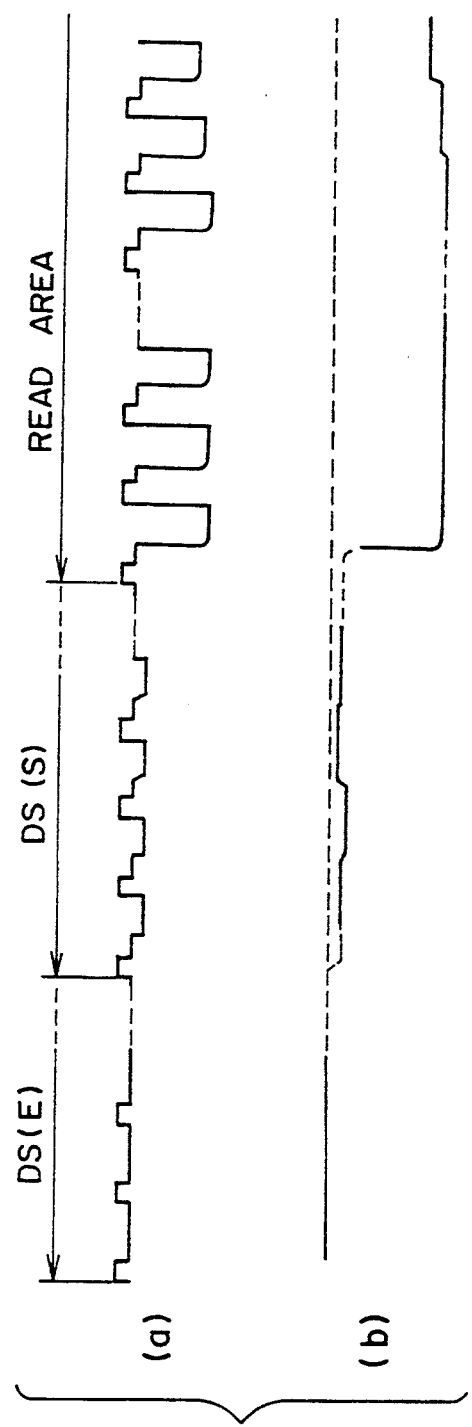
FIGS. 63, 64 and 65 are waveform diagrams used for explaining the principle of the third embodiment of the present invention.

The operation of the signal processing unit 11 shown in FIG. 61 will now be described. Each of the CCD line sensors 6a and 6b generates an output signal concerning one line of the original 1, as shown in FIG. 63-(a) and (b). A signal DS(E) is a signal generated from isolation pixels, which do not have photodiodes but have transfer elements of the CCD transfer register. A signal DS(S) is a signal generated from pixels covered by the light interrupting member. Pixel information concerning pixels of the original 1 follows the signal DS(S). The output signals of the CCD line sensors 6a and 6b transferred for each line are applied to the sample and hold circuits 215a and 215b shown in FIG. 61. The transfer clock signals are removed from the output signals of the CCD line sensors 6a and 6b, so that signals as shown in FIG. 63-(b) are obtained. Before all signal processing in each structural element of the signal processing unit 11 is carried out, the write and read addresses supplied to the memories of the signal processing unit 11 are reset.

Figure 64:
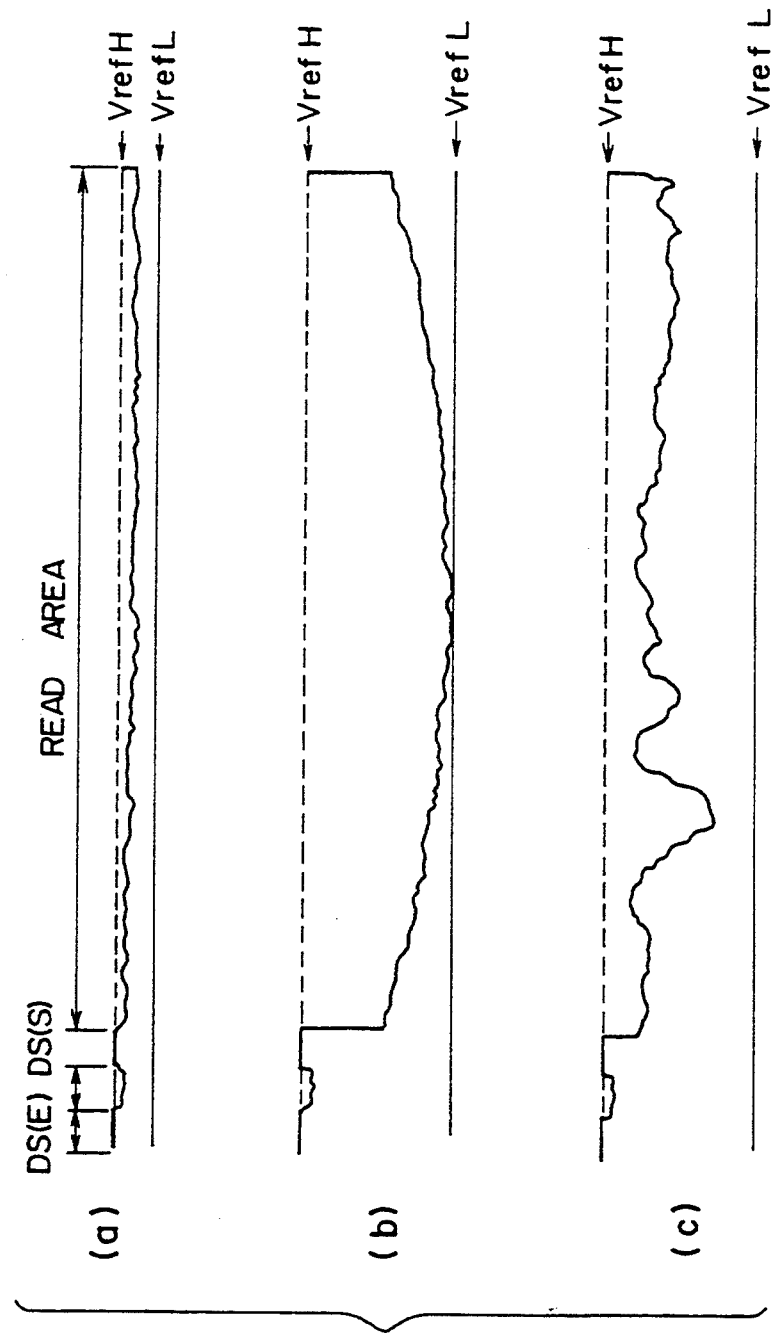

Then, the dark output signals regarding one line are generated and stored in the following manner. The switches 220a and 220b are controlled so that the amplifiers 219a and 219b are selected. The output signals of the sample and hold circuits 215a and 215b are applied to the sample and hold circuits 216a and 216b, the sample and hold circuits 217a and 217b, and the A/D converters 212a and 212b, respectively. When the amount of exposure of each of the CCD line sensors 6a and 6b for one line is set to be zero, the output signals of the CCD line sensors 6a and 6b in one line are sampled and held by the sample and hold circuits 215a and 215b, and have waveforms as shown in FIG. 64-(a). As shown in FIG. 64-(a), the signal DS(S) and the signal in the read range have dark output signal levels, which level vary for each pixel. The output signals of the sample and hold circuits 215a and 215b are respectively applied to the sample and hold circuits 216a and 216b, which sample and hold the above output signals by using the value of the signal DS(E). The sample and hold levels by the sample and hold circuits 216a and 216b are used as upper-limit reference levels VrefH of the A/D conversion circuits 221a and 221b. The output signals of the sample and hold circuits 216a and 216b are also applied respectively to the sample and hold circuits 217a and 217b, and sampled and held by an average value of the signal DS(S) or a representative value thereof. The sampled and held levels by the sample and hold circuits 217a and 217b are respectively amplified by the amplifier circuits 219a and 219b, and are then used as lower-limit reference levels VrefL of the A/D conversion circuits 221a and 221b. The relation among the reference levels VrefH and VrefL and the output signals of the sample and hold circuits 217a and 217b are as shown in FIG. 64-(a). The A/D converters 221a and 221b convert the output signals from the sample and hold circuits 215a and 215b into digital signals using the upper-limit reference levels VrefH and the lower-limit reference levels VrefL. The digital signals thus obtained pass through the switches 222a and 222b and are written into the dark output memories 223a and 223b, respectively. In this case, the digital signals respectively amounting to one line (n pixels of each of the CCD line sensors 6a and 6b) are written into the memories 223a and 223b. Each of the dark output memories 223a and 223b has a storage capacity equal to or greater than one line of the maximum readable range. In this manner, two dark output patterns regarding one line are obtained with respect to the average values of the signals DS(S) regarding the pixels covered by the light interrupting members 29a and 29b or the representative values thereof. Each of the two dark output patterns is written as follows:

$$dbk(j)/dbk \qquad (2)$$

where dbk(j) denotes a dark output signal of the jth pixel obtained during the dark output reading operation, and dbk denotes the average value of the signal DS(S) or the representative value thereof obtained during the dark output reading operation. The above (2) shows how large the dark output signal level of each pixel is with respect to the average value of the output signal levels of the pixels covered by the light interrupting member or the representative value thereof. That is, the dark output signal level of each pixel is dbk(j)/dbk times the average value of the output signal levels of the pixels covered by the light interrupting member or the representative value thereof. Thereafter, the write and read addresses of the dark output memories 223a and 223b are reset.

Next, data concerning a white reference (level) in one line is generated as follows. During the data obtained by reading a white reference member (plate) is being generated, there is no remaining dark output signal because all the pixel signals of the CCD line sensors 6a and 6b have been output by the process for obtaining the dark output signal patterns. In the white reference data generating process, the switch circuits 220a and 220b are controlled so that the peak hold circuits 218a and 218b are respectively selected. The output signals of the sample and hold circuits 215a and 215b are applied to the peak hold circuits 218a and 218b, respectively. When the white reference is read along a line, peak levels of read signals of the white reference are held in the peak hold circuits 218a and 218b. The peak levels held in the peak hold circuits 218a and 218b are used as lower-limit levels VrefL of the A/D converters 221a and 221b, respectively. When the white reference is read the next time, the output signals of the sample and hold circuits 215a and 215b are applied to the sample and hold circuits 216a and 216b, respectively, in which the above output signals are sampled and held using the value of the signal DS(E). The levels of the output signals output by the sample and hold circuits 216a and 216b are respectively used as upper-limit levels of the A/D converters 221a and 221b. The relation among the upper-limit and lower-limit levels VrefH and VrefL and the output signals of the sample and hold circuits 215a and 215b is as shown in FIG. 64-(b). The output signals of the A/D converters 221a and 221b are respectively written as follows:

$$dwo(j)/(VrefH\text{-}VrefL)+dbk(j)/(VrefH\text{-}VrefL)=\{dwo(j)+dbk(j)\}/(VrefH\text{-}VrefL) \qquad (3)$$

where dwo denotes a photoelectric conversion output signal obtained when the white reference is read.

The output signals of the A/D converters 221a and 221b are then applied to the averaging circuits 224a and 224b and the subtracters 228a and 228b via the switch circuits 222a and 222b. Each of the averaging circuits 224a and 224b calculates the sum of the pixel signals which are successively input when control signals are ON, and calculates the average value of the pixel signals. The average value thus obtained in each of the averaging circuits 224a and 224b are held therein for a time. The above control signals are turned ON while the signal DS(S) is being output. During this time, the photoelectric conversion output signals dwo(j) are zero, and each of the output signals of the averaging circuits 224a and 224b is the average value of the pixel signals in the signal DS(S) or the representative value thereof dbk. The values dbk are applied to the multiplier circuits 225a or 225b in the white reference reading operation. The multiplier circuits 225a and 225b are also supplied with the output signals (defined by equation (2)) of the dark output memories 223a and 223b. Hence, the output signals of the multiplier circuits 225a and 225b are each written as follows:

$$\{dbk/VrefH\text{-}VrefL\}\cdot\{dbk(j)/dbk\}=dbk(j)/(VrefH\text{-}VrefL) \qquad (4).$$

The output signals of the multiplier circuits 225a and 225b are respectively applied to the adders 226a and 226b each having a storage area equal to or greater than one line of each of the CCD line sensors 6a and 6b. The sum of the output signals of the memory 227a and the multiplier circuit 225a is output from the adder 226a. Similarly, the sum of the output signals of the memory 227b and the multiplier circuit 225b is output from the adder 226b. It will be noted that the memories 227a and 227b are initially reset and all data initially stored therein is zero. Hence, the output signals of the adders 226a and 226b are the output signals of the multiplier circuits 225a and 225b (defined by equation (4)), respectively. The output signals of the adders 226a and 226b are respectively applied to minus (−) input terminals of the subtracters 228a and 228b. The signals defined by equation (3) are applied to plus (+) input terminals of the subtracters 228a and 228b. Hence, the output signals of the subtracters 228a and 228b ((3)−(4)) are respectively described as follows:

$$dwo(j)/(VrefH\text{-}VrefL) \qquad (5).$$

The above calculation concerning the white reference reading is carried out for each readout pixel (m pixels in each of CCD line sensors 6a and 6b). The output signals of the subtracters 228a and 228b defined by the above (5) are stored in the white reference memories 230a and 230b via the switch circuits 229a and 229b, respectively. In this manner, the reading of the white reference in one line (in which m pixels are contained in each CCD line sensor) is completed. Thereafter, the write and read addresses of the memories 223a, 223b, 227a, 227b, 230a and 230b are reset.

After the reading of the white reference in one line is completed, all pixel signals of the CCD line sensors 6a and 6b are output prior to the inputting of pixel information concerning the original 1. Immediately before all pixel signals of the CCD line sensors 6a and 6b are output, there are no remaining dark output signals contained in the output signals of the CCD line sensors 6a and 6b. The inputting of pixel information (images) is carried out in the same manner as in the case of the white reference reading operation, and the output signals of the A/D converters 221a and 221b are similarly obtained. The relation among the reference levels VrefH and VrefL of the A/D converters 221a and 221b and the output signals of the sample and hold circuits 215a and 215b are as shown in FIG. 64-(c).

A description will now be given of the difference between the white reference input and the image input. The control signals applied to the averaging circuits 224a and 224b are ON only when the signal DS(S) of the first line is obtained. Thus, the values held and output by the averaging circuits 224a and 224b while pixel information in the read area is the average of the levels of the DS(S), that is, dbk/(VrefH—VrefL). Next, the dark output patterns (defined by formula (2)) regarding pixels from the first pixel to the nth pixel are sequentially read from the dark output memories 223a and 223b. After the dark output patterns concerning all the pixels of each of the CCD line sensors 6a and 6b have been output, zero is continuously output. Hence, the output signals of the multiplier circuits 225a and 225b are signals defined by formula (2) until the dark output patterns of the first to nth pixels are completely output, and are successively zero from the (n+1)th pixel and subsequent pixels. On the other hand, the read operations of the memories 227a and 227b are carried out so that the pixel signals of the first to the nth pixels are respectively read from the memories 227a and 227b, and then the read addresses applied thereto are reset. The write operations of the memories 227a and 227b are carried out so that the output signals of the first to nth pixels are written therein, and then the write addresses applied thereto are reset. Hence, the signals as per the following formula are respectively applied to the minus input terminals of the subtracters 228a and 228b:

$$\Sigma\{dbk(j+m(h-1))\} \qquad (6).$$

Meanwhile, the signals as per the following formula are respectively applied to the plus input terminals of the subtracters 228a and 228b:

$$dmo(i,j)/(VrefH - VrefL) +$$
$$\Sigma\{dbk(j + m(h - 1))\}/(VrefH - VrefL) = \qquad (7)$$
$$[dmo(i,j) + \Sigma\{dbk(j + m(h - 1))\}]/(VrefH - VrefL).$$

As a result, the output signals of the subtracters 228a and 228b are respectively written as follows:

$$dmo(i,j)/(VrefH-VrefL) \qquad (8).$$

Figure 65:
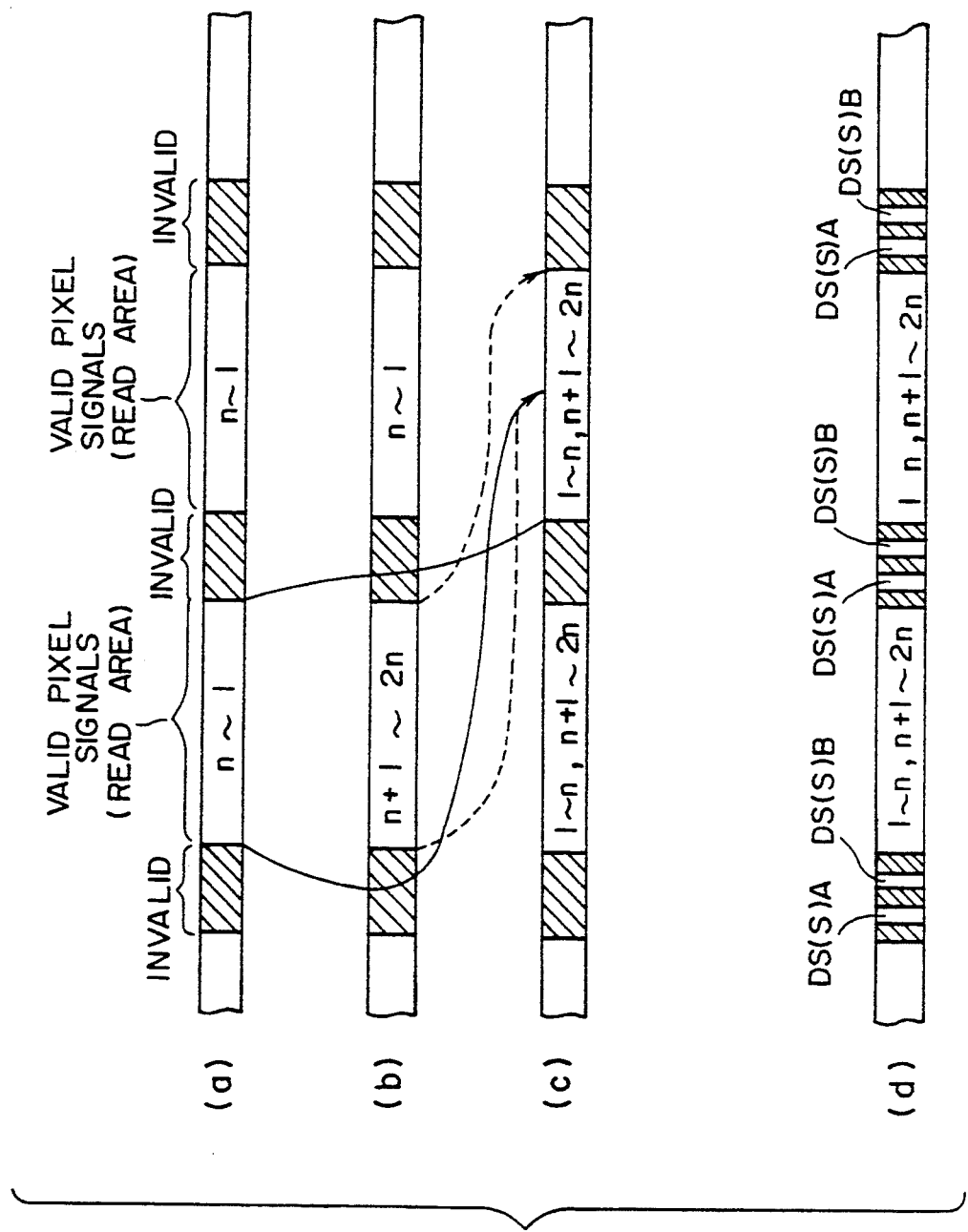

It can be seen from the above that only the image signals from which the dark output signals have been removed can be obtained. Then, the switch circuits 229a and 229b are controlled so that the subtracters 228a and 228b are respectively connected to the dividers 231a and 231b. For each line, the dividers 231a and 231b respectively divide the output signals of the subtracters 228a and 228b by the signals read out from the white reference memories 230a and 230b, respectively. Hence, the output signals of the dividers 231a and 231b are respectively (formula (8))/formula (5)), and thus dmo(j)/dwo(j). In the output signals dmo(j)/dwo(j) of the dividers 231a and 231b, the dark output correction and the shading correction have been performed. Then, the output signals of the dividers 231a and 231b are supplied to the rearrangement circuit 232, which rearranges these signals so that pixel information concerning the pixels arranged in a line from an end of the original 1 can be obtained. The output signals of the dividers 231a and 231b are as shown in FIG. 65-(a) and (b), and rearranged by means of the rearrangement circuit 232 so that a signal as shown in FIG. 65-(c) is obtained.

As described above, according to the third embodiment of the present invention, it is possible to perform the digitizing and shading correction processes without being affected by the dark output signals even if these dark output signals, arising from the previous reading operation, remain in the state where the dark output signals and the light intensity do not change during the read operation period. Of course, the third embodiment of the present invention has the same advantages as the aforementioned first and second embodiments of the present invention.

Figure 66:
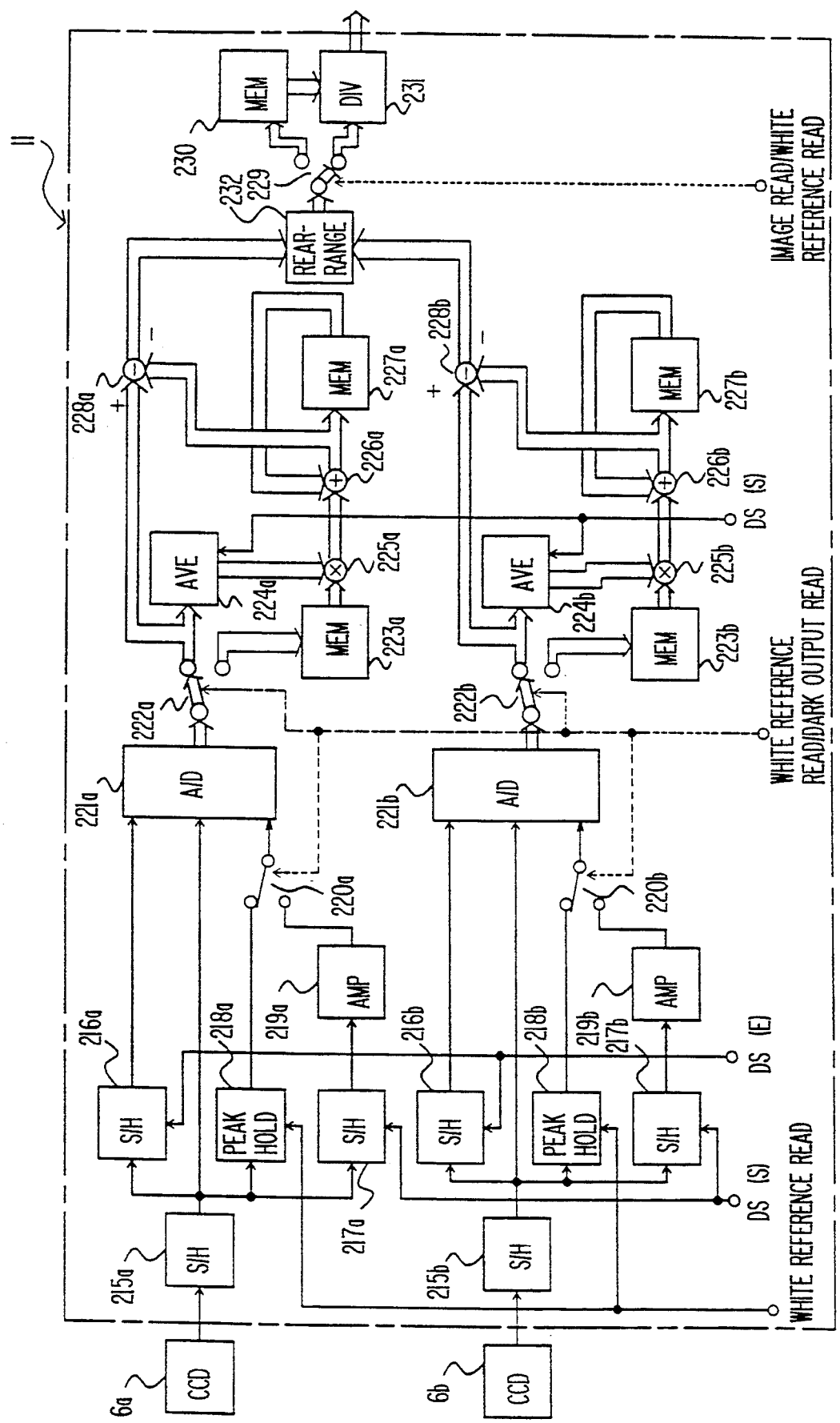
FIG. 66 is a diagram showing a first variation of the configuration shown in FIG. 61.

FIG. 66 shows a first variation of the configuration of the signal processing unit 11 shown in FIG. 61. In FIG. 66, those parts which are the same as those shown in FIG. 61 are given the same reference numerals as shown in FIG. 61. The configuration of the first variation of the signal processing unit 11 shown in FIG. 66 differs from the configuration shown in FIG. 61 in that a switch 229, a white reference memory 230 and a divider 231 are provided on the output side of the rearrangement circuit 232. Hence, the switches 229a and 229b, the white reference memories 230a and 230b, and the dividers 231a and 231b shown in FIG. 61 are not used in the configuration shown in FIG. 66. The output signals of the subtracters 228a and 228b are directly applied to the rearrangement circuit 232, which rearranges these output signals so that pixel information concerning pixels arranged in a line from an end of the original 1 can be obtained. The shading correction process using the white reference memory 230 and the divider 231 is carried out for the output signal (pixel information) of the rearrangement circuit 232. It can be seen from the above that the configuration shown in FIG. 66 is simpler than that shown in FIG. 61.

Figure 67:
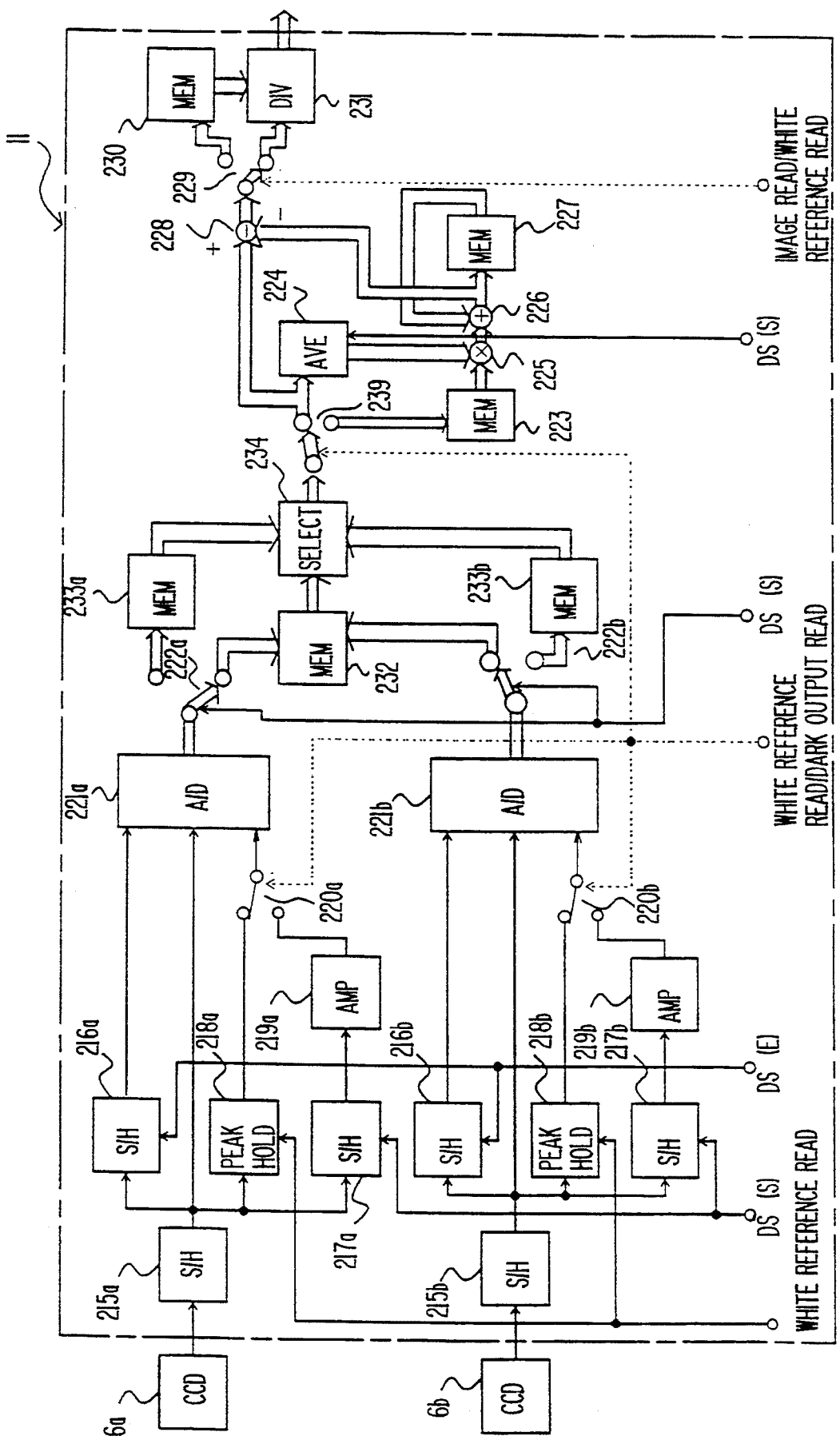
FIG. 67 is a diagram showing a second variation of the configuration shown in FIG. 61.

FIG. 67 shows a second variation of the configuration shown in FIG. 61. In FIG. 67, those parts which are the same as parts shown in the FIGS. 61 and 66 are given the same reference numerals. A part of the configuration from left to right up to the switches 222a and 222b shown in FIG. 67, is configured in the same manner as shown in FIG. 61. In the configuration shown in FIG. 67, the output signals of the A/D converters 221a and 221b obtained via the switches 222a and 222b are processed by the circuit described below. The output signals of the A/D converters 221a and 221b are selectively applied, via the switch circuits 222a and 222b, to the rearrangement circuit 232 or memories 233a and 233b. It can be seen from FIG. 65-(c) that information concerning the signals DS(S) will be destroyed by directly applying the output signals of the A/D converters 221a and 221b to the rearrangement circuit 232. With the above in mind, the information concerning the signals DS(S) contained in the output signals of the A/D converters 221a and 221b is saved in the memories 233a and 233b via the switches 222a 222b. After the output signals of the A/D converters 221a and 221b are rearranged in the rearrangement circuit 232, the information concerning the signals DS(S) is inserted into the rearranged pixel signal (having pixel information concerning pixels arranged in a line from an end of the original 1) by means of a selector 234. In this manner, a signal as shown in FIG. 65-(d) can be obtained on the output side of the selector 234. Then, the dark output signal correction process is carried out by means of a dark output memory 223, an averaging circuit 224, a multiplier circuit 225, an adder 226, a memory 227 and a subtracter 228 in the same manner as has been described previously. Thereafter, the shading correction process is carried out by means of the aforementioned white reference memory 230 and the divider 231.

Figure 68:
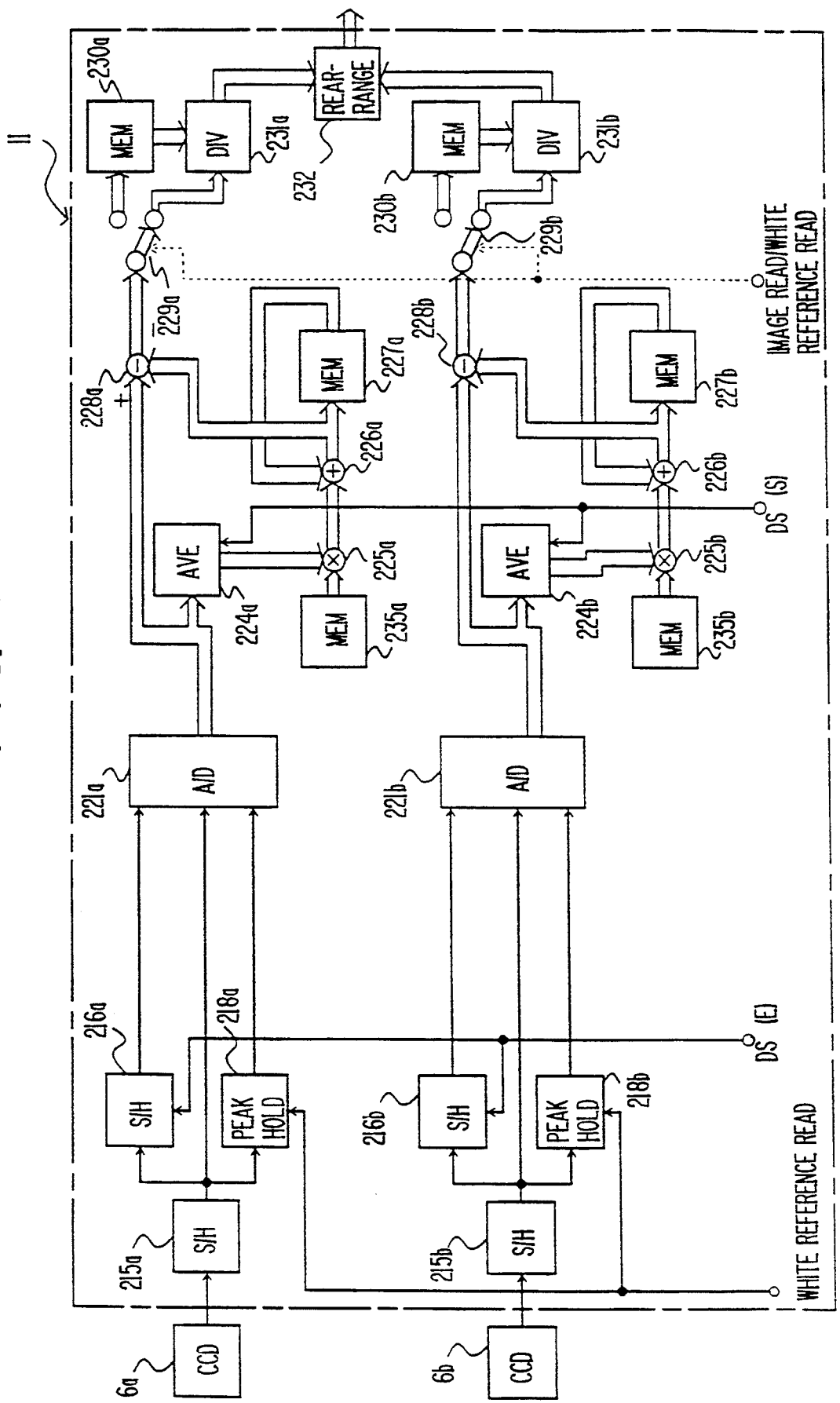
FIG. 68 is a diagram showing a third variation of the configuration shown in FIG. 61.

FIG. 68 shows a third variation of the configuration shown in FIG. 61. In FIG. 68, parts which are the same as parts shown in FIGS. 61, 66 and 67 are given the same reference numerals. In the configuration shown in FIG. 68, dark output read only memories 235a and 235b, in which dark output signals are stored beforehand, are used in lieu of the dark output memories 223a and 223b shown in FIGS. 61. The sample and hold circuits 217a and 217b, the amplifiers 219a and 219b, and switch circuits 220a and 220b shown in FIG. 61 are not used in the configuration shown in FIG. 68. That is, in the configuration shown in FIG. 61, the dark output signal reading operation is not performed. It is possible to program the dark output memories 235a and 235b during the production process of the signal processing unit 11 or maintenance process thereof. The configuration shown in FIG. 68 can be used when it is expected that the CCD line sensors 6a and 6b do not deteriorate greatly with age. The configuration shown in FIG. 68 is simpler than that shown in FIG. 61.

Figure 69:
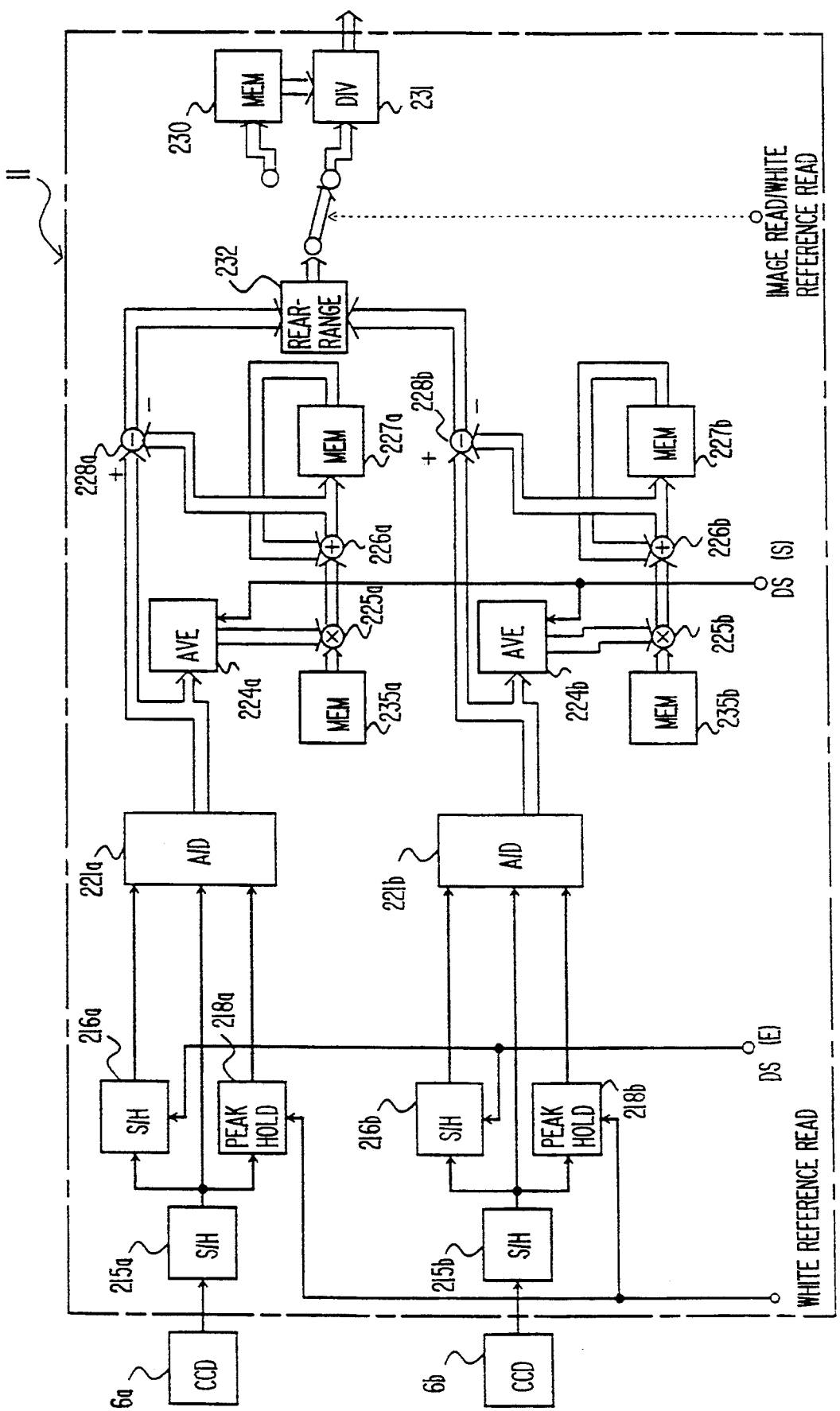
FIG. 69 is a diagram showing a variation of the configuration shown in FIG. 68.

FIG. 69 shows a variation of the configuration shown in FIG. 68. The configuration shown in FIG. 69 can be obtained by changing the configuration shown in FIG. 68 as in the case of the configuration shown in FIG. 66. That is, the shading correction process is carried out after the rearrangement process is performed. The switch 229, the white reference memory 230 and the divider 231 are used in lieu of the switches 229a, 229b, the white reference memories 230a and 230b and the dividers 231a and 231b shown in FIG. 68. The configuration shown in FIG. 69 is simpler than that shown in FIG. 68.

Figure 70:
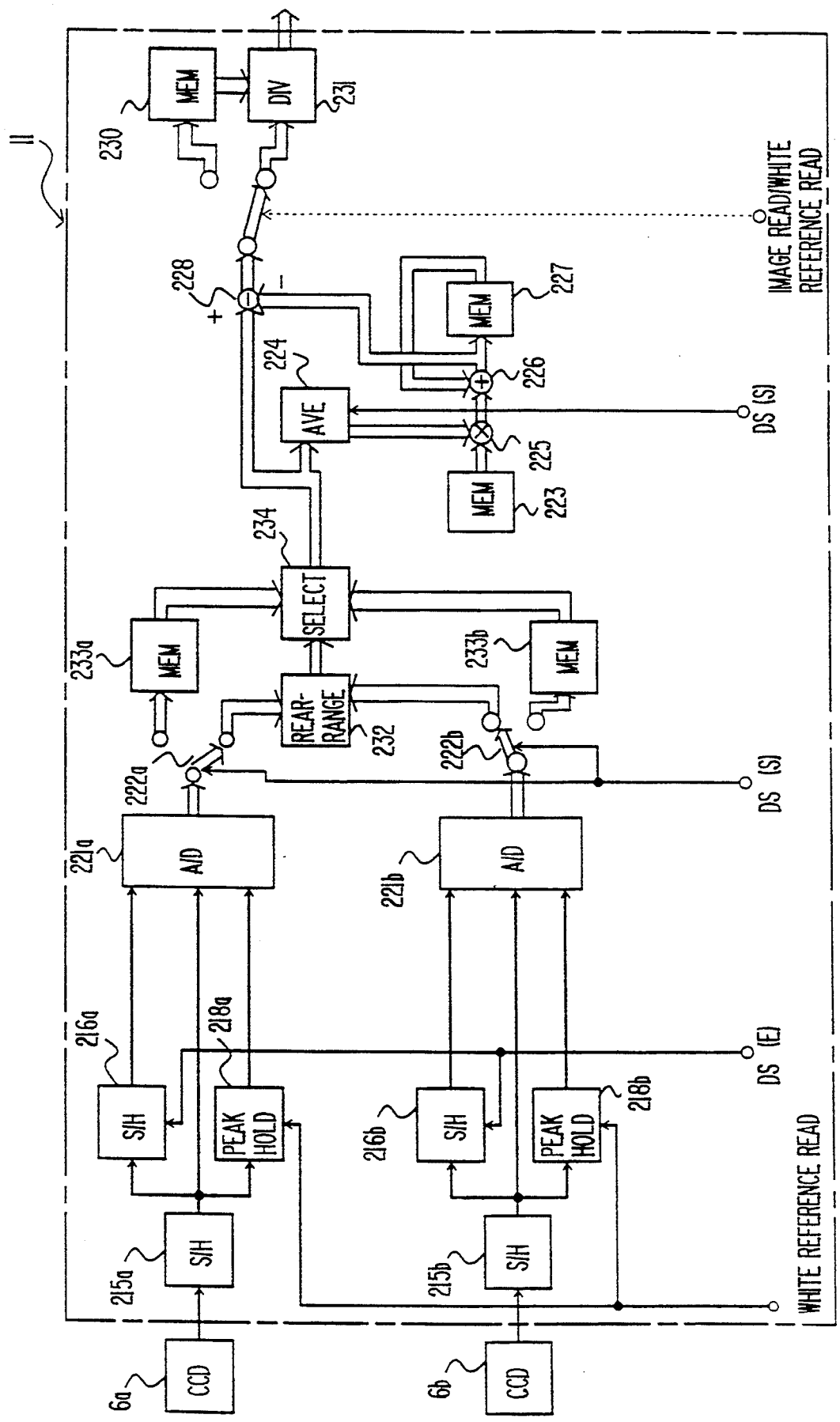
FIG. 70 is a diagram showing another variation of the configuration shown in FIG. 68.

FIG. 70 shows another variation of the configuration shown in FIG. 68. The configuration shown in FIG. 70 can be obtained by changing the configuration shown in FIG. 68 as in the case of the configuration shown in FIG. 67. A dark output memory 223 is a ROM in which dark output signals are stored beforehand.

In each of the configurations shown in FIGS. 61, 66 and 67, it is possible to set the time necessary to read the dark output signal in one line from each CCD line sensor to be longer than the time necessary to read pixel information concerning one line of the original 1 from each CCD line sensor. With the above, it becomes possible to obtain increased levels of the dark output signals of one line and to prevent the dark output signals from being degraded during signal processing. Hence, it is possible to more precisely perform the dark output correction process.

A description will now be given of a fourth embodiment of the present invention, which is intended to precisely correct dark output signals of the CCD line sensors even when a number of pixels of the original, which number is smaller than the number of pixels of each CCD line sensor is transferred therefrom. The correction of the dark output signals of the CCD line sensors is carried out in the signal processing unit 11.

As has been described previously, the output signals of the CCD line sensors 6a and 6b are based on the sum of signals dependent on the amount of exposure, and on dark output signals which occur regardless of the amount of exposure. When pixel information concerning only pixels of the original 1 is read from each of the CCD line sensors 6a and 6b, a photoelectric conversion output signal of a pixel of the original 1 dependent on the amount of exposure corresponds to the sum of a dark output signal generated at the above pixel and a dark output signal generated at a non-read pixel located in a line prior to the line having the above pixel being considered is located and which is read during the previous scanning.

Figure 71:
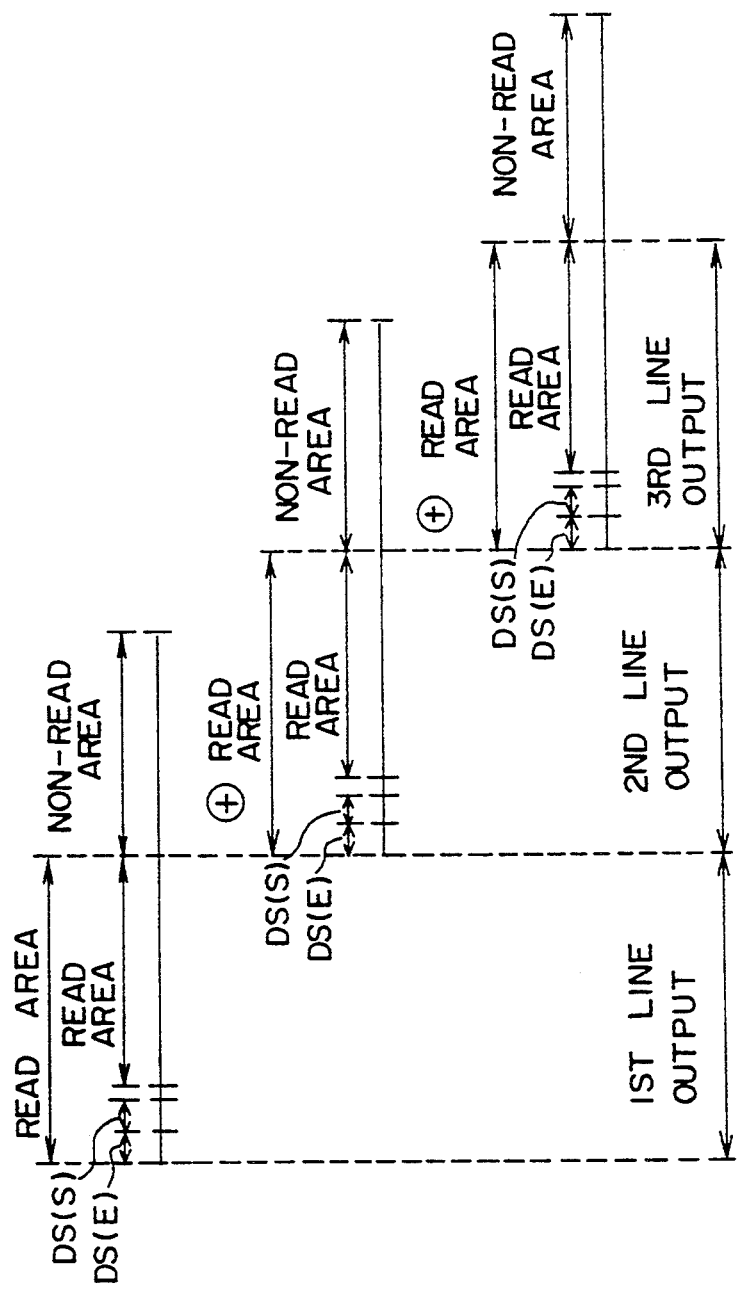
FIG. 71 is a diagram showing how dark output signals overlap when 60% of all pixels of each CCD line sensor are read therefrom.

FIG. 71 shows how the dark output signals overlap when 60% of all the pixels of each of the CCD line sensors 6a and 6b are read therefrom. It can be seen from FIG. 71 that when 50% of all the pixels of each CCD line sensor are read therefrom, the output signal of each CCD line sensor includes a dark output signal generated during the previous read operation in which a line on the original 1 prior to a line being processed is scanned.

When m pixels are read from each of the CCD line sensors 6a and 6b respectively having the CCD shift registers 8a and 8b each having n pixels where $2m \geq n$, a pixel output signal dout(i,j) of the jth pixel located in the ith line is written as follows:

$$dout(i,j) = dmo(i,j) + dbk(i,j) + dbk(i-1, j+m) \qquad (9)$$

where dbk(i,j) is equal to zero ($i \leq 0$, $j > n$), dmo(i,j) denotes a pixel output signal of the jth pixel in the ith line, and dbk denotes a dark output signal generated at the jth pixel in the ith line.

In order to efficiently convert pixel information (pixel signals) concerning the original 1 into an electric signal, it is necessary to execute a first correction process for reducing the dark output signals in the output signals of the CCD line sensors 6a and 6b, a second correction process for canceling variations in the sensitivities of the pixels of the CCD line sensors 6a and 6b, and a third correction process for correcting variations in the intensity distribution of the light source 3 (shading correction). In addition, the rearrangement process for rearranging the output signals of the CCD line sensors 6a and 6b is needed. The signal processing unit 11 used in the fourth embodiment of the present invention performs the above first to third correction processes as well as the rearrangement process. Particularly, the fourth embodiment of the present invention is concerned with a case where variations in the intensity distribution of the light source 3, obtained while the original 1 is totally scanned, are as small as to be negligible, and 50% of the pixels of each CCD line sensors 6a and 6b are read therefrom.

Figure 72:
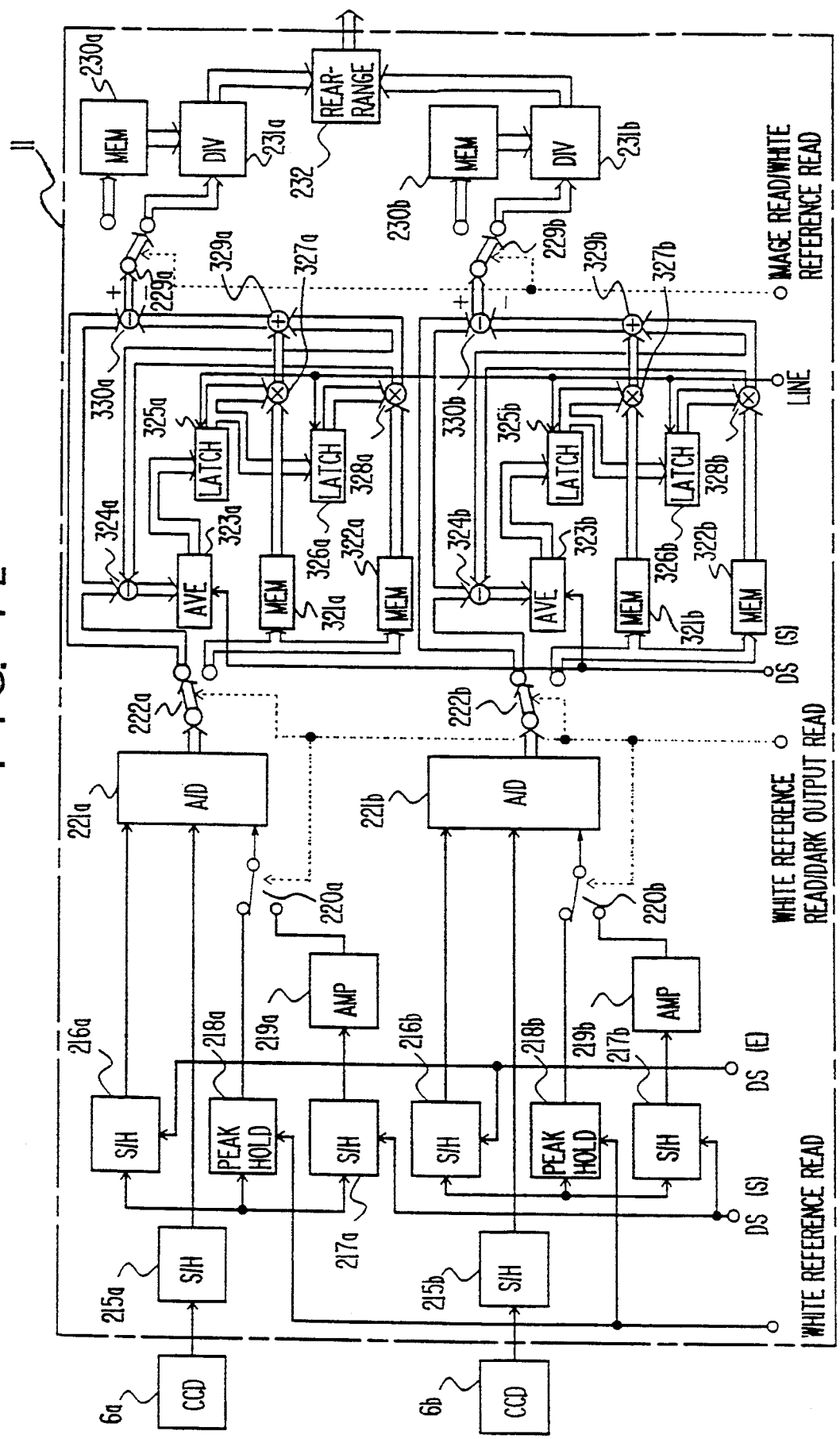
FIG. 72 is a block diagram showing the structure of the signal processing unit used in the fourth embodiment of the present invention.

FIG. 72 shows the structure of the signal processing unit 11 used in the fourth embodiment of the present invention. In FIG. 72, parts which are the same as those shown in the previously described figures are given the same reference numerals. The configuration shown in FIG. 72 is different from that shown in FIG. 61 in a circuit part between the switches 222a and 222b and the switches 229a and 229b. As has been described previously with reference to FIG. 61, the A/D converter 221a functions to normalize the dark output signal in one line with respect to the output values of the sample and hold circuits 216a and 217a, and the A/D converter 221b functions to normalize the dark output signal in the same line with respect to the output values of the sample and hold circuits 216b and 217b.

Dark output memories 321a and 322a respectively store the normalized dark output signal from the A/D converter 221a via the switch 222a. Dark output memories 321b and 322b respectively store the normalized dark output signal from the A/D converter 221b via the switch 222b. An averaging circuit 323a generates the average value of the signals of pixels covered by the light interrupting member 29a or the representative value thereof. An averaging circuit 323b generates the average value of the signal of pixels covered by the light interrupting member 29b or the representative value thereof. Subtracters 324a and 324b are respectively provided on the input sides of the averaging circuits 323a and 323b. A latch circuit 325a holds the output signal of the averaging circuit 323a during a period corresponding to one line. A latch circuit 325b holds the output signal of the averaging circuit 323b during a period corresponding to one line. A latch circuit 326a delays the output signal of the latch circuit 325a by a time corresponding to one line, and holds it during a period corresponding to one line. A latch circuit 326b delays the output signal of the latch circuit 325b by a time corresponding to one line, and holds it during a period corresponding to one line. A multiplier circuit 327a multiplies the pixel signals read from the latch circuit 325a and equal in number to the pixels scanned and read by the CCD line sensor 6a by the output value of the latch circuit 325a, so that a dark output signal generated during a storage time concerning the line being read can be obtained. A multiplier circuit 327b multiplies the pixel signals read from the latch circuit 325b and equal in number to the pixels scanned and read by the CCD line sensor 6b by the output value of the latch circuit 325b, so that a dark output signal generated during a storage time concerning the line being read can be obtained. A multiplier circuit 328a multiplies the pixel signals read from the latch circuit 326a and equal in number to the pixels scanned and read by the CCD line sensor 6a by the output value of the latch circuit 326a, so that a dark output signal generated during a storage time regarding a line immediately prior to the line being read can be obtained A multiplier circuit 328b multiplies the pixel signals read from the latch circuit 325b and equal in number to the pixels scanned and read by the CCD line sensor 6b by the output value of the latch circuit 326b, so that a dark output signal generated during a storage time regarding a line immediately prior to the line being read can be obtained. An adder 329a adds the output signals of the multipliers 327a and 328a to each other, and thus generates an actual dark output signal actually existing in the line being read. An adder 329b adds the output signals of the multipliers 327b and 327b to each other, and thus generates an actual dark output signal actually existing in,the line being read. A subtracter 330a subtracts the output signal of the adder 329a from the output signal of the A/D converter 221a, and hence generates a photoelectric conversion signal from which the dark output signal has been eliminated. A subtracter 330b subtracts the output signal of the adder 329a from the output signal of the A/D converter 221b, and hence generates a photoelectric conversion signal from which the dark output signal has been eliminated. The other structural elements of the configuration shown in FIG. 72 are the same as corresponding elements shown in FIG. 61.

The operation of the signal processing unit 11 shown in FIG. 72 will now be described. Each of the CCD line sensors 6a and 6b generates an output signal concerning one line of the original 1, as shown in FIG. 63-(a) and (b). As has been previously described, the signal DS(E) is a signal generated from isolation pixels, which do not have photodiodes but have transfer elements of the CCD transfer register. The signal DS(S) is a signal generated from pixels covered by the light interrupting member. Pixel information concerning pixels of the original 1 follows the signal DS(S). The output signals of the CCD line sensors 6a and 6b transferred for each line are applied to the sample and hold circuits 215a and 215b shown in FIG. 72. The transfer clock signals are removed from the output signals of the CCD line sensors 6a and 6b, so that signals as shown in FIG. 63-(b) are obtained. Before all signal processing in each structural element of the signal processing unit 11 is carried out, the write and read addresses supplied to the memories of the signal processing unit 11 are reset.

Then, the dark output signals regarding one line are generated and stored in the following manner. The switches 220a and 220b are controlled so that the amplifiers 219a and 219b are selected. The output signals of the sample and hold circuits 215a and 215b are applied to the sample and hold circuits 216a and 216b, the sample and hold circuits 217a and 217b, and the A/D converters 212a and 212b, respectively. When the amount of exposure of each of the CCD line sensors 6a and 6b for one line is set to be zero, the output signals of the CCD line sensors 6a and 6b in one line are sampled and held by the sample and hold circuits 215a and 215b, and have waveforms as shown in FIG. 64-(a). As shown in FIG. 64-(a), the signal DS(S) and the signal in the read range have dark output signal levels, which vary for each pixel. The output signals of the sample and hold circuits 215a and 215b are respectively applied to the sample and hold circuits 216a and 216b, which sample and hold the above output signals by using the value of the signal DS(E). The sample and held levels by the sample and hold circuits 216a and 216b are used as upper-limit reference levels VrefH of the A/D conversion circuits 221a and 221b. The output signals of the sample and hold circuits 216a and 216b are also applied respectively to the sample and hold circuits 217a and 217b, and sampled and held by an average value of the signal DS(S) or a representative value thereof. The sample and held levels by the sample and hold circuits 217a and 217b are respectively amplified by the amplifier circuits 219a and 219b, and are then used as lower-limit reference levels VrefL of the A/D conversion circuits 221a and 221b. The relation among the reference levels VrefH and VrefL and the output signals of the sample and hold circuits 217a and 217b are as shown in FIG. 64-(a). The A/D converters 221a and 221b convert the output signals from the sample and hold circuits 215a and 215b into digital signals using the upper-limit reference levels VrefH and the lower-limit reference levels VrefL. The digital signals thus obtained pass through the switches 222a and 222b and are written into the dark output memories 321a, 322a, 321b and 322b, respectively. In this case, the digital signals respectively amounting to the first m pixels among n pixels of each of the CCD line sensors 6a and 6b are written into the memories 321a and 321b, and the digital signals respectively amounting to the remaining (n-m) pixels are written into the memories 322a and 322b. In this manner, two dark output patterns regarding one line are obtained with respect to the average values of the signals DS(S) regarding the pixels covered by the light interrupting members 29a and 29b or the representative values thereof. Each of the two dark output patterns is written as follows:

$$dbk(j)/dbk \qquad (10)$$

where dbk(j) denotes a dark output signal of the jth pixel obtained during the dark output reading operation, and dbk denotes the average value of the signal DS(S) or the representative value thereof obtained during the dark output reading operation. The above (10) is the same as the previously mentioned formula (2). The formula (19) shows how large the dark output signal level of each pixel is with respect to the average value of the output signal levels of the pixels covered by the light interrupting member or the representative value thereof. That is, the dark output signal level of each pixel is dbk(j)/dbk times the average value of the output signal levels of the pixels covered by the light interrupting member or the representative value thereof. Thereafter, the write and read addresses of the dark output memories 321a, 322a, 321b and 322b are reset.

Next, data concerning a white reference in one line is generated as follows. While the data concerning the white reference (plate) is being generated, there is no remaining dark output signal because all the pixel signals of the CCD line sensors 6a and 6b have been output by the process for obtaining the dark output signal patterns. In the white reference data generating process, the switch circuits 220a and 220b is controlled so that the peak hold circuits 218a and 218b are respectively selected. The output signals of the sample and hold circuits 215a and 215b are applied to the peak hold circuits 218a and 218b, respectively. When the white reference is read along a line, peak levels of read signals of the white reference are held in the peak hold circuits 218a and 218b. The peak levels held in the peak hold circuits 218a and 218b are used as lower-limit levels VrefL of the A/D converters 221a and 221b, respectively. When the white reference is read the next time, the output signals of the sample and hold circuits 215a and 215b are applied to the sample and hold circuits 216a and 216b, respectively, in which the above output signals are sampled and held using the value of the signal DS(E). The levels of the output signals output by the sample and hold circuits 216a and 216b are respectively used as upper-limit levels of the A/D converters 221a and 221b. The relation among the upper-limit and lower-limit levels VrefH and VrefL and the output signals of the sample and hold circuits 215a and 215b are as shown in FIG. 64-(b). The output signals of the A/D converters 221a and 221b are respectively written as follows:

$$dwo(j)/(VrefH - VrefL) + \qquad (11)$$

$$\beta w \cdot dbk(j)/(VrefH - VrefL) =$$

$$\{dwo(j) + \beta w \cdot dbk(j)\}/(VrefH - VrefL)$$

where dwo denotes a photoelectric conversion output signal obtained when the white reference is read, and $\beta w$ denotes a coefficient showing how large the signal obtained when the white reference is read is, as compared with the signal obtained when the corresponding dark output pattern is read.

The output signal of the A/D converter 221a is then applied to the subtracters 324a and 330a via the switch 222a, and the output signal of the A/D converter 221b is then applied to the subtracters 324b and 330b via the switch 222b. Minus input terminals of the subtracters 324a and 324b are respectively supplied with the dark output signals generated while the line immediately prior to the line being read was being read. In this case, the above dark output signals are zero, and thus the signals each defined by equation (11) are directly applied to the averaging circuits 323a and 323b. The process for generating the dark output signals generated while the line immediately prior to the line being read was being read will be described later. Each of the averaging circuits 323a and 323b calculates the sum of the pixel signals which are successively input when control signals are ON, and calculates the average value of the pixel signals. The average values thus obtained in each of the averaging circuits 224a and 224b are held therein for a time. The above control signals are turned ON while the signal DS(S) is being output. While the signal DS(S) is being output, the photoelectric conversion output signals dwo(j) are zero, and each of the output signals of the averaging circuits 224a and 224b is the average value $\beta w \cdot dbk(j)/(VrefH-VrefL)$ of the pixel signals in the signal DS(S). The average values output by the averaging circuits 323a and 323b are respectively latched by the latch circuits 325a and 325b and held during a period corresponding to one line. The output signals of the latch circuits 325a and 325b, $\beta w \cdot dbk(j)/(VrefH-VrefL)$, are respectively applied to the multiplier circuits 327a and 327b and the latch circuits 326a and 326b, The latch circuits 326a and 326b hold the output signals of the latch circuits 325a and 325b with a delay corresponding to one line. The multiplier circuits 327a and 327b are respectively supplied with the output signals of the dark output memories 321a and 321b (defined by formula (10)). Hence, the output signals of the multiplier circuits 327a and 327b are respectively written as follows:

$$\{\beta w \cdot dbk/VrefH\text{-}VrefL\} \cdot \{dbk(j)/dbk\} = \beta w \cdot dbk(j)/(VrefH\text{-}VrefL) \qquad (12).$$

The output signals of the multiplier circuits 327a and 327b are respectively applied to the adder is 329a and 329b, which are also supplied with the output signals of the multipliers 328a and 328b, respectively. By the initial setting process, the latch circuits 326a and 326b are set so that they output zero. Thus, the multiplier circuits 328a and 328b respectively receive zero, and hence output zero As a result, the adders 329a and 329b respectively generate the output signals each defined by the equation (12), which are respectively applied to the subtracters 330a and 330b. The subtracters 330a and 330b respectively output the following obtained by subtracting formula (11) from formula (12):

$$dwo(j)/(VrefH\text{-}VrefL) \qquad (3).$$

The above calculation concerning the white reference reading is carried out for each readout pixel (m pixels in each of CCD line sensors 6a and 6b). The output signals of the subtracters 330a and 330b defined by the above (13) are stored in the white reference memories 230a and 230b via the switch circuits 229a and 229b, respectively. In this manner, the reading of the white reference in one line (in which m pixels are contained in each CCD line sensor) is completed. Thereafter, the write and read addresses of the memories 321a, 321b, 322a, 322b, 332a and 332b are reset.

After the reading of the white reference in one line is completed, all pixel signals of the CCD line sensors 6a and 6b are output prior to the inputting of pixel information concerning the original 1. Immediately before all pixel signals of the CCD line sensors 6a and 6b are output, there are no remaining dark output signals contained in the output signals of the CCD line sensors 6a and 6b. The inputting of pixel information (images) is carried out in the same manner as in the case of the white reference reading operation, and the output signals of the A/D converters 221a and 221b are similarly obtained. The relation among the reference levels VrefH and VrefL of the A/D converters 221a and 221b and the output signals of the sample and hold circuits 215a and 215b is as shown in FIG. 64-(c).

A description will now be given of the difference between the white reference input and the image input. In the read operation in which the first line of the original 1 is read, the subtracters 330a and 330b respectively generate the photoelectric conversion output signals in the same manner as the subtracters 330a and 330b respectively generate the photoelectric conversion output signals of the white reference. After the reading of the first line is completed and before the reading of the second line is started, the read signals regarding the first line latched in the latch circuits 325a and 325b are latched in the latch circuits 326a and 326b. That is, the read signal regarding the first line is maintained in the latch circuits 326a and 326b during the reading operation on the second line. In this manner, the output signals of the multiplier circuits 327a and 327b respectively obtained by reading the jth pixel in the ith line are respectively written as follows:

$$\{\beta(i-1)\cdot dbk/(VrefH\text{-}VrefL)\}\cdot\{dbk(j+m)/dbk\} = \beta(i-1)\cdot dbk(j+m)/(VrefH\text{-}VrefL) \quad (14)$$

where $\beta(i)$ denotes a coefficient showing how large the signal obtained when the white reference is read is, as compared with the signal obtained when the corresponding dark output pattern is read. That is, the output signals of the multiplier circuits 327a and 327b are dark output signals generated at the jth pixel when the ith line is The output signals of the multiplier circuits 328a and 328b are respectively represented as follows:

$$\{\beta(i-1)\cdot dbk/(VrefH\text{-}VrefL)\}\cdot\{dbk(j+m)/dbk\} = \beta(i-1)\cdot dbk(j+m)/(VrefH\text{-}VrefL) \quad (15).$$

The above signals are dark output signals generated at the (j+m)th pixel at the time of reading the (i−1) line, and are transferred to the jth pixel at the time of reading the jth line. The output signals output by the multiplier circuits 327a and 328a and defined by the equations (14) and (15) are applied to the adder 329a. The output signals output by the multiplier circuits 327b and 328b and defined by the equations (14) and (15) are applied the adder 329b. At the same time as the above, the output signals of the multiplier circuits 328a and 328b are respectively applied to the subtracters 324a and 324b as the dark output signals generated when the previous line was read. Hence, the output signals of the adders 329a and 329b are obtained as follows ((14)+(15)):

$$\{\beta(i)\cdot dbk(j)+\beta(i-1)\cdot dbk(j+m)\}/(VrefH\text{-}VrefL) \quad (16).$$

The output signals defined by the equation (16) are the actual dark output signals.

The following signals are respectively applied to the plus input terminals of the subtracters 330a and 330b:

$$\{dmo(i,j)+\beta(i)\cdot dbk(j)+\beta(i-1)\cdot dbk(j+m)\}/(VrefH\text{-}VrefL) \quad (17).$$

Hence, the output signals of the subtracters 330a and 330b are respectively written as follows:

$$dmo(i,j)/(VrefH\text{-}VrefL) \quad (18).$$

Then, the above output signals of the subtracters 330a and 330b are respectively applied to the dividers 330a and 330b via the switches 229a and 229b. The output signals of the dividers 330e and 330b are respectively represented as follows ((10)÷(7)):

$$\{dmo(i,j)/(VrefH - VrefL))\}/\{dwo(j)/(VrefH - VrefL)\} = dmo(i,j)/dwo(j). \quad (18)$$

In this manner, it is possible to obtain the photoelectric conversion output signals $\{dmo(i,j)/dwo(j)\}$ with respect to the photoelectric conversion output levels not having any influence of the dark output signals. Hence, it is possible to execute the quantizing and shading correction processes without being affected by the dark output signals varying with time in the case where variations in the intensity distribution of the light source 3 obtained while the original 1 is totally scanned are to small to be negligible, and 50% of the pixels of each CCD line sensors 6a and 6b are read therefrom.

Figure 73:
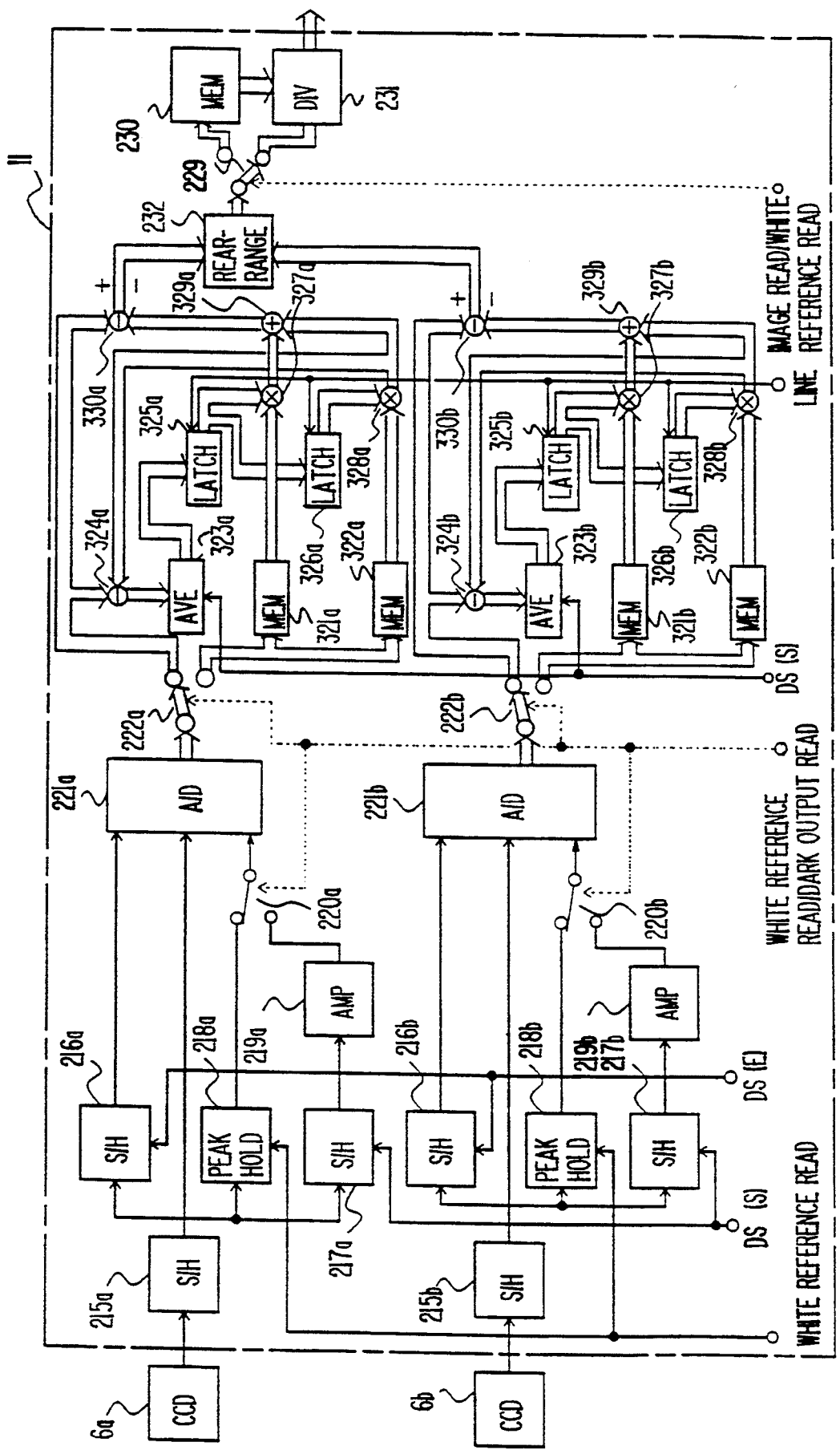
FIG. 73 is a block diagram showing a first variation of the signal processing unit shown in FIG. 72.

FIG. 73 shows a first variation of the signal processing unit 11 shown in FIG. 72. In FIG. 73, parts which are the same as those shown in the previously described figures are given the same reference numerals. In the configuration shown in FIG. 73, the shading correction process is carried out on the output side of the rearrangement circuit 232 in the same manner as in the signal processing unit 11 shown in FIG. 66. The configuration shown in FIG. 73 is simpler than that shown in FIG. 72.

Figure 74:
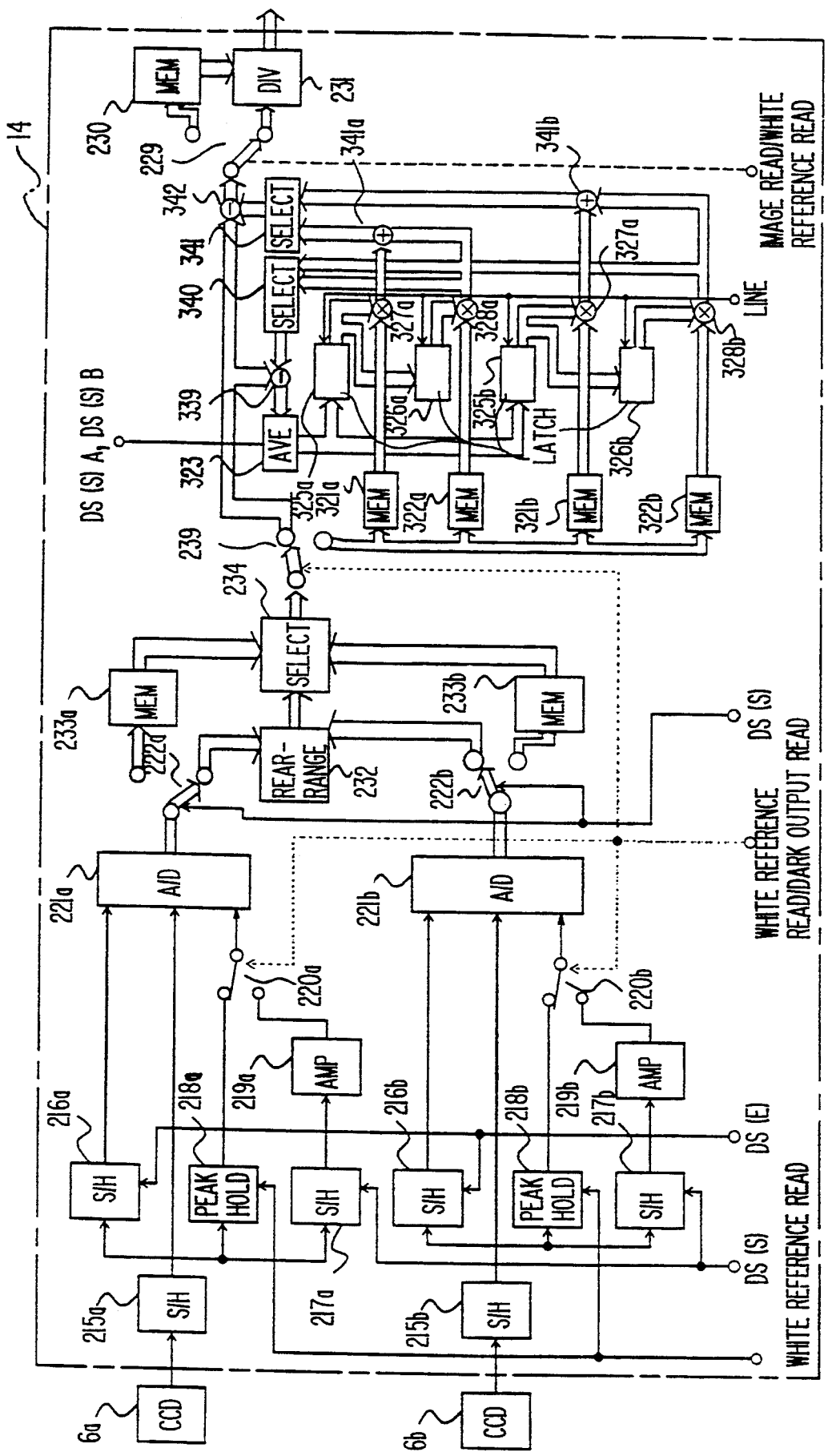
FIG. 74 is a block diagram showing a second variation of the signal processing unit shown in FIG. 72.

FIG. 74 shows a second variation of the configuration shown in FIG. 72. In FIG. 74, parts which are the same as parts shown in the previously described figures are given the same reference numerals. The output signals of the A/D converters 221a and 221b shown in FIG. 74 are respectively applied, via the switch circuits 222a and 222b, to either the rearrangement circuit 232 or the memories 233a and 233b. It can be seen from FIG. 65-(c) that information concerning the signals DS(S) will be destroyed by directly applying the output signals of the A/D converters 221a and 221b to the rearrangement circuit 232. With the above in mind, the information concerning the signals DS(S) contained in the output signals of the A/D converters 221a and 221b is saved in the memories 233a and 233b via the switches 222a and 222b. After the output signals of the A/D converters 221a and 221b are rearranged in the rearrangement circuit 232, the information concerning the signals DS(S) is inserted by means of the selector 234 into the rearranged pixel signal (having pixel information concerning pixels arranged in a line from an end of the original 1). In this manner, a signal as shown in FIG. 65-(d) can be obtained on the output side of the selector 234.

The output signal of the selector 234 is selectively applied to either the subtracters 339 and 342 or the dark output memories 321a, 322a, 321b and 322b. In this case, the dark output signal components obtained at the pixels equal in number to the pixels output from the CCD line sensor 6a are written into the dark output memory 2321a. The, dark output signal components obtained at the pixels equal in number to the pixels output from the CCD line sensor 6b are written into the dark output memory 321b. The dark output signal components equal in number to the pixel signal which are not output from the CCD line sensor 6a are written into the dark output memory 322a. The dark output signal components equal in number to the pixel signals which are not output from the CCD line sensor 6b are written into the dark output memory 322b. The averaging circuit 323 is supplied, as control signals, with the signals DS(S)A and DS(S)B as shown in FIG. 65-(d). The subtracter 339 subtracts the remaining dark output signals obtained at the pixels in the signals DS(S)A and DS(S)B from the output signal of the A/D converter 221a. The averaging circuit 323 generates the average value of the dark output signals generated in the line being read. The latch circuits 325a and 325b respectively hold the output signal of the averaging circuit 339 during a period corresponding to one line. The latch circuits 326a and 326b respectively hold the signals read from the latch circuits 325a and 325b with a delay corresponding to one line. Hence, the multiplier circuits 327a and 327b output, out of the output signals of the CCD line sensors 6a and 6b, the dark output signals generated during the storage time regarding the read line. The multiplier circuits 328a and 328b output, out of the output signals of the CCD line sensors 6a and 6b, the dark output signals generated during the storage time regarding the line immediately prior to the read line. The output signals of the multiplier circuits 328a and 328b are input to a select circuit 340, which is controlled by timings of DS(S)A and DS(S)B The output signals of the multiplier circuits 327a, 327b, 328a and 328b are applied to adders 341a and 341b, which generate actual dark output signals actually contained in the output signals of the CCD line sensors 6a and 6b. The actual dark output signals are applied to a select circuit 341, which selectively outputs the actual dark output signals at respective timings of the CCD line sensors 6a and 6b. The selected actual dark output signal is subtracted from the signal from the select circuit 234. The shading correction process executed by means of the white reference memory 230 and the divider 231 is the same as has been previously described.

Figure 75:
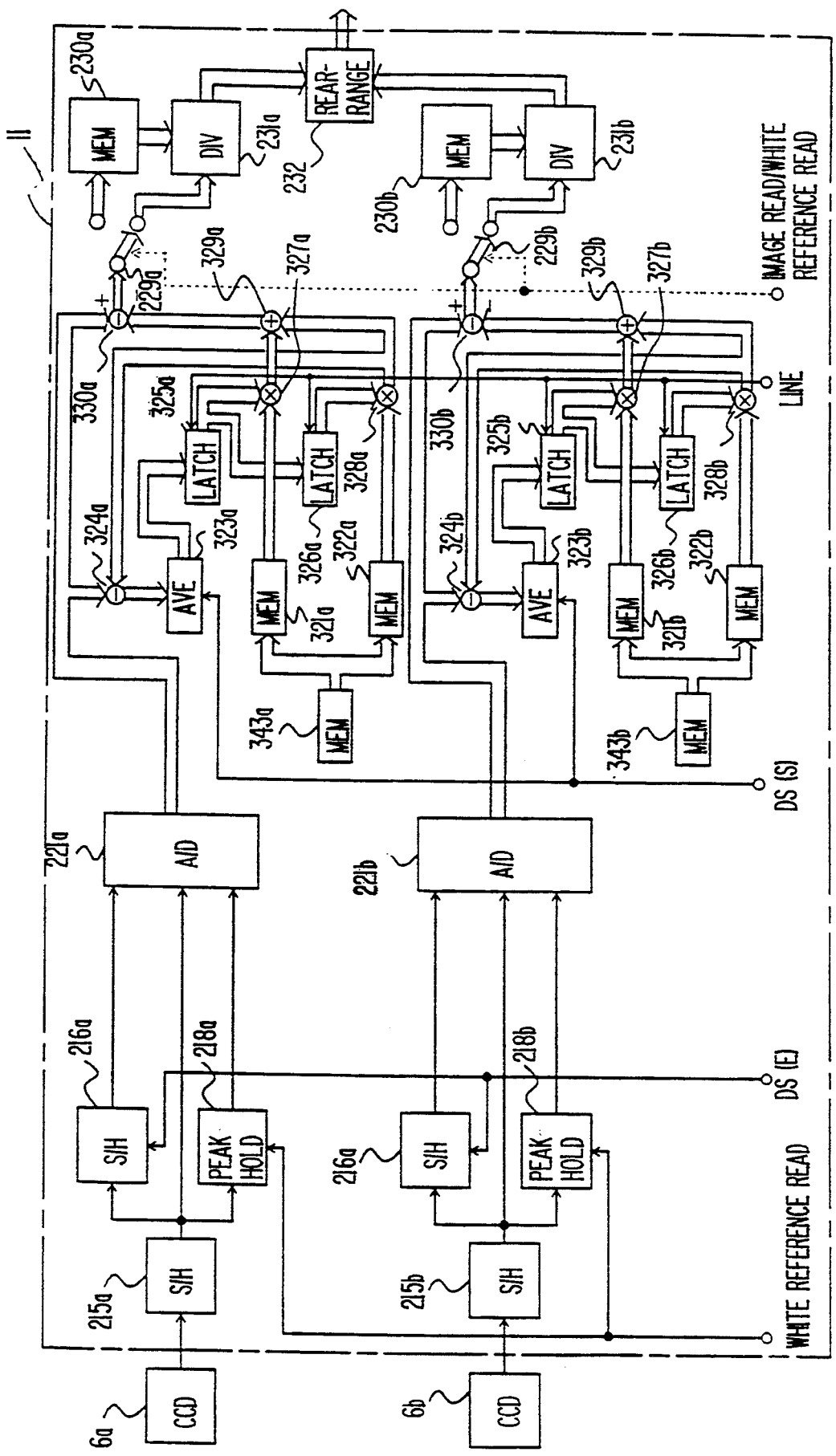
FIG. 75 is a block diagram showing a third variation of the signal processing unit shown in FIG. 72.

FIG. 75 shows a third variation of the signal processing unit shown in FIG. 72. In FIG. 75, parts which are the same as parts shown in the previously described figures are given the same reference numerals. In the configuration shown in FIG. 75, dark output read only memories 343a and 343b are used in the same manner as shown in FIG. 68. The dark output memory 343a is connected to the dark output memories 321a and 322a, and the dark output memory 343b is connected to the dark output memories 321b and 322b. The dark output signals regarding one line are respectively read from the dark output memories 343a and 343b, and are applied to the dark output memories 321a, 322a, 321b and 322b. The dark signal components contained in the dark output signal read from the memory 343a and which are equal in number to the signals of the pixels read from the CCD line sensor 6a, are written into the dark output memories 321a and 322a. Similarly, the dark signal components contained in the dark output signal read from the memory 343b and which are equal in number to the signals of the pixels read from the CCD line sensor 6b, are written into the dark output memories 321b and 322b. Hence, it is not necessary to obtain the dark output signals from the output signals of the CCD line sensors 6a and 6b, and structural parts related thereto are not used in the configuration shown in FIG. 75. It is possible to program the dark output memories 343a and 343b during the production process of the signal processing unit or during maintenance process thereof. The configuration shown in FIG. 68 can be used when it is expected that the CCD line sensors 6a and 6b will not deteriorate greatly with age. The configuration shown in FIG. 68 is simpler than that shown in FIG. 61.

Figure 76:
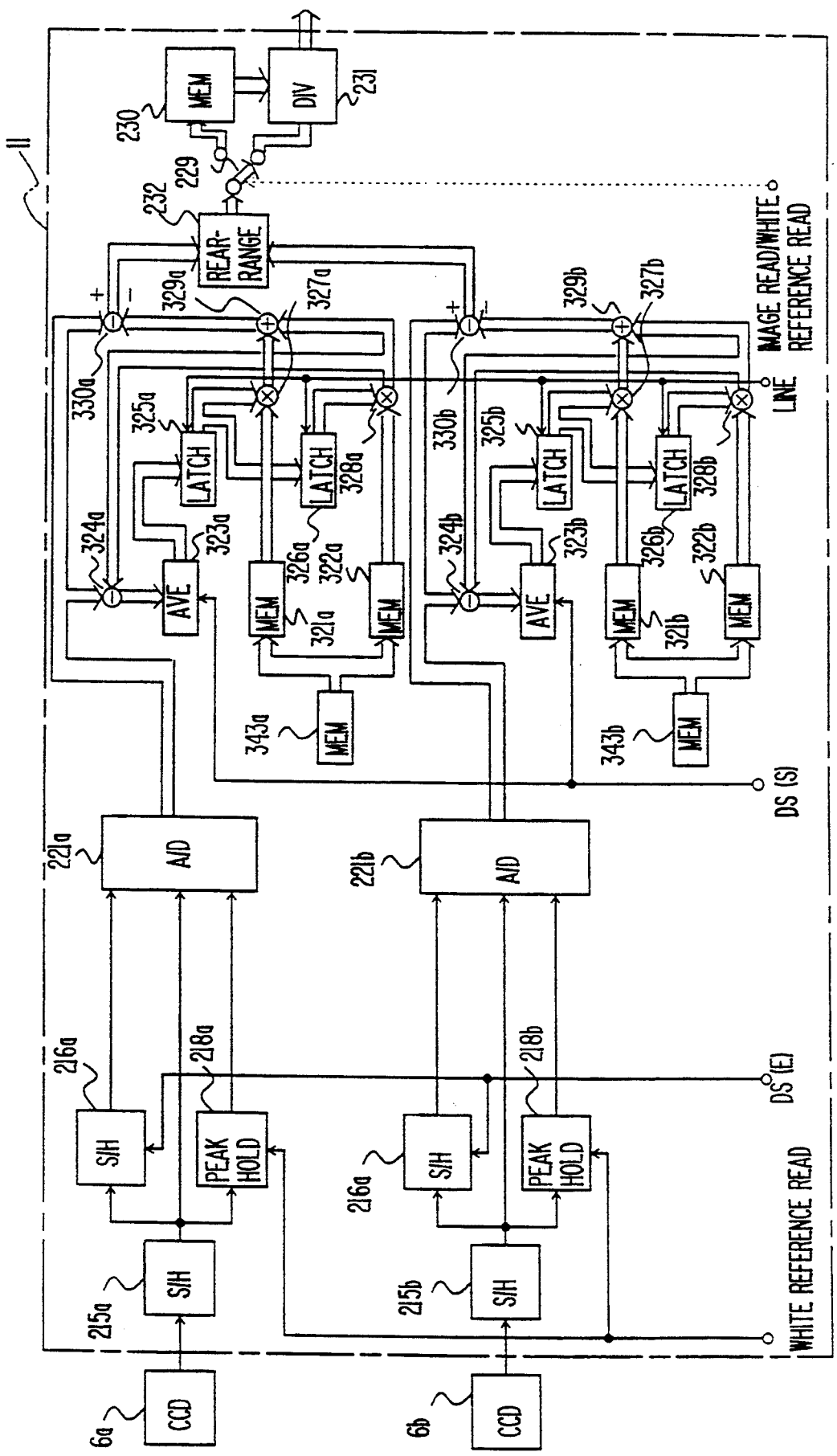
FIG. 76 is a block diagram showing a variation of the signal processing unit shown in FIG. 73.

FIG. 76 shows a variation of the signal processing unit 11 shown in FIG. 73. In FIG. 76, parts which are the same as parts shown in the previously described figures are given the same reference numerals. The dark output read only memories 343a and 343b used in the configuration shown in FIG. 75 are applied to the configuration shown in FIG. 73. As in the case of the configuration shown in FIG. 75, it is not necessary to obtain the dark output signals from the output signals of the CCD line sensors 6a and 6b, and structural parts related thereto are not used in the configuration shown in FIG. 76.

Figure 77:
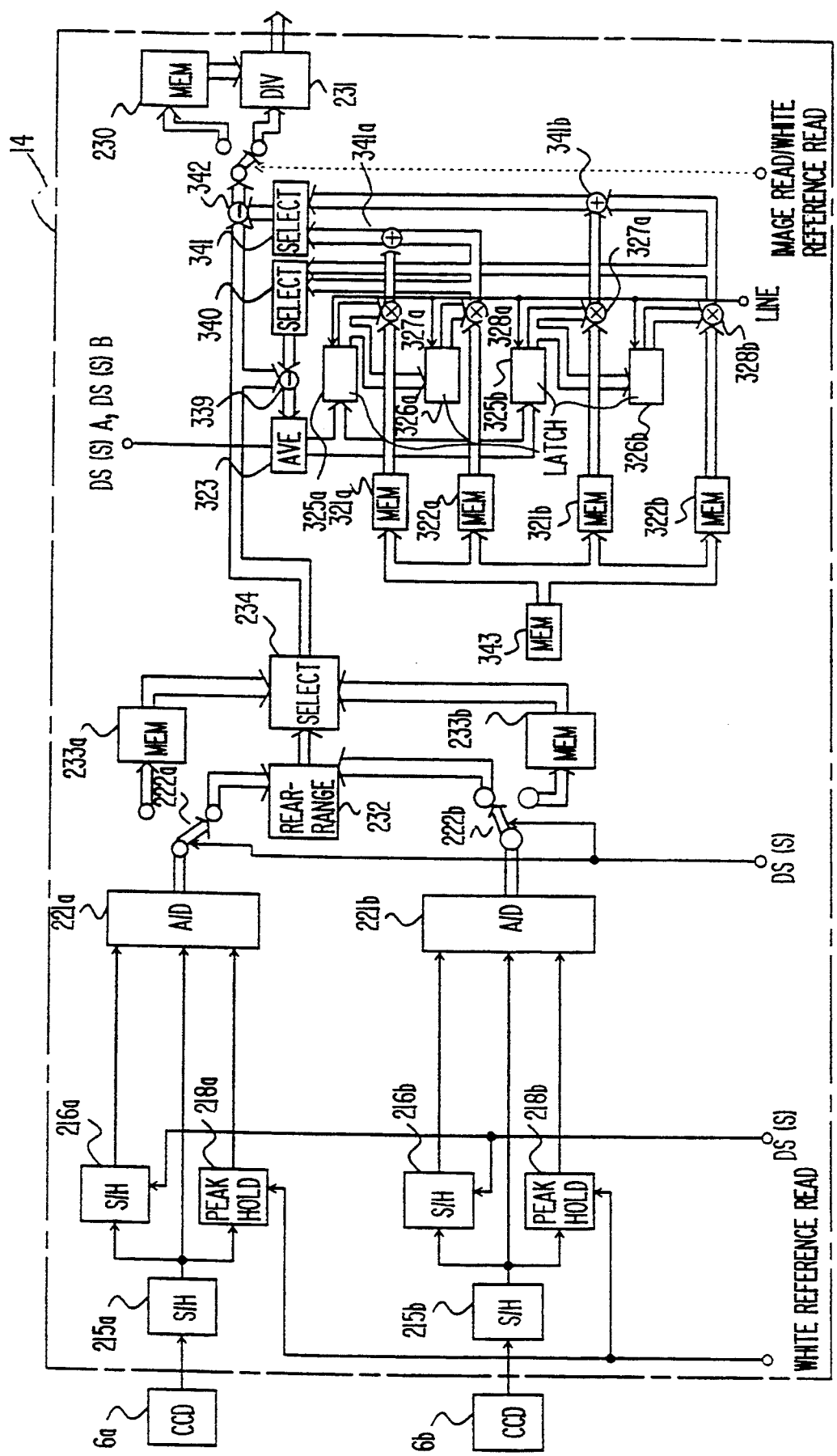
FIG. 77 is a block diagram showing a variation of the signal processing unit shown in FIG. 74.

FIG. 77 shows a variation of the signal processing unit 11 shown in FIG. 74. In FIG. 77, parts which are the same as parts shown in the previously described figures are given the same reference numerals. As shown in FIG. 77, a dark output memory 343 is connected to the dark output memories 321a, 322a, 321b and 322b. The dark output memory 343 stores a dark output signal regarding one line. The dark signal components which are contained in the dark output signal read from the memory 343 and which are equal in number to the signals of the pixels read from each of the CCD line sensor 6a and 6b, are written into the dark output memories 321a, 322a, 321b and 322b.

In each of the configurations shown in FIGS. 72, 73 and 74, it is possible to set the time necessary to read the dark output signal in one line from each CCD line sensor to be longer than the time necessary to read pixel information concerning one line of the original 1 from each CCD line sensor. With the above, it becomes possible to obtain increased levels of the dark output signals of one line and to prevent the dark output signals from being degraded during signal processing. Hence, it is possible to more precisely perform the dark output correction process.

The present invention is not limited to the specifically disclosed embodiments and variations, and other variations and modifications may be made without departing from the scope of the present invention.

What is claimed is:

1. An image reader comprising:
a light source for projecting light onto an original;
first and second photoelectric conversion elements arranged so that said first photoelectric conversion element reads a first half of said original in a scanning direction and said second photoelectric conversion element reads a second half thereof, and so that a first read signal of said first half of said original is transferred, starting from a center of said original, from said first photoelectric conversion element and a second read signal of said second half of said original is transferred, starting from said center, from said second photoelectric conversion element;

imaging means for projecting light reflected by said original onto said first and second photoelectric conversion elements;

driving means for driving said first and second photoelectric conversion elements so that said first and second read signals are output from said first and second photoelectric conversion elements, respectively; and signal processing means, coupled to said driving means, for processing said first and second read signals so that a finalized read signal containing information on pixels arranged in a scanning line is generated each time said original is scanned in said scanning direction.

2. An image reader as claimed in claim 1, further comprising light interrupting means, located between said imaging means and said first and second photoelectric conversion elements, for preventing light other than said light reflected by said original from being projected onto said first and second photoelectric conversion elements.

3. An image reader as claimed in claim 2, wherein said light interrupting means comprises first and second members respectively preventing said light other than said reflected light reflected from said original from being projected onto portions of said first and second photoelectric conversion elements respectively corresponding to end portions of said original opposite to one another in said scanning direction.

4. An image reader at claimed in claim 3, further comprising:

original size detecting means for detecting a size of said original; and moving means, coupled to said light interrupting means and said original size detecting means, for respectively moving said first and second members a distance corresponding to of size of said original detected by said original size detecting means.

5. An image reader as claimed in claim 2, further comprising:

original size detecting means for detecting a size of said original; and control means, coupled to said light source and said original size detecting means, for adjusting an intensity of light emitted from said light source in accordance with a size of said original.

6. An image reader as claimed in claim 2, further comprising:

original size detecting means for detecting a size of said original; and control means, coupled to said original size detecting means, for changing a speed of movement of said original in a direction orthogonal to said scanning direction in accordance with a size of said original.

7. An image reader as claimed in claim 2, further comprising:

original size detecting means for detecting a size of said original;

first control means, coupled to said light source and said original size detecting means, for adjusting an intensity of light emitted from said light source in accordance with a size of said original; and second control means, coupled to said original size detecting means, for changing a speed of movement of said original in a direction orthogonal to said scanning direction in accordance with a size of said original.

8. An image reader as claimed in claim 2, wherein said signal processing means comprises means for processing said first and second read signals so that said finalized read signal contains information only regarding pixels of said original arranged in said scanning direction, and is generated each time said original is scanned in said scanning direction.

9. An image reader as claimed in claim 1, wherein said finalized read signal comprises series data regarding only pixels of said original arranged in said scanning direction.

10. An image reader as claimed in claim 2, wherein said signal processing means comprises:

first hold means, coupled to said first and second photoelectric conversion elements, for holding first pixel signals of isolation pixels obtained when said first and second read signals concerning only pixels corresponding to one line of said original are respectively output from said first and second photoelectric conversion elements;

second hold means, coupled to said first and second photoelectric conversion elements, for holding second pixel signals relating to portions of said first and second photoelectric conversion elements, said portions being covered by said light interrupting means;

normalizing means, coupled to said first and second hold means, for respectively normalizing first dark output signals respectively contained in said first and second read signals by using, as references for normalization, said first and second pixel signals;

first memory means, coupled to said normalizing means, for storing normalized dark output signals obtained by said normalizing means;

second memory means for holding said second pixel signals;

first dark output signal generating means, coupled to said first and second memory means, for multiplying said normalized dark output signals by said second pixel signals and thereby generating second dark output signals respectively generated at said pixels;

second dark output signal generating means, coupled to said first dark output signal generating means, for generating, from said second dark output signals, actual dark output signals actually output from said first and second photoelectric conversion elements; and subtracter means, coupled to said first and second photoelectric conversion elements and said second dark output signal generating means, for respectively subtracting said actual dark output signals from said first and second read signals.

11. An image reader as claimed in claim 2, wherein said signal processing means comprises:

memory means for storing first pixel signals of isolation pixels obtained when said first and second read signals concerning only pixels corresponding to one line of said original are respectively output from said first and second photoelectric conversion elements;

hold means, coupled to said first and second photoelectric conversion elements, for holding second pixel signals relating to portions of said first and second photoelectric conversion elements, said portions being covered by said light interrupting means;

first dark output signal generating means, coupled to said memory means and said hold means, for multiplying said second pixel signals held by said hold means by first pixel signals stored in said memory means and thereby generating first dark output signals respectively generated at said pixels;

second dark output signal generating means, coupled to said first dark output signal generating means, for generating, from said first dark output signals, actual dark output signals actually output from said first and second photoelectric conversion elements; and subtracter means, coupled to said first and second photoelectric conversion elements and said second dark output signal generating means, for respectively subtracting said actual dark output signals from said first and second read signals.

12. An image reader as claimed in claim 2, wherein said signal processing means comprises:

hold means for storing pixel signals of isolation pixels obtained when said first and second read signals concerning only pixels corresponding to one line of said original are respectively output from said first and second photoelectric conversion elements;

peak hold means, coupled to said first and second photoelectric conversion elements, for holding peak values of white reference read signals obtained when one line of a white reference is optically read in said scanning direction;

first normalizing means, coupled to said hold means and said peak hold means, for respectively normalizing said white reference read signals and said first and second read signals by using, as references for normalization, said pixel signals of said isolation pixels and said peak values;

memory means for storing normalized white reference read signals output by said first normalizing means and related to one line in said scanning direction; and second normalizing means, coupled to said first normalizing means, for normalizing, by using as references for normalization, said normalized white reference read signals stored in said memory means and normalized first and second read signals output by said first normalizing means and related to one line in said scanning direction.

13. An image reader as claimed in claim 7, wherein said signal processing means comprises:

first hold means, coupled to said first and second photoelectric conversion elements, for holding first pixel signals of isolation pixels obtained when said first and second read signals concerning only pixels corresponding to one line of said original are respectively output from said first and second photoelectric conversion elements;

second hold means, coupled to said first and second photoelectric conversion elements, for holding second pixel signals relating to portions of said first and second photoelectric conversion elements, said portions being covered by said light interrupting means;

normalizing means, coupled to said first and second hold means, for respectively normalizing first dark output signals respectively contained in said first and second read signals by using, as references for normalization, said first and second pixel signals;

first memory means, coupled to said normalizing means, for storing normalized dark output signals obtained by said normalizing means;

second memory means for holding said second pixel signals;

first dark output signal generating means, coupled to said first and second memory means, for multiplying said normalized dark output signals by said second pixel signals and thereby generating second dark output signals respectively generated at said pixels;

second dark output signal generating means, coupled to said first dark output signal generating means, for generating, from said second dark output signals, actual dark output signals actually output from said first and second photoelectric conversion elements; and subtracter means, coupled to said first and second photoelectric conversion elements and said second dark output signal generating means, for respectively subtracting said actual dark output signals from said first and second read signals.

14. An image reader as claimed in claim 7, wherein said signal processing means comprises:

memory means for storing first pixel signals of isolation pixels obtained when said first and second read signals concerning only pixels corresponding to one line of said original are respectively output from said first and second photoelectric conversion elements;

hold means, coupled to said first and second photoelectric conversion elements, for holding second pixel signals relating to portions of said first and second photoelectric conversion elements, said portions being covered by said light interrupting means;

first dark output signal generating means, coupled to said memory means and said hold means, for multiplying said second pixel signals held by said hold means by first pixel signals stored in said memory means and thereby generating first dark output signals respectively generated at said pixels;

second dark output signal generating means, coupled to said first dark output signal generating means, for generating, from said first dark output signals, actual dark output signals actually output from said first and second photoelectric conversion elements; and subtracter means, coupled to said first and second photoelectric conversion elements and said second dark output signal generating means, for respectively subtracting said actual dark output signals from said first and second read signals.

15. An image reader as claimed in claim 7, wherein said signal processing means comprises:

hold means for storing pixel signals of isolation pixels obtained when said first and second read signals concerning only pixels corresponding to one line of said original are respectively output from said first and second photoelectric conversion elements;

peak hold means, coupled to said first and second photoelectric conversion elements, for holding peak values of white reference read signals obtained when one line of a white reference is optically read in said scanning direction;

first normalizing means, coupled to said hold means and said peak hold means, for respectively normalizing said white reference read signals and said first and second read signals by using, as references for normalization, said pixel signals of said isolation pixels and said peak values;

memory means for storing normalized white reference read signals output by said first normalizing means and related to one line in said scanning direction; and second normalizing means, coupled to said first normalizing means, for normalizing, by using as references for normalization, said normalized white reference read signals stored in said memory means and normalized first and second read signals output by said first normalizing means and related to one line in said scanning direction.

16. An image reader as claimed in claim 2, wherein said signal processing means comprises:

first hold means, coupled to said first and second photoelectric conversion elements, for holding first pixel signals of isolation pixels obtained when said first and second read signals concerning only pixels corresponding to one line of said original are respectively output from said first and second photoelectric conversion elements;

second hold means, coupled to said first and second photoelectric conversion elements, for holding second pixel signals relating to portions of said first and second photoelectric conversion elements, said portions being covered by said light interrupting means;

normalizing means, coupled to said first and second hold means, for respectively normalizing first dark output signals respectively contained in said first and second read signals by using, as references for normalization, said first and second pixel signals;

memory means, coupled to said normalizing means, for storing normalized dark output signals obtained by said normalizing means;

output means, coupled to said second hold means, for outputting either respective, average values of said second pixel signals relating to said portions of said first and second photoelectric conversion elements or respective, representative values thereof;

third hold means, coupled to said output means, for holding output signals of said output means during a period corresponding to one line;

fourth hold means, coupled to said third hold means, for delaying said output signals of said output means by a time corresponding to one line and for holding delayed output signals during a period corresponding to one line;

first dark output signal generating means, coupled to said memory means and said third hold means, for generating from said first dark output signals stored in said memory means and said output signals held in said third hold means, second dark output signals generated when said original is read along a first line;

second dark output signal generating means, coupled to said memory means and said fourth hold means, for generating from said first dark output signals stored in said memory means said delayed output signals held in said fourth hold means, third dark output signals generated when said original is read along a second line immediately following said first line;

third dark output signal generating means, coupled to said first and second dark output signal generating means, for generating actual dark output signals by adding said second dark output signals and said third dark output signals; and subtracter means, coupled to said first and second photoelectric conversion elements and said third dark output signal generating means, for respectively subtracting said actual dark output signals from said first and second signals.

17. An image reader as claimed in claim 2, wherein said signal processing means comprises:

memory means for holding first dark output signals relating to one line;

output means, coupled to said first and second photoelectric conversion elements, for outputting either respective, average values of pixel signals relating to portions of said first and second photoelectric conversion elements or respective, representative values thereof, said portions of said first and second photoelectric conversion elements being covered by said light interrupting means;

first hold means, coupled to said output means, for holding output signals of said output means during a period corresponding to one line;

second hold means, coupled to said first hold means, for delaying said output signals of said output means by a time corresponding to one line and for holding delayed output signals during a period corresponding to one line;

first dark output signal generating means, coupled to said memory means and said first hold means, for generating from said first dark output signals stored in said memory means and said output signals held in said first hold means, second dark output signals generated when said original is read along a first line;

second dark output signal generating means, coupled to said memory means and said second hold means, for generating from said output signals stored in said memory means said delayed output signals held in said second hold means, third dark output signals generated when said original is read along a second line immediately following said first line;

third dark output signal generating means, coupled to said first and second dark output signal generating means, for generating actual dark output signals by adding said second dark output signals and said third dark output signals; and subtracter means, coupled to said first and second photoelectric conversion elements and said third dark output signal generating means, for respectively subtracting said actual dark output signals from said first and second signals.

18. An image reader as claimed in claim 7, wherein said signal processing means comprises:

first hold means, coupled to said first and second photoelectric conversion elements, for holding first pixel signals of isolation pixels obtained when said first and second read signals concerning only pixels corresponding to one line of said original are respectively output from said first and second photoelectric conversion elements;

second hold means, coupled to said first and second photoelectric conversion elements, for holding second pixel signals relating to portions of said first and second photoelectric conversion elements, said portions being covered by said light interrupting means;

normalizing means, coupled to said first and second hold means, for respectively normalizing first dark output signals respectively contained in said first and second read signals by using, as references for normalization, said first and second pixel signals;

memory means, coupled to said normalizing means, for storing normalized dark output signals obtained by said normalizing means;

output means, coupled to said second hold means, for outputting either respective, average values of said second pixel signals relating to said portions of said first and second photoelectric conversion elements or respective, representative values thereof;

third hold means, coupled to said output means, for holding output signals of said output means during a period corresponding to one line;

fourth hold means, coupled to said third hold means, for delaying said output signals of said output means by a time corresponding to one line and for holding delayed output signals during a period corresponding to one line;

first dark output signal generating means, coupled to said memory means and said third hold means, for generating from said first dark output signals stored in said memory means and said output signals held in said third hold means, second dark output signals generated when said original is read along a first line;

second dark output signal generating means, coupled to said memory means and said fourth hold means, for generating from said first dark output signals stored in said memory means said delayed output signals held in said fourth hold means, third dark output signals generated when said original is read along a second line immediately following said first line;

third dark output signal generating means, coupled to said first and second dark output signal generating means, for generating actual dark output signals by adding said second dark output signals and said third dark output signals; and subtracter means, coupled to said first and second photoelectric conversion elements and said third dark output signal generating means, for respectively subtracting said actual dark output signals from said first and second signals.

19. An image reader as claimed in claim 7, wherein said signal processing means comprises:

memory means for holding first dark output signals relating to one line;

output means, coupled to said first and second photoelectric conversion elements, for outputting either respective, average values of pixel signals relating to portions of said first and second photoelectric conversion elements or respective, representative values thereof, said portions of said first and second photoelectric conversion elements being covered by said light interrupting means;

first hold means, coupled to said output means, for holding output signals of said output means during a period corresponding to one line;

second hold means, coupled to said first hold means, for delaying said output signals of said output means by a time corresponding to one line and for holding delayed output signals during a period corresponding to one line;

first dark output signal generating means, coupled to said memory means and said first hold means, for generating from said first dark output signals stored in said memory means and said output signals held in said first hold means, second dark output signals generated when said original is read along a first line;

second dark output signal generating means, coupled to said memory means and said second hold means, for generating from said output signals stored in said memory means said delayed output signals held in said second hold means, third dark output signals generated when said original is read along a second line immediately following said first line;

third dark output signal generating means, coupled to said first and second dark output signal generating means, for generating actual dark output signals by adding said second dark output signals and said third dark output signals; and subtracter means, coupled to said first and second photoelectric conversion elements and said third dark output signal generating means, for respectively subtracting said actual dark output signals from said first and second read signals.

* * * * *